United States Patent
Bouve et al.

(10) Patent No.: US 6,385,622 B2
(45) Date of Patent: *May 7, 2002

(54) SYSTEM AND METHODS FOR REMOTELY ACCESSING A SELECTED GROUP OF ITEMS OF INTEREST FROM A DATABASE

(76) Inventors: W. Lincoln Bouve, 40 Lawndale Rd., Milton, MA (US) 02186; William T. Semple, 225 N. Garfield St., Arlington, VA (US) 22201; Steven W. Oxman, 385 Wesbury Dr., Riva, MD (US) 21140

( * ) Notice: Subject to any disclaimer, the term of this patent is extended or adjusted under 35 U.S.C. 154(b) by 0 days.

This patent is subject to a terminal disclaimer.

(21) Appl. No.: 09/816,626

(22) Filed: Mar. 23, 2001

Related U.S. Application Data

(63) Continuation of application No. 08/920,044, filed on Aug. 28, 1997, which is a continuation of application No. 08/371,425, filed on Jan. 11, 1995, now Pat. No. 5,682,525.

(51) Int. Cl.[7] .............................................. G06F 17/30
(52) U.S. Cl. ......................... 707/104.1; 707/10; 707/4; 701/208; 701/213
(58) Field of Search ............................... 701/201, 200, 701/208–213; 707/104, 1–6, 10, 200

(56) References Cited

U.S. PATENT DOCUMENTS

| | | | | |
|---|---|---|---|---|
| 4,974,170 A | * | 11/1990 | Bouve et al. | 340/990 |
| 5,164,904 A | * | 11/1992 | Sumner | 701/201 |
| 5,214,757 A | * | 5/1993 | Mauney et al. | 340/990 |
| 5,289,572 A | * | 2/1994 | Yano et al. | 345/855 |
| 5,424,951 A | * | 6/1995 | Nobe et al. | 340/995 |
| 5,543,789 A | * | 8/1996 | Behr et al. | 340/990 |
| 5,608,635 A | * | 3/1997 | Tamai | 701/201 |
| 6,282,489 B1 | * | 8/2001 | Bellesfield et al. | 701/201 |

FOREIGN PATENT DOCUMENTS

| | | | | |
|---|---|---|---|---|
| EP | | 0508787 A2 | * 4/1992 | 17/30 |

* cited by examiner

*Primary Examiner*—Hosain T. Alam
(74) *Attorney, Agent, or Firm*—Curtis A. Vock; Lathrop & Gage L.C.

(57) ABSTRACT

A user can access a common database from a remote communications port, at any qualified location, to generate a map or other positional information which locates selected items of interest, e.g., businesses, stores, architectural sites, and the like. The database contains information representing the items of interest, including, for each of the items of interest, positional coordinates, a geographic vicinity, and a selected category. The positional coordinates discretely locate the vicinity, while the vicinity specifies the exact locations of the items of interest in the selected category. For example, a user in New York can select the display of sporting shops in the area surrounding Chicago O'Hara International Airport selectively. A user can also access a port and display locations of items of interest within the same vicinity as the user and relative to the user's position. The database can be modified from qualified remote locations to change, or add to, the information therein. An advertisement can be tagged to the display or print out as an association with the selected items of interest.

63 Claims, 15 Drawing Sheets

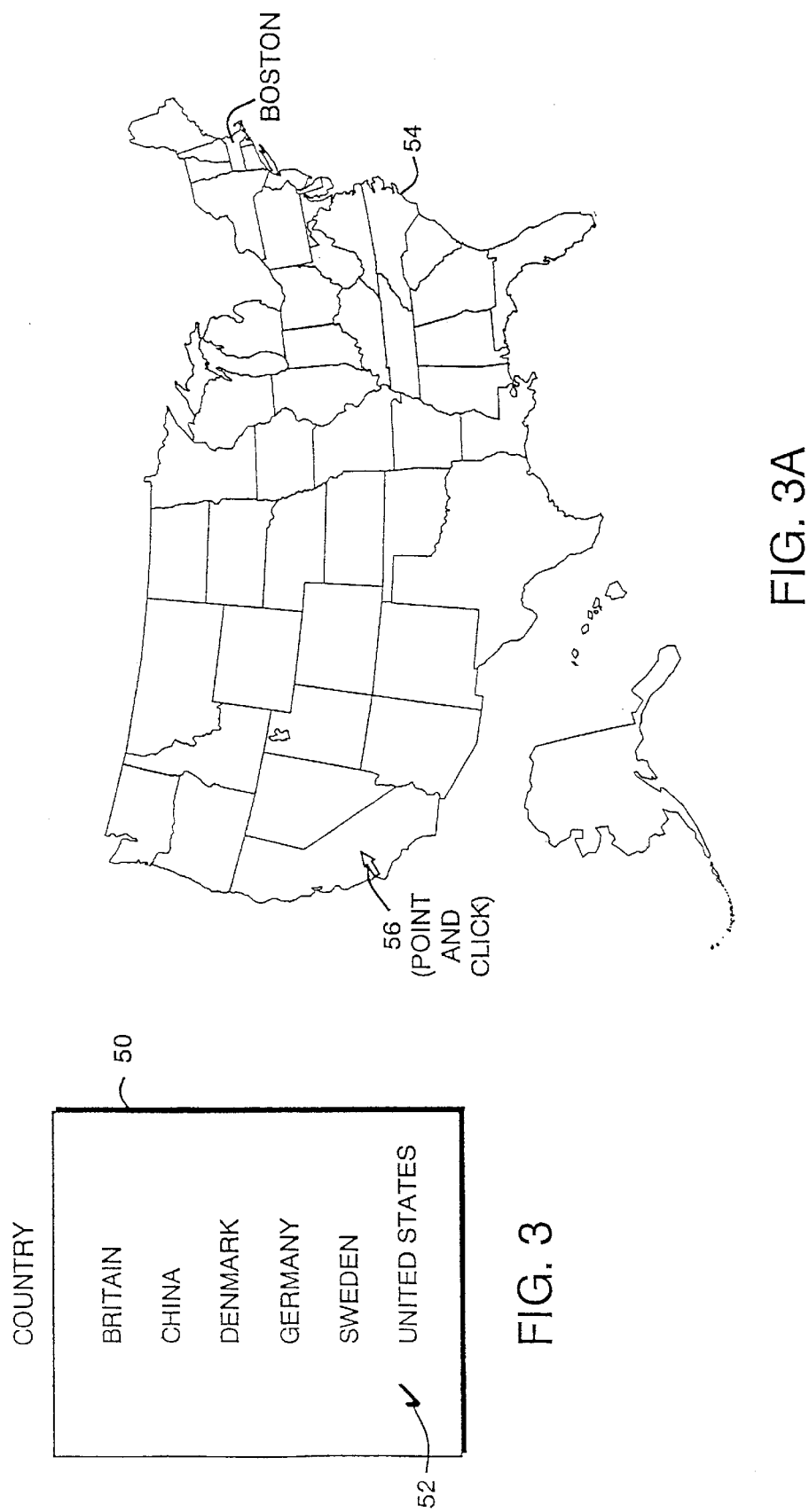

SYSTEM AND METHODS FOR REMOTELY ACCESSING A SELECTED GROUP OF ITEMS OF INTEREST FROM A DATABASE

This is a continuing application of commonly owned and copending U.S. patent application Ser. No. 08/920,044, filed Aug. 28, 1997, which is a continuation of U.S. patent application Ser. No. 08/371,425, filed Jan. 11, 1995 and which is now U.S. Pat. No. 5,682,525, issued Oct. 28, 1997.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

Electronic directories for identifying selected subscribers within a city are known in the prior art. For example, U.S. Pat. No. 4,974,170 describes one system which includes a fixed kiosk with an internal memory for storing locations such as businesses and historical sites within a predetermined distance from the kiosk. An input panel on the kiosk provides access to the data within the memory, and a map is generated by the system thereby locating the selected information from the kiosk.

However, such a system is inflexible. The map generated by the system is predefined; and thus the user cannot access or select information about businesses and historical sites outside of the predefined map. A user of the system must also know the exact location of the kiosk in order to use the system. Tourists and business travelers to the city are unlikely to know of the kiosk; and thus the kiosk system is of little use to such users. Further, a user must be physically present at the kiosk in order to access the information about the businesses and/or sites in the surrounding area.

In addition, the information stored within the kiosk's memory must be manually updated. This requires a series of cumbersome steps—including the physical acts of loading and downloading to the memory at the kiosk—to update the system in the event that information about a selected business changes, e.g., the business closes.

It is, accordingly, an object of the invention to provide systems and methods which reduce or remove the aforementioned difficulties.

It is yet another object of the invention to provide a system for remotely accessing selective items of interest from a database; and for displaying a geographic vicinity of the items of interest to the user selectively and at the remote location.

Still another object of the invention is to provide a system for remotely providing information identifying locations of selected items of interest at a selected destination location.

These and other objects will be apparent in the specification which follows.

SUMMARY OF THE INVENTION

As used herein, "items of interest" means services, products, geographic sites, architectural sites, stores, restaurants, public services, and other items which a user of the invention may wish to locate. "Port," "remote access port," "terminal," or "remote access terminal" are used interchangeably to denote a terminal, e.g., a personal computer with modem, from which a user of the invention can access the database storing the information about the items of interest. "Remote database" or "database" are used herein to denote a database, e.g., a client server, which stores information for access by a user of the invention from a port. "Communication link" is used to denote means, including for example a telephone line, for communicating between the database and the port. "Geographic vicinity," and "map" are used to denote a geographic region which includes and surrounds selected items of interest.

In one aspect, the invention provides a system for remotely determining the position of a selected category of items of interest in a selected geographic vicinity from a database. A database stores information about a plurality of items of interest, including, for each of the items of interest, positional coordinates, a geographic vicinity, and at least one associated category. A communications link facilitates communications between a user of the system and the database. The system also provides for transmitting a portion of the information in the database to a user via the link upon receipt of a request signal representative of a selected category and geographic vicinity. Preferably, that transmitted portion of the information includes identification of a position for the items of interest within the selected category and geographic vicinity. The system further provides a port for remotely accessing the portion of information via the link. Specifically, the port generates the request signal in response to inputs by a user of the system; that signal being representative of the selected category and geographic vicinity. A user interface at the port accepts the inputs and communicates the position of each of the items of interest in the selected category and geographic vicinity to the user.

In accord with other aspects of the invention, the communications link can include several technologies, including a telephone link, satellite link, radio-frequency link, infrared link, internet link, facsimile link, fiber-optic link, coaxial cable link and television link. The database is, typically, a personal computer, mainframe, work-station, minicomputer, or digital data processor. To communicate the information to a user, the user interface can include a television, telephone, facsimile, audible speaker, and/or personal computer display. To accept user inputs at the port, the user interface can further include a television interface, telephone interface, facsimile interface, and/or a personal computer interface.

Preferably, the geographic vicinity includes certain spatial detail of the items of interest. For example, the geographic vicinity can include a map of the items of interest in the selected category, as well as street and landmark information displayed relative to the user's position at the remote port. As such, the set of positional coordinates generally identifies either (i) a location of a user of the system, or (ii) a destination location within the geographic vicinity.

In certain aspects of the invention, the information within the database further includes additional detail about at least one of the items of interest. Such a feature is advantageous in that, once the port displays the geographic vicinity with the items of interest, a user can thereafter select further additional detail about one or more of the items of interest. In this manner, for example, an item of interest such as a restaurant can display a picture of the interior of the restaurant to the user. The additional detail can include other multimedia information, such as video, prerecorded music, and digital pictures.

In still another aspect, the invention also communicates at least one advertisement associated with at least one of the items of interest to the user. As such, certain advertisers that are connected with the selected category of items of interest can promote a name or business.

In one aspect of the invention, the information within the database is arranged hierarchically. In this aspect, there are a plurality of discrete geographic vicinities (each set of positional coordinates corresponding to one discrete location within the geographic vicinity). The system thus provides for hierarchically selecting any of the discrete vicinities from the port in a hierarchical manner.

In still another aspect of the invention, database apparatus is provided for storing information about a plurality of items of interest. As above, that information includes, for each of the items of interest, positional coordinates, a geographic vicinity, and at least one associated category. A communications link provides for communicating between a user of the database apparatus and a remote port. The database apparatus further provides for transmitting a portion of the information to a user via the link upon receipt of a request signal representative of a geographic vicinity and a selected category of the items of interest. That transmitted portion of the information includes an identification of a position for the items of interest within the selected category and geographic vicinity.

The invention also provides, in another aspect, a remote access port for remotely accessing a selected category of items of interest in a selected geographic vicinity from a database such as described above. The port includes means for generating a request signal representative of a selected category and a selected geographic vicinity of the items of interest in response to inputs by a user of the port. A user interface accepts the inputs and indicates the position of each of the items of interest within the selected category and geographic vicinity.

In another aspect, the information includes additional detail for at least one of the items of interest, and the port further includes means for (i) generating a signal representative of a selection of at least one of the items of interest, and (ii) communicating the additional detail to the user.

The invention also provides a method for remotely determining the position of a selected category of items of interest in a selected geographic vicinity from a database, comprising the steps of: (i) storing information about a plurality of items of interest in the database, the information including, for each of the items of interest, positional coordinates, a geographic vicinity, and at least one associated category; (ii) accessing the database from a remote location and over a communication link; (iii) communicating, from the remote location, information representative of a selected category and a selected geographic vicinity to the database; and (iv) transmitting a portion of the information from the database and to the user over the link, the information including, at least, identification of a position for the items of interest within the selected category and geographic vicinity.

The invention is next described further in connection with preferred embodiments, and it will be apparent that various additions, subtractions, and modifications can be made by those skilled in the art without departing from the scope of the invention.

BRIEF DESCRIPTION OF THE ILLUSTRATED EMBODIMENTS

A more complete understanding of the invention may be obtained by reference to the drawings, in which:

FIG. 1 schematically illustrates a system constructed according to the invention;

FIG. 3 shows a user interface display of various worldwide countries providing selectable locations according to the invention and which can be displayed to a user of the system of FIG. 1;

FIG. 3A shows a user interface display of a map of the United-States providing selectable locations according to the invention and which can be displayed to a user of the system of FIG. 1;

Figure 1:
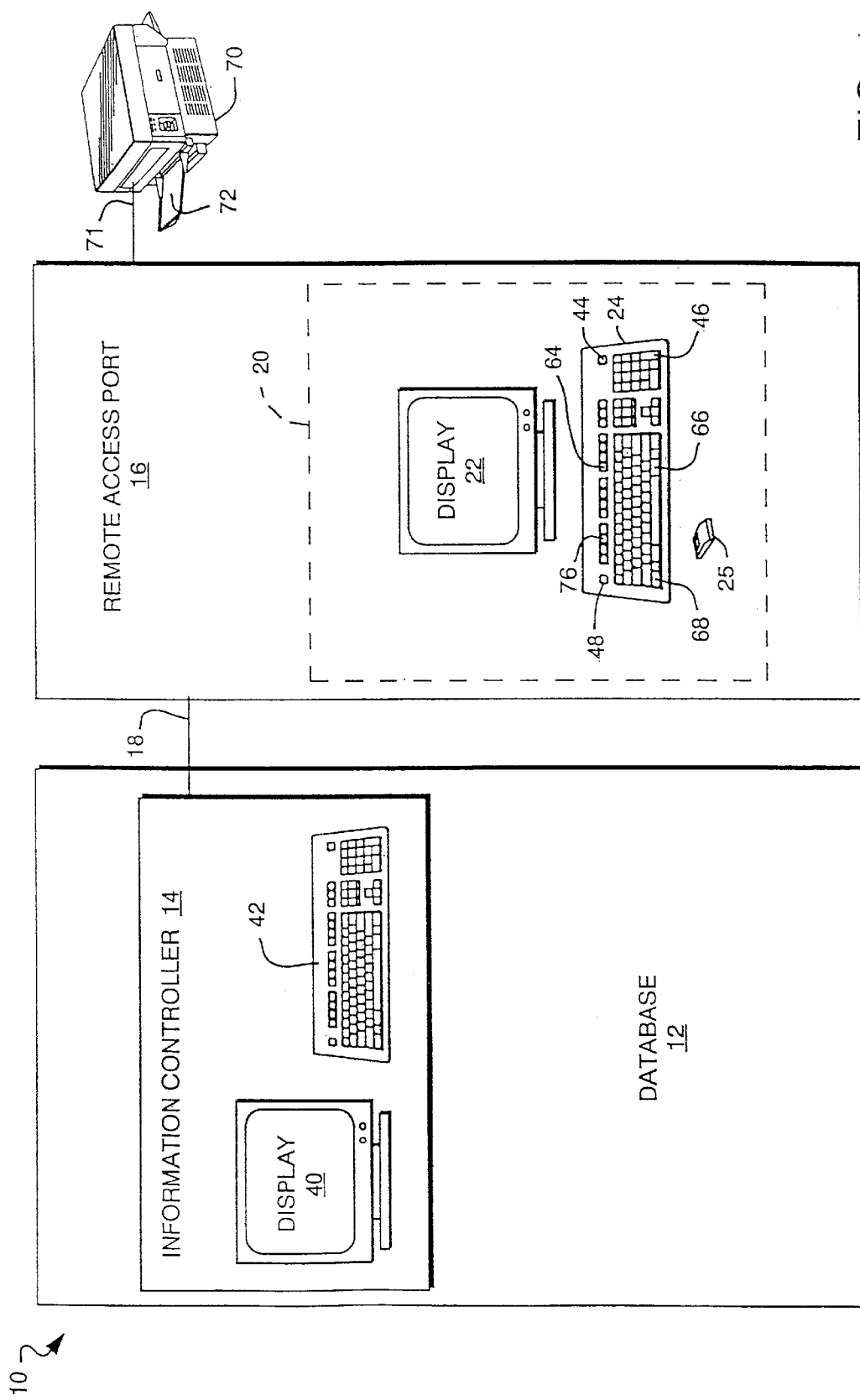
Figure 9:
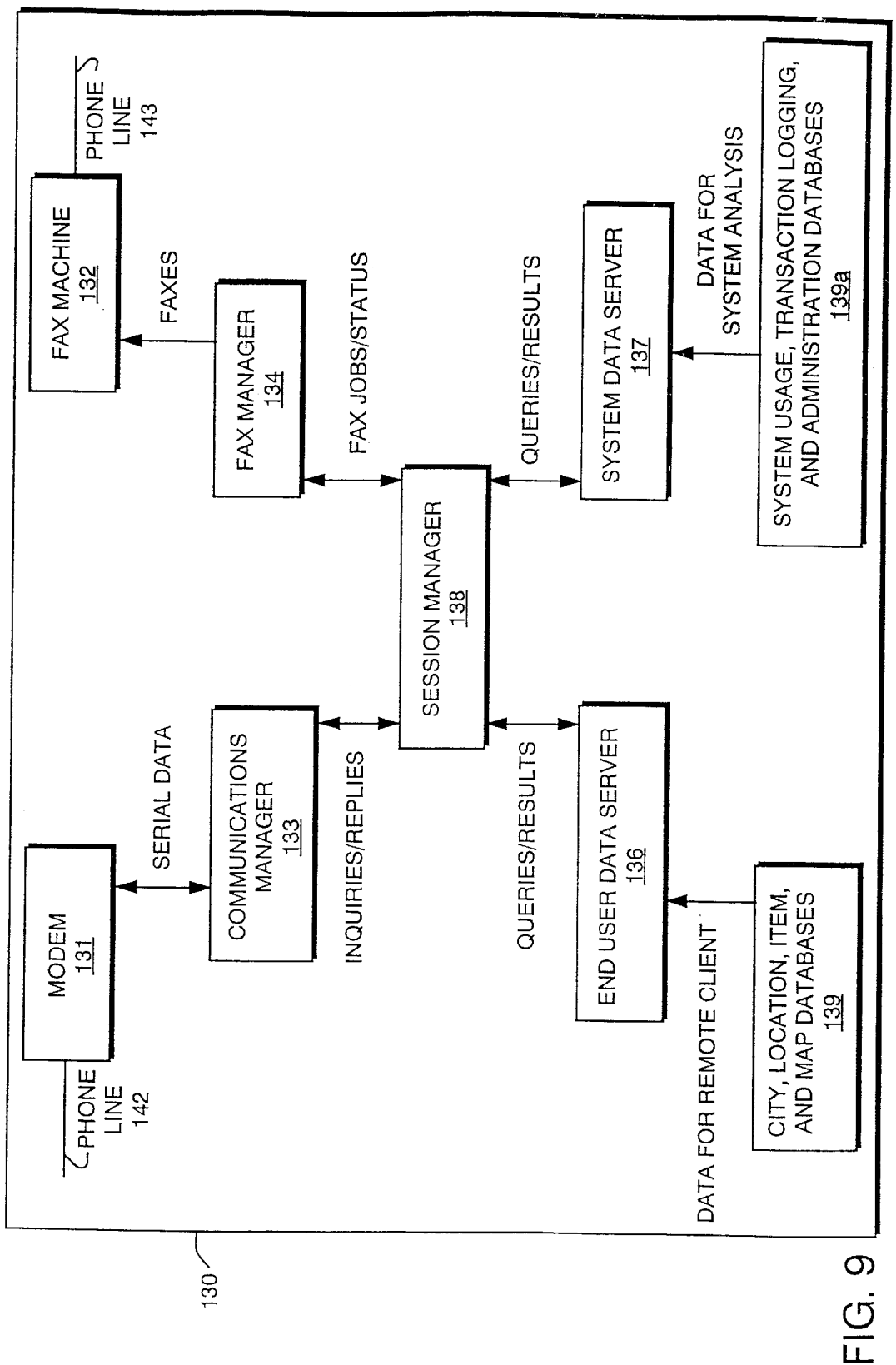
Figure 10:
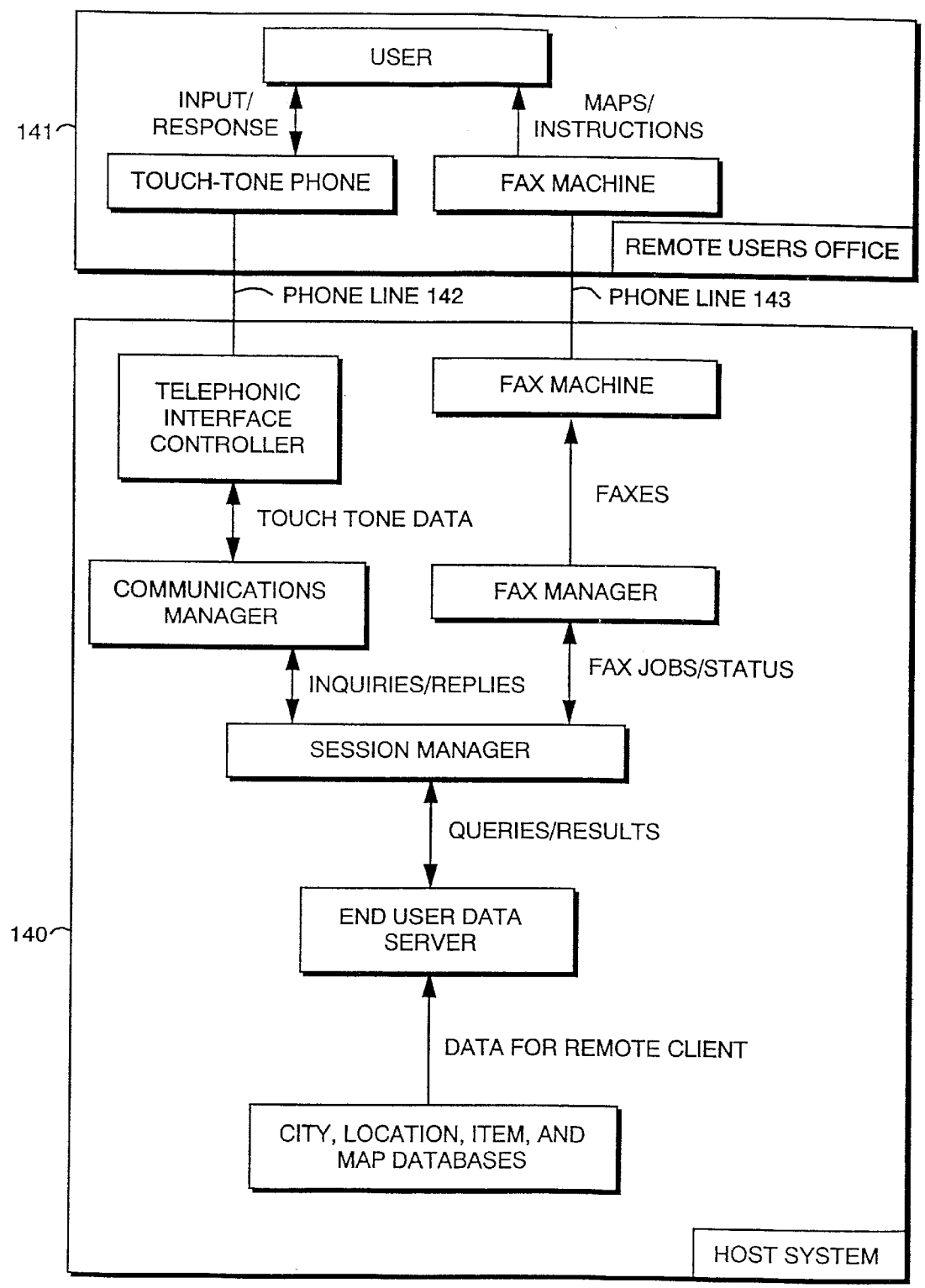
Figure 11:
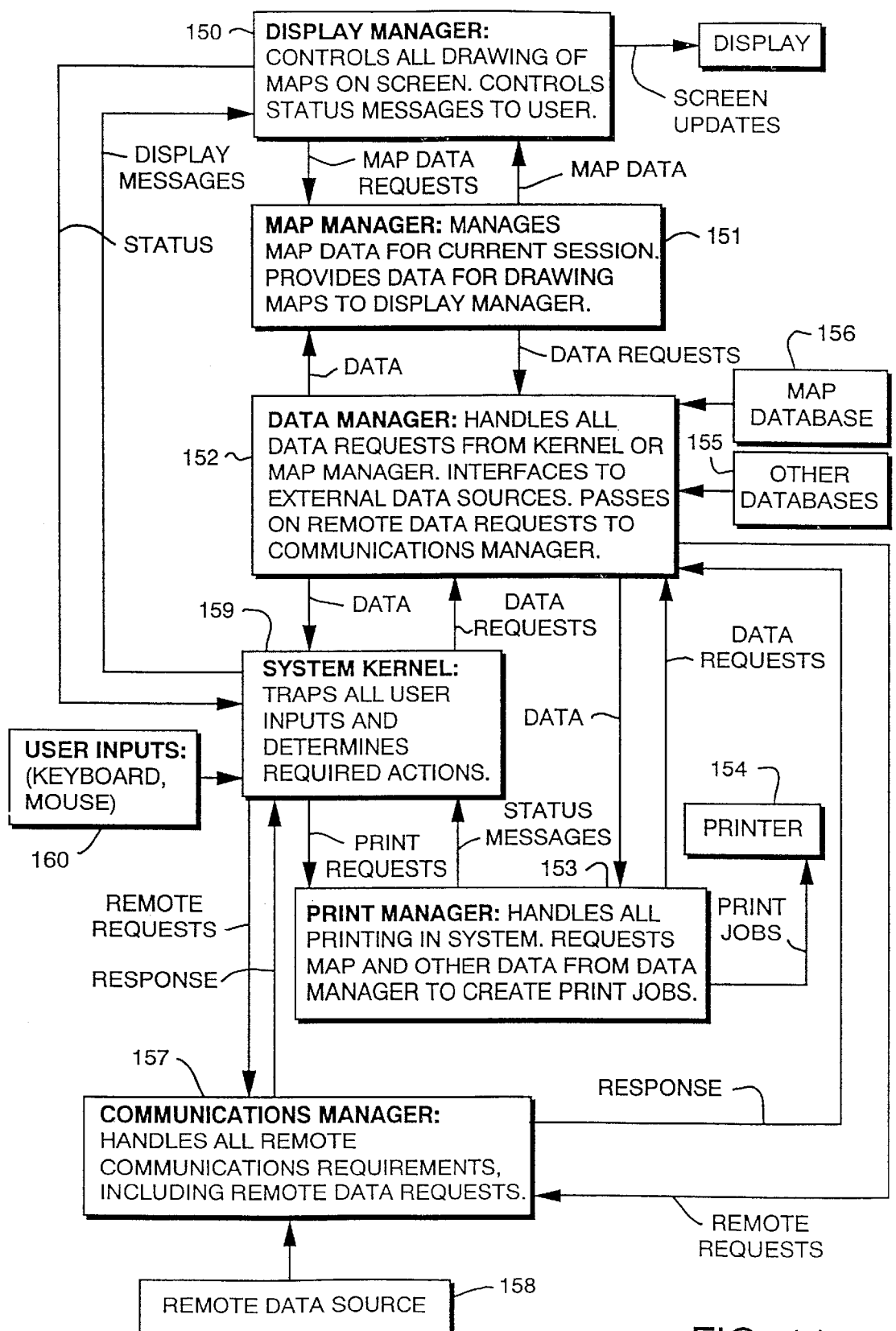
Figure 12:
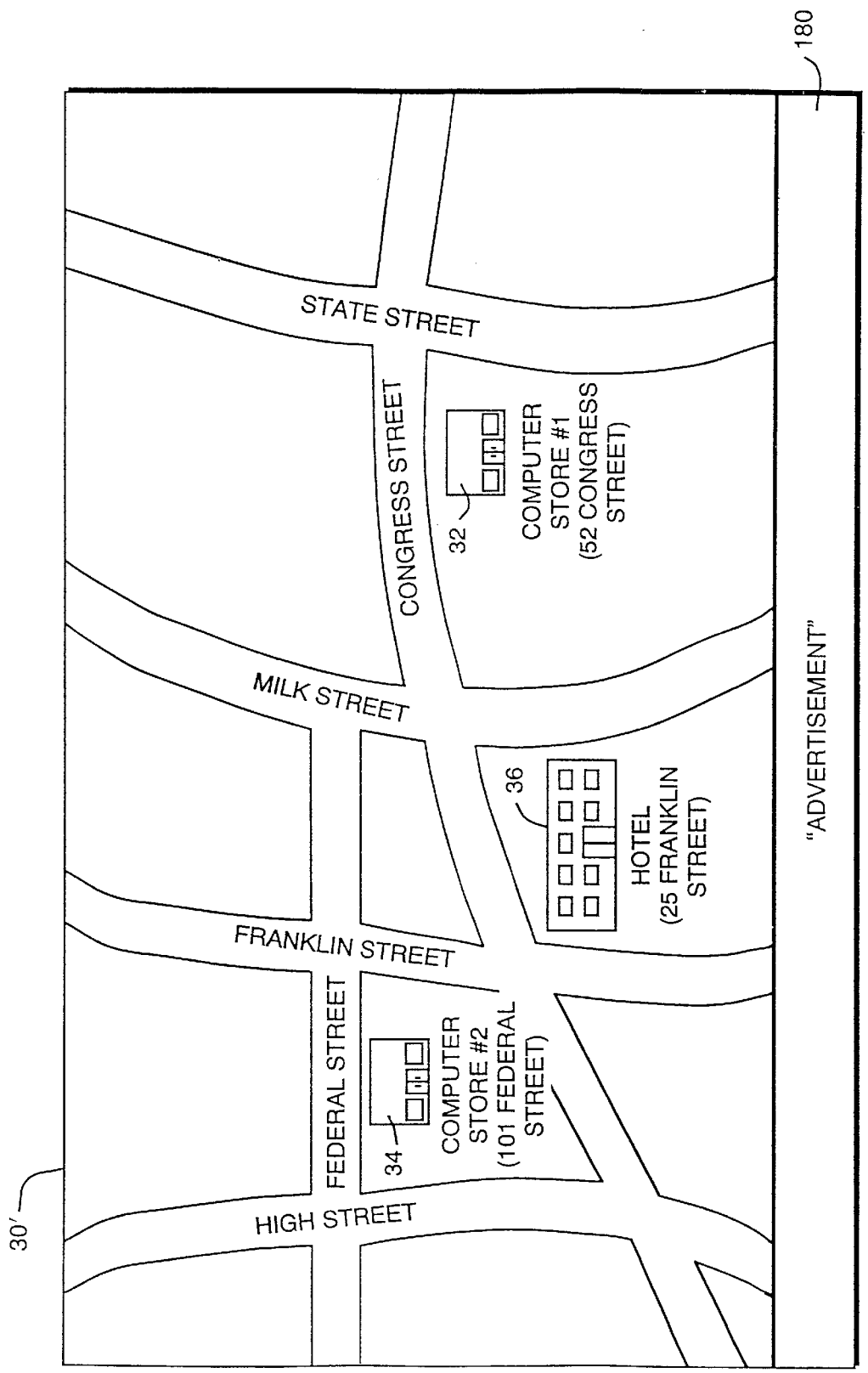

FIG. 9 schematically illustrates system architecture, constructed according to the invention, which forms a database suitable for use as the database of FIG. 1, and which services both phone and fax information and internal administrative data;

FIG. 10 shows one system architecture according to the invention, and which includes a host database and a remote port;

FIG. 11 illustrates process flow and system architecture for interfacing between user inputs and the database, in accord with the invention; and FIG. 12 shows one representative display or print-out, according to the invention, which includes an advertising field associated with the items of interest.

DETAILED DESCRIPTION

FIG. 1 illustrates a system 10 constructed according to the invention. A database 12 stores information about the items of interest, including information about locating the items of interest. The database 12 includes an information controller 14 which communicates with a remote access port 16 via a communications link 18 and which controls the access and flow of information into and out of the database 12. The information within the database 12 is accessible by the remote access port 16 upon request by a user of the port 16. Accordingly, the port 16 preferably includes a user interface section 20 which provides a graphical display 22, keyboard 24, and mouse tracker 25 (for pointing and clicking on selected display items within the display 22).

Figure 2:
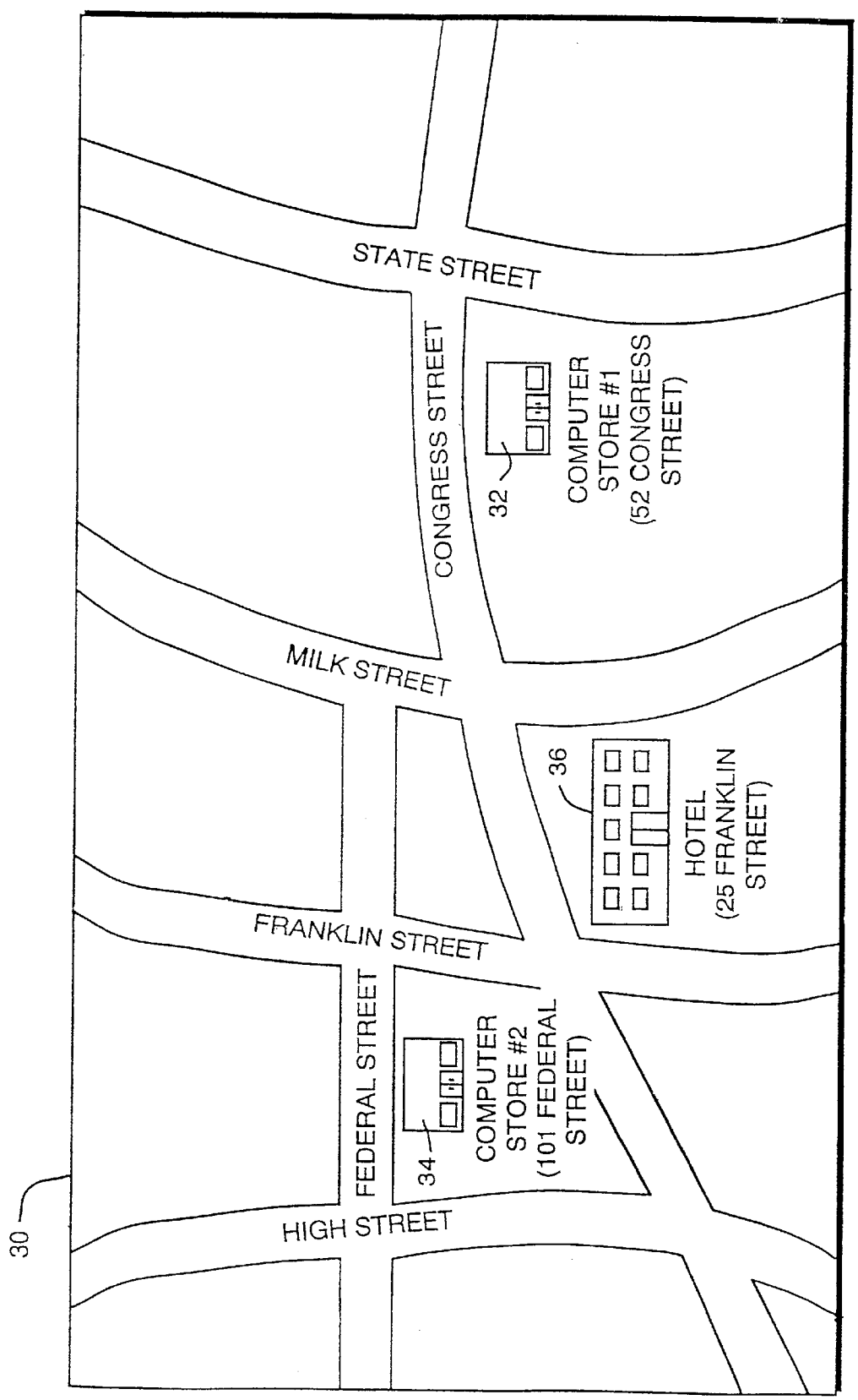
FIG. 2 shows a typical graphical illustration locating items of interest and which can be displayed to a user of the system of FIG. 1.

Specifically, the information within the database 12 includes, for each of the items of interest, positional coordinates, a geographic vicinity, and at least one associated category. Preferably, this information includes a graphical representation so that a user can easily interpret the information. FIG. 2 shows one exemplary display 30 of information locating computer products in downtown Boston, Mass. Accordingly, the associated category in this example is "computer products," and, in the illustrated display 30, the geographic vicinity includes the selected items of interest, including (i) the two computer stores 32, 34 at, respectively, 52 Congress Street and 101 Federal Street; and (ii) that area which is displayed within the display 30 and which surrounds the items of interest, such as that area displayed between the streets of High Street and State Street.

The positional coordinates, as part of the selected information, operate to locate the geographic vicinity. Briefly, the positional coordinates locate one location within the geographic vicinity—such as the center of the vicinity—so that items of interest can be determined relative to the positional coordinates and within the geographic vicinity. In addition, the geographic vicinity is preferably a rectangle of information, with North situated upwards.

In one preferred aspect of the invention, the display 30 is centered relative to the location of the user (as such, the positional coordinates of the information are set to the user's present position). For example, if the hotel 36 at 25 Franklin Street has a port 16 therein, a user of the invention can (i) access that particular port and hence the information within the database 12, and (ii) display the items of interest relative to the user's current location, i.e., at the hotel 36. Accordingly, in this embodiment, the display 30 is generated with the hotel 36 at the center of the display—corresponding to the positional coordinates of 25 Franklin Street—and the selected items of interest in the associated category are displayed on streets relative to the hotel 36. In this fashion, a user can easily walk or drive to the items of interest after leaving the hotel 36. Such a feature also gives the "appearance" to the user that the hotel 36 is at the center of activity, a desirable marketing feature for the invention.

With further reference to FIG. 1, the controller 14 preferably includes a display 40 and a keyboard 42 so that an operator of the system 10 can add and modify the information within the database 12. This is especially useful because information about the items of interest changes regularly; and thus the information within the database 12 is preferably updated on a regular basis so that users of the system 12 receive accurate information. For example, in a typical commercial location such as illustrated in FIG. 2, new retail stores open and existing retail stores close throughout the year. The invention thus provides for updating information within the database 12, such as through the control of a system operator typing commands at the keyboard 42.

Alternatively, the system 10 provides for remotely updating the database 12 with new information via any of the ports 16 or via a remote computer with a modem, described in more detail in connection with FIG. 6A. Specifically, the controller 14 provides access security which allows only authorized access for modification of the database 12. As such, a system administrator at a remote port 16 can download information to the database, or modify existing information within the database, as needed and without physically operating the keyboard 42.

The communications link 18 of the invention can take many forms. It is generally impractical to "hard-wire" each remote access port 16 to the database 12; so the form of the communications link 18 generally includes existing communication networks, such as one or more of the following: telephone lines, fiber-optic cabling, satellite communications, cellular communications, radio and microwave-frequency communicators, infra-red communicators, the facsimile mechanism, airphones, modems, the internet, co-axial cabling, television including interactive TV communications, and the like. These communication networks and subsystems are readily known to those skilled in the art without further reference hereto. Nevertheless, FIGS. 6A–6B illustrate representative communication links, according to the invention, which comprise one or more of these communication networks.

Figure 7B:
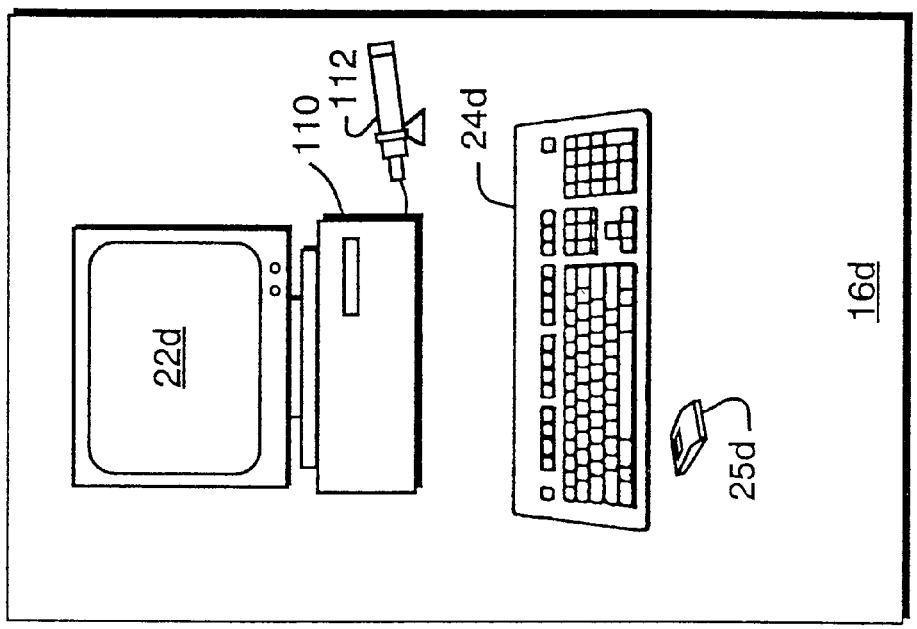
FIGS. 7A and 7B illustrate various remote port display technologies, according to the invention, which are suitable for use within the remote port of the system of FIG. 1.
Figure 7A:
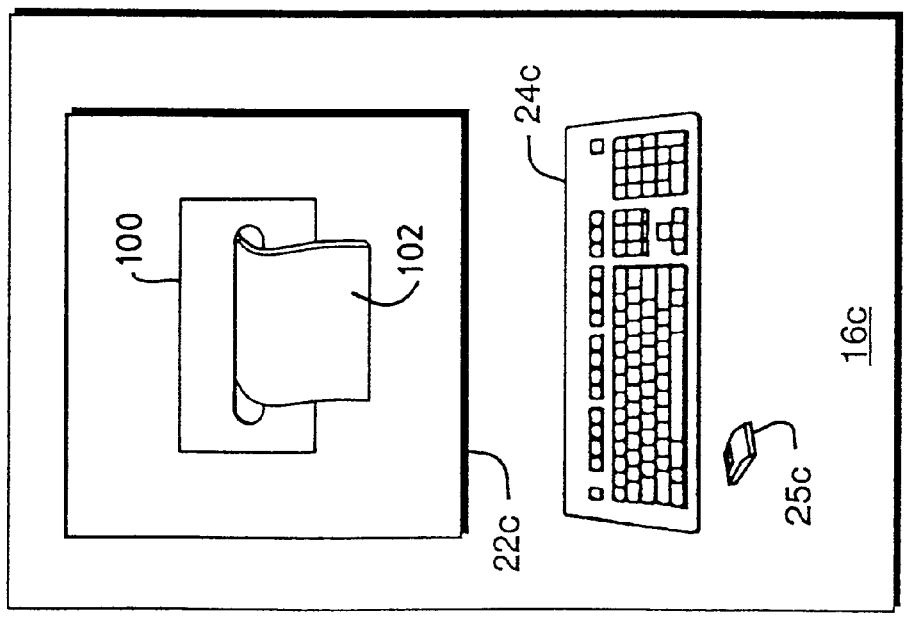

The displays 22 and 40 of FIG. 1 include those displays known to those skilled in the art, including the cathode-ray-tube (CRT), Liquid Crystal Display (LCD), and an array of Light Emitting Diodes (LEDs). However, the display 22 can also take the form of a paper or voice communication port, such as a facsimile output (hard-copy), printer, a voice communication synthesizer with automated digitized voice responses, a voice-driven menu systems, or as other devices capable of rendering digitized or analogue output signals. FIGS. 7A and 7B below illustrate some of these alternative forms of the display 22.

The remote access port 16 is generally provided at locations of public access in a city. Accordingly, the invention supports a nearly unlimited number of ports 16 that are connected for communication with the database 12, each of the ports being connected to the database 12 such as shown in FIG. 1 and such as described in more detail below. For example, the port 16 of the invention is appropriately placed in one or more hotels, restaurants, and public facilities (such as a train station) in the city. In Boston, Mass., therefore, the port 16 of the invention would ideally be accessible at several different locations, particularly at busy locations, such as at (i) North and South Stations, (ii) Logan Airport and at each of the several airport terminals, (iii) within several (or many, if not all) of Boston's hotels and restaurants, and (iv) at car rental locations.

The invention provides, generally, two modes of operation for a user accessing the port 16. In the first mode of operation, the user within the desired geographic vicinity accesses the database through the port 16 for information about the items of interest located near-by. This mode was described in connection with FIG. 2. That is, when the user is located within the geographic vicinity, e.g., at the hotel 36, a user can locate any of the items of interest relative to the hotel 36 and display items of interest in the associated category, e.g., computer products, through a street map connecting streets to and from the hotel 36. In this manner, as described above, a user can easily locate the items of interest from his or her present location, which determines the positional coordinates of the geographic vicinity.

In one embodiment of the invention, a user accesses this first mode of operation by selecting the "LOCAL INFO" key 44 on the keyboard 42, FIG. 1. Upon selection, the system 10 provides information, such as a graphical display shown in FIG. 2, at the port 16 to locate items of interest within the geographic vicinity of the user and relative to the user's current location. The scope of the geographic vicinity is generally within walking distance.

In the second mode of operation, a user is nowhere near the desired geographic vicinity but nevertheless desires information about items of interest at a destination location (for example, it is generally impractical to display all items of interest within a one hundred mile radius; rather it is more convenient to display locations of items of interest in a format that is relative to his desired destination). In one embodiment of the invention, such a user selects the "REMOTE-INFO" key 48 to access the desired set of destination position coordinates. For example, a user who is leaving Boston Logan Airport for Los Angeles International Airport (LAX) can access a port 16 at Logan and display, selectively, items of interest in an associated category relative to LAX. For example, if a user of the invention wishes to locate music stores upon arrival in Los Angeles, she can command the display of music stores relative to LAX so that they are easily located.

In order to command the display of items of interest at the destination location, and in accord with one embodiment of the invention, a user first selects "USA" at the port 16 via the keyboard 24, then the user sequentially selects "California," "Los Angeles," and finally "Los Angeles International Airport." Each of these selections are provided to the user in a menu format on the display 22, such as known to those skilled in the art.

Figure 3C:
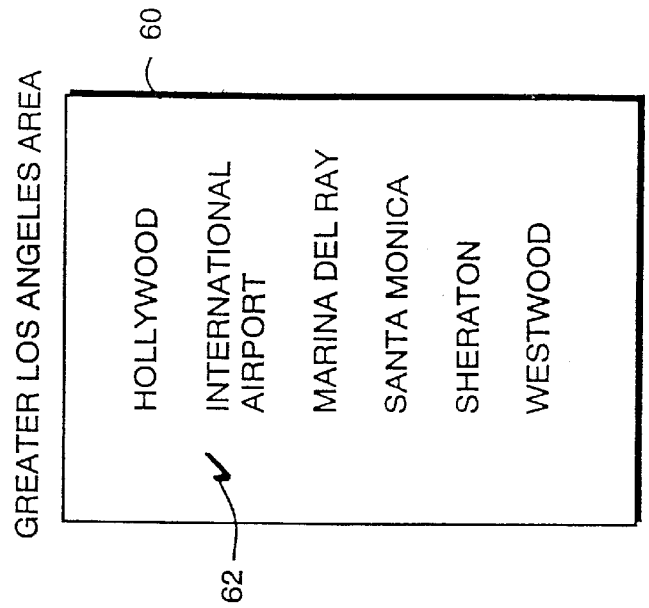
FIG. 3C shows a user interface display of various selectable locations within greater Los Angeles according to the invention and which can be displayed to a user of the system of FIG. 1.
Figure 3B:
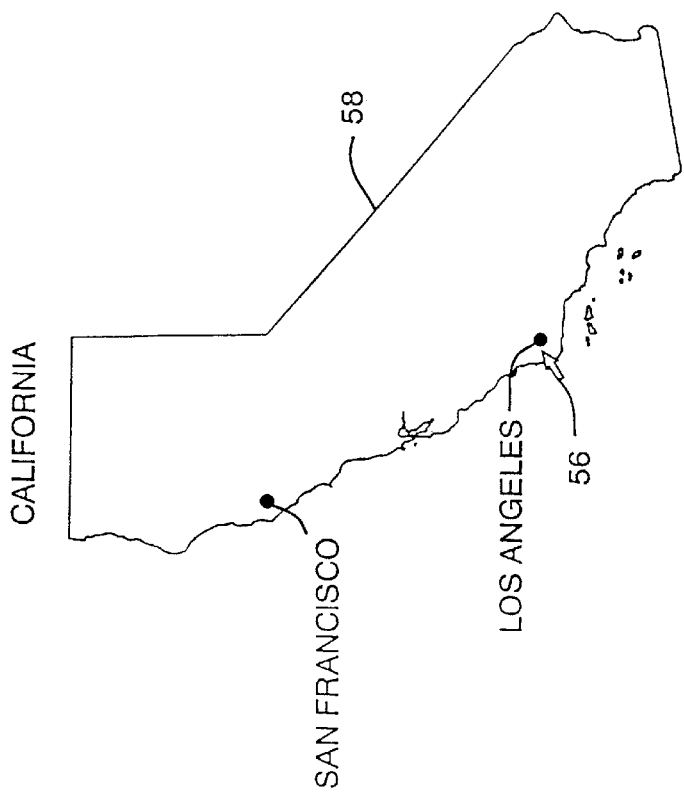
FIG. 3B shows a user interface display of a map of California providing selectable locations according to the invention and which can be displayed to a user of the system of FIG. 1.

FIGS. 3–3C schematically illustrate this display and selection process according to one embodiment of the invention. FIGS. 3–3C show successive displays which are displayed on the display 22, FIG. 1. Specifically, the system 10 of FIG. 1 first provides information to the display 22 that represents a selection 50 of various countries which can be selected by a user, such as shown in FIG. 3. In this example, a user selects the "United States" (such as shown by the check-mark 52). The system 10 thereafter provides information to the display 22 that represents a map 54 of the United States, shown in FIG. 3A, so that a user can point and select "California" with a mouse pointer 56 via the mouse tracker 25. Upon selection, an outline 58 of California is displayed, including many, if not all, of its major cities, as shown in FIG. 3B (for illustrative purposes, only Los Angeles and San Francisco are identified).

With the outline of California displayed, a user can select "Los Angeles" by again pointing the mouse pointer 56 onto the city identified as Los Angeles and clicking the mouse tracker 35. Thereafter, an alphabetic listing 60 of well-known places is provided by the system to the display 22, as shown in FIG. 3C, so that a user can, appropriately, select a geographic vicinity within which to locate the items of interest. In this example, a user would appropriately select Los Angeles International Airport, as illustrated with a check-mark 62.

As should be clear to those skilled in the art, the successive display of information within the display 22 can be accomplished in several ways, each of which is within the scope of the invention. For example, the display of information shown in FIGS. 3–3C can be done through menus only, and without the map illustrations shown in FIG. 3A and 3B. That is, a menu of information can replace the maps of FIGS. 3A and 3B, such as for example provided in FIGS. 3 and 3C. A menu of the United States, for example, at least includes a listing of the several states; and a map of California at least includes a menu listing of its major cities.

Likewise, the display of information on the display 22 can entirely be in graphical form. In such a case, the menus of FIG. 3 and 3C are replaced, respectively, with (i) graphical representations of the world, and (ii) graphical locations of key items of interest within the greater Los Angeles area.

Accordingly, the default display of information to a user monitoring the display 22 is a mixture of graphics and menus, such as shown in FIGS. 3–3C. However, a user can select only the display of graphic information by activating the "GRAPHICS" key 64, FIG. 1. Likewise, a user can also select the "MENU" key 66 to display information in the menu (text) mode. Those skilled in the art should appreciate that other keys, key names, and combinations of keys can be used in accord with the invention to select and/or display other information. For example, a print key 68 provides a command for printing the current display of the port 16, which therefore preferably includes an attached printer 70 connected via communication line 71.

Figure 4:
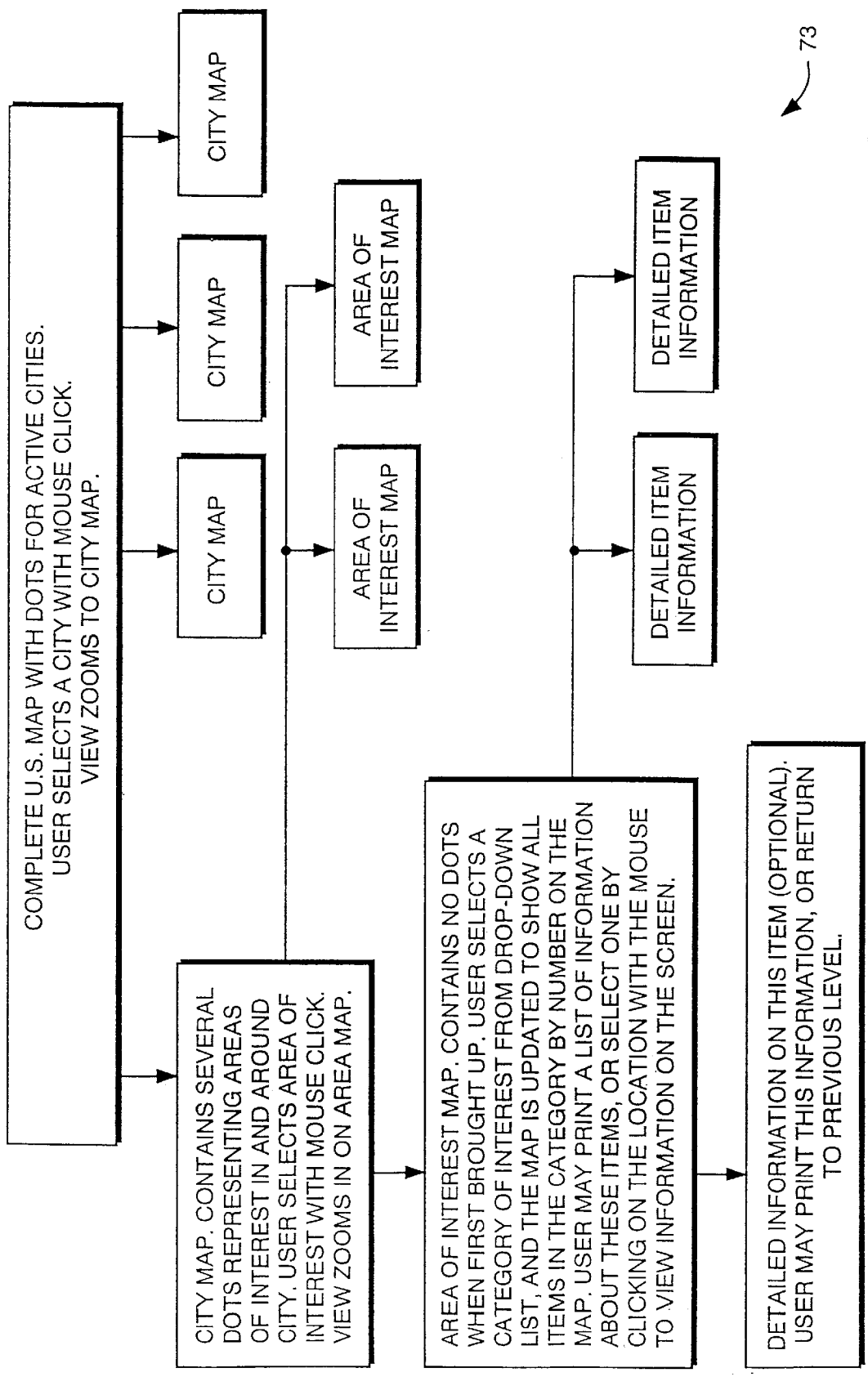
FIG. 4 illustrates a top level process flow, according to the invention, for providing information to a user at the remote port of FIG. 1.

FIG. 4 illustrates one embodiment of the invention showing a process flow 73 for providing information about selected items of interest to a user at the remote port. The flow 73 includes instructions at different levels of abstraction, such as at the U.S. level, city level, and at the specific areas of interest, which help a user to select and locate the items of interest.

Thus, it is preferred, according to the invention, that a user's selected display of items of interest within an associated category and geographic vicinity is accessed hierarchically within the database 12. As such, each set of positional coordinates corresponds to a discrete remote port location of one geographic vicinity.

Figure 4A:
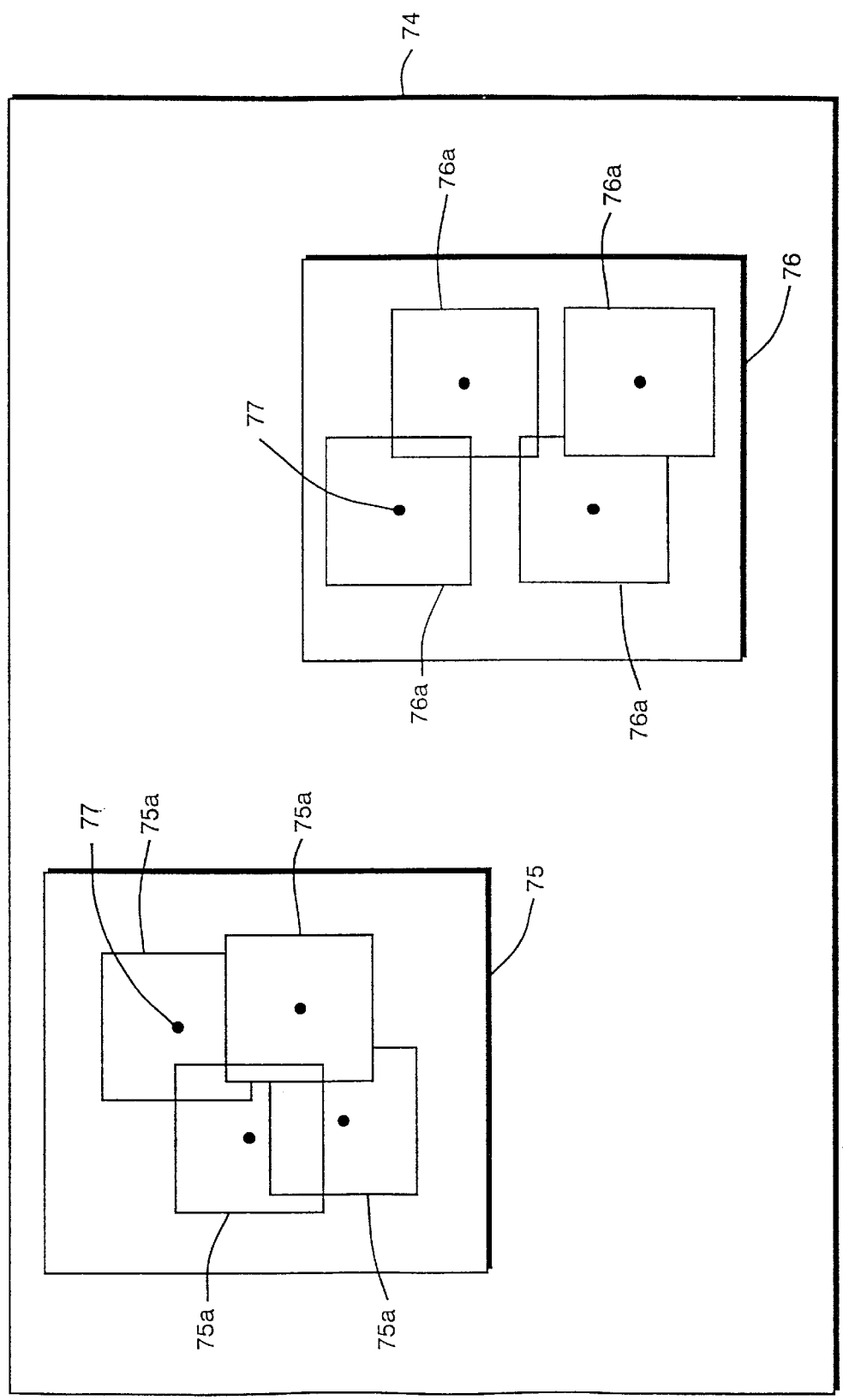
FIG. 4A shows a hierarchical structure of geographical vacinities, according to the invention.

FIGS. 4 and 4A illustrate this hierarchical approach. If, for example, a user at a remote port has commanded the display of one geographic vicinity (i.e., an area of interest map) and selects the display of a different geographic vicinity, it is necessary to first return to the associated city map, or even to the U.S. map, depending on the desired location, to access that different geographic vicinity.

FIG. 4A schematically illustrates this selection by way of a U.S. map 74 which includes two city maps 75, 76. The geographic vacinities 75a, 76a within each city map, respectively, are selectable by hierarchically selecting the appropriate city map first. In this manner, if a user is currently displaying one vicinity 74a, and desires a display of a vicinity 76a, the user must first successively select the city map 75, the U.S. map 74, and the city map 76. FIG. 4A also illustratively shows the positional coordinates 77 for each vicinity 75a, 76a.

Figure 5:
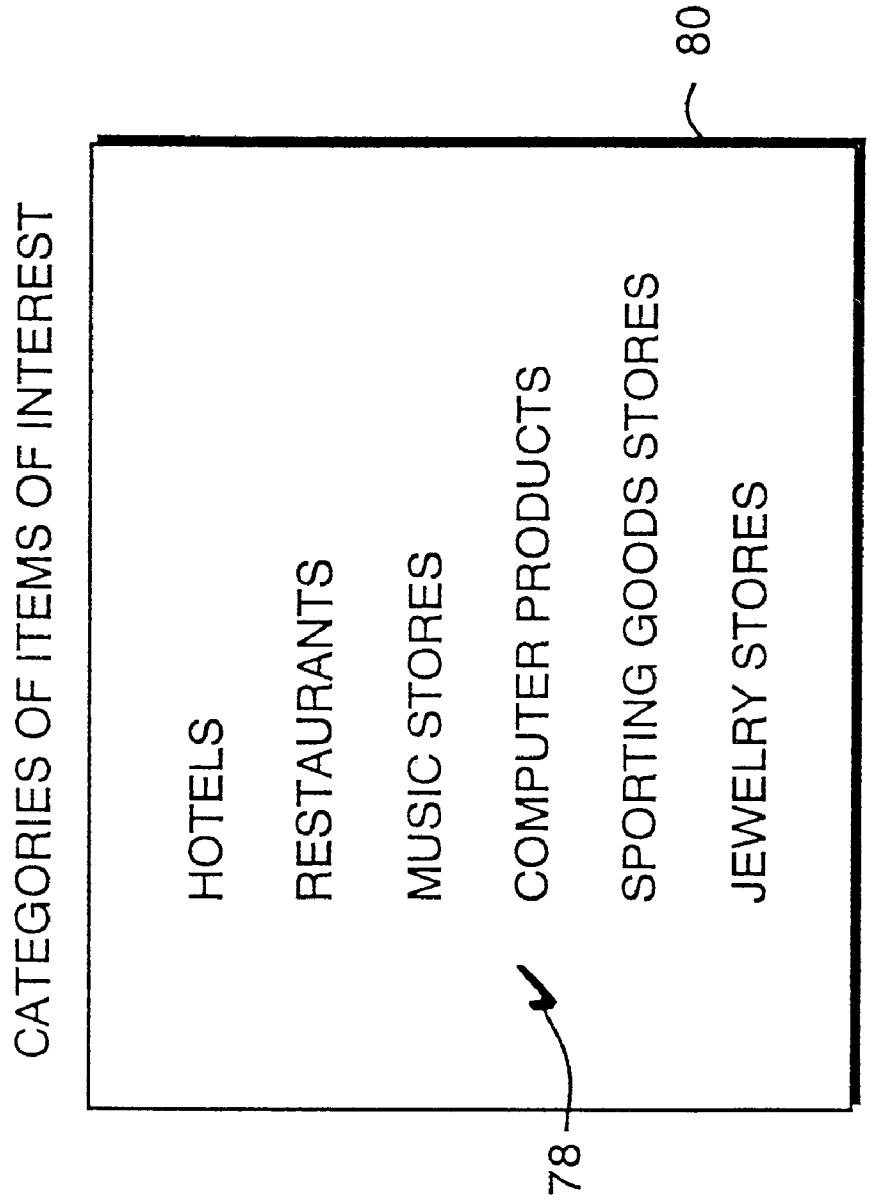
FIG. 5 shows a typical menu of categories of items of interest which are selectable by a user of the system of FIG. 1.

FIG. 5 illustrates one embodiment of the invention wherein a user selects the associated category for the items of interest from a display menu of possible items of interest. This display to select the category is preferably displayed upon activation of the remote port 16; or, alternatively, the display is commanded by a user of the system, such as by activating the "NEW SEARCH" key 76, FIG. 1. Accordingly, a user can start a new search for items of interest in a selected category by first pressing the "NEW SEARCH" key 76. Alternatively, a user can select an additional category by selecting the "ADD CATEGORY" key 46. In this manner, more than one category can be displayed at one time within the geographic vicinity.

By way of example, upon pressing the key 76, FIG. 5 illustrates one embodiment of the invention which provides a listing of possible categories of items of interest in a menu 78. A user of the system 10 can select any desired category in the menu, such as by pointing and clicking on the selected item. In this example, the user has selected "computer products," a category which was used in the illustration of FIG. 2 and which shows the selection by a check-mark 78. A user can thereafter press the "ADD CATEGORY" key 46 and select one other desired category in the menu, such as "sporting goods stores".

Alternative to the embodiment shown in FIG. 5, another embodiment of the invention provides a word association technique, known to those skilled in the art, which allows any category of items of interest to be selected by directly typing the desired search area. For example, a user of the invention could press the "NEW SEARCH" key 76 and thereafter type "computer equipment" or "computers," or other similar association, and the controller 14 of FIG. 1 would determine the best fit to the possible categories stored in the database 12 to display to the user. If the association were narrow enough, the system 10 immediately displays the items of interest within the "computer products" category, as above. However, if the search is too broad, the system can prompt the user for more information (such as known to those skilled in the art). By way of example, if a user types "computers," the system can question, or prompt, the user at the port 16 for "products," "services," or "rentals," which can thereafter be selected by the user.

The advantages of a system constructed according to the invention are several. Specifically, the invention provides a selectable display of items of interest at nearly any location, remote from the user, or centered relative to the user within the desired geographical vicinity. Further, once the display of the selected items of interest is isolated, the system provides a hard-copy for the user to walk away with. With increased usage of the invention, a corresponding increase in the number of remote access ports provides flexibility for users who can, thereby, access the system from widely accessible commercial locations, e.g., airports, car rental agencies, and train stations. In addition, the remote access port of the invention can be located at a user's home, providing even greater flexibility for those persons who regularly travel (or who regularly need information about items of interest at a selected geographic vicinity). A person's home computer system provides data processing capability which, with a modem and software configured to communicate with the database, can provide many, if not all, of the features of the remote access port 16 described above. As such, the remote access port of the invention can include personal computers, subnotebooks, notebooks, Apple's Newton product, facsimiles, phones, cellular, mainframes, minis, interactive television and/or hybrid products.

Figure 6A:
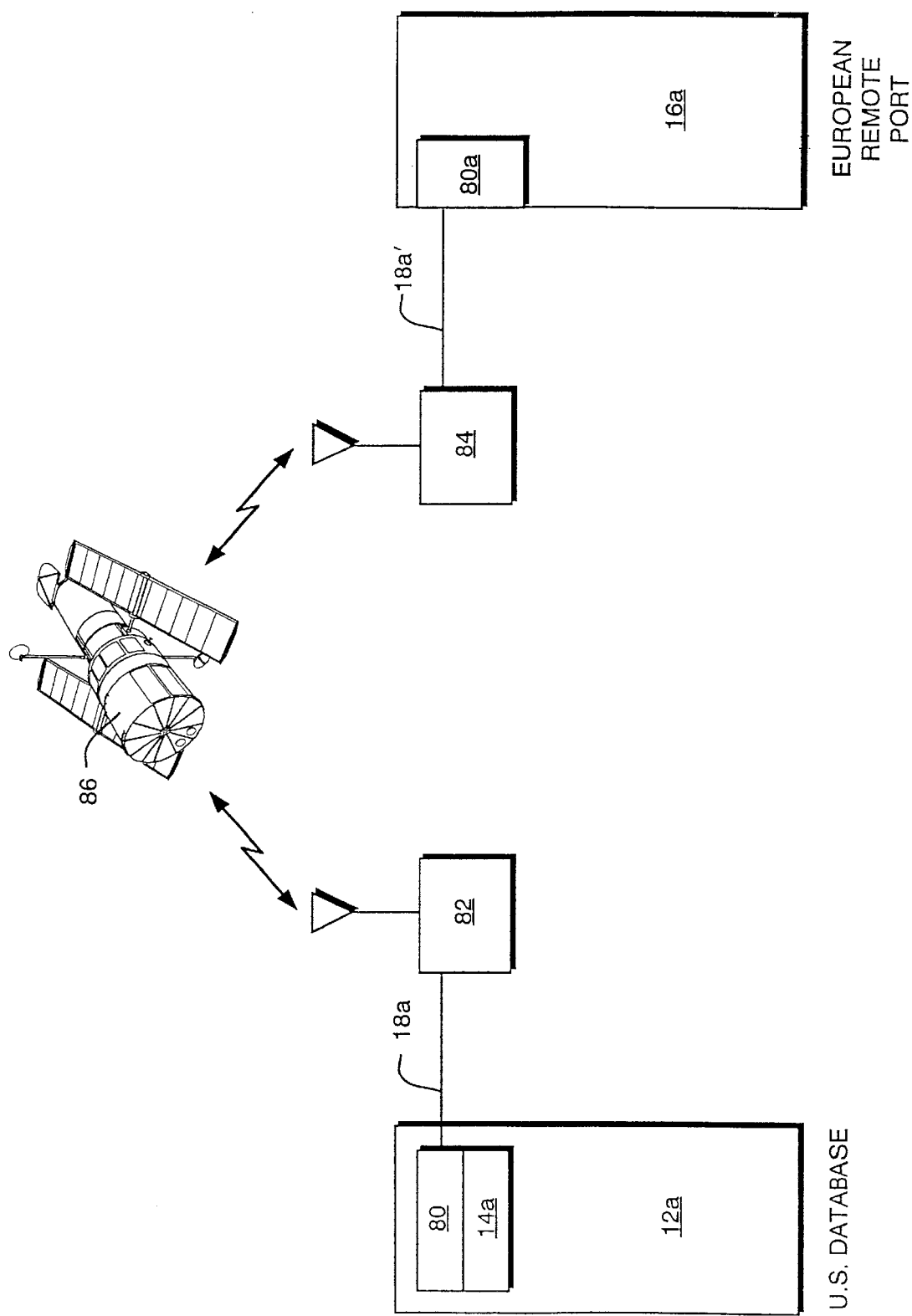
FIGS. 6A and 6B illustrate various components and methods, according to the invention, for constructing a communications link suitable for use in the system of FIG. 1.
Figure 6B:
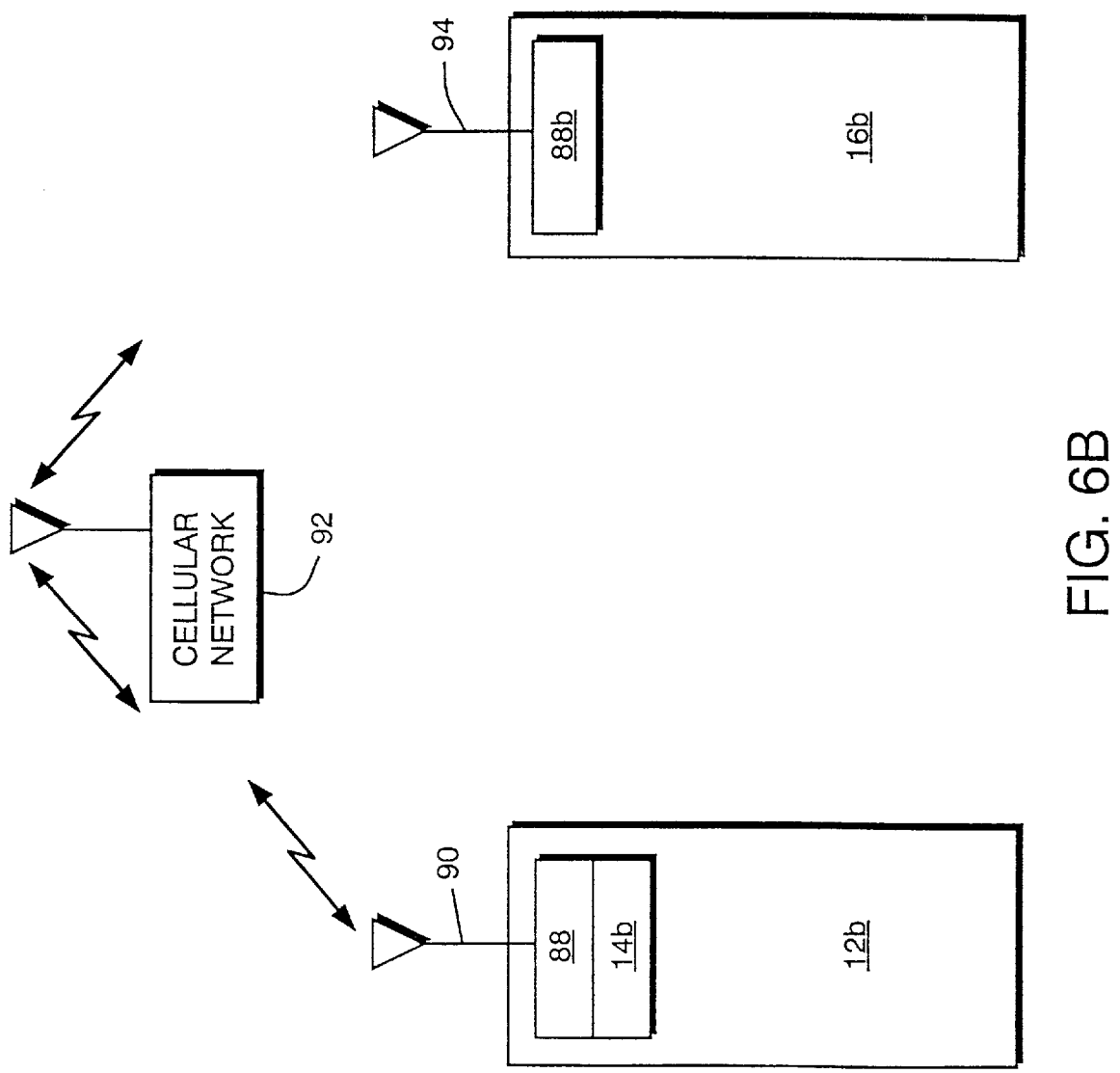

FIG. 6A illustrates a system, including a telephone-modem-satellite communications link, constructed according to the invention. Specifically, FIG. 6A shows a database 12a and controller 14a, which are illustratively located in the United States and which are similar to the database 12 and controller 14 of FIG. 1. The database and controller 12a, 14a connect and communicate with a remote port 16a, which is illustratively located in Europe and which is similar to the port 16 of FIG. 1. A modem 80 couples to the controller 14a, such as known to those skilled in the art, and further to a telephone line 18a. The telephone line 18a connects through the telephone network to the telephone relay center 82 which provides communications, such as overseas communications, to a remote relay center 84 via a satellite 86. The relay center 84 connects to the remote port 16a (including an internal modem 80a) by the land-based telephone line 18a' so that, in combination, a user of the remote port 16a can access information from the database such as described above.

It should be apparent to those skilled in the art, for example, that the lines 18a and 18a' can also be constructed with fiber-optic cabling, co-axial cabling, internet communications and the like.

FIG. 6B illustrates other embodiments of the invention for communicating between (i) the database 12b and controller 14b and (ii) the remote port 16b. A cellular communicator 88 connects to the controller 14b and communicates, via an antennae 90, with the established cellular communications network 92. The communications link is completed with the remote port 16b, including its own antenna 94 and cellular communicator 88b, so that a user of the port 16b can communicate, as above, with the database 12b.

It should again be apparent to those skilled in the art that the communications methods described and illustrated herein can be modified, in accord with the invention, to form other communication links. For example, portions of the communications link of FIG. 6A can be mixed with portions of the link of FIG. 6B to establish a working and acceptable link according to the invention.

Further, the communications link of FIG. 6B can be replaced with other communications mechanisms known to those in the art. For example, the antennas 90, 94 and communicators 88, 88b can be replaced by radiowave or microwave devices which communicate via a compatible network instead of a cellular network 92.

FIG. 7A illustrates one embodiment of the invention wherein a display 22c, such as the display 22 of FIG. 1, includes—or is replaced by—a hard-copy printer 100, such as a computer printer or facsimile. In such an embodiment, a user at the port 16c receives a hard-copy 102 of the interactive communications between the port 16c and the database 12, FIG. 1. As above, the user commands selective display of data via the keyboard 24c and/or mouse tracker 25c, and a display of the geographic vicinity with the selected items of interest in the selected category are provided via the printer 100.

It should be apparent to those skilled in the art that one acceptable remote port, according to the invention, includes a port comprising a printer 100 and a telephone (not shown). In such an embodiment, a user accesses the database by telephoning the database and requesting a display of items of interest in the selected category and geographic vicinity. The controller 14 of FIG. 1 can include voice recognition software and hardware, known to those skilled in the art, which prompts the user for requests and identifies and responds to the user's verbal replies. After identifying the user's desired category and present location (or intended destination location), the database transmits information in a form recognizable by the printer 100 so that the geographic vicinity and items of interest are displayed to the user at the telephone/printer remote port.

Alternatively, a user can fax selections for the category and geographic vicinity of interest as a hard-copy. A system administrator at the database can interpret the user's selection sheet and command the transmission of the requested information, including the items of interest, back to the user. Alternatively, the database can interpret the user's selections on the sheet to automatically respond and transmit the appropriate display of information, including the items of interest, to the user.

FIG. 7B shows another remote port 16d which includes a voice generation system 110 and speaker 112. In such an embodiment, a user at the port 16d (i) listens to questions, or reads messages on the display 22d, as prompted by the database, and (ii) answers the questions by the keyboard 24d. After the system identifies the user's desired geographic location and category, a print-out or display of the information is made available to the user, such as described above.

Figure 8:
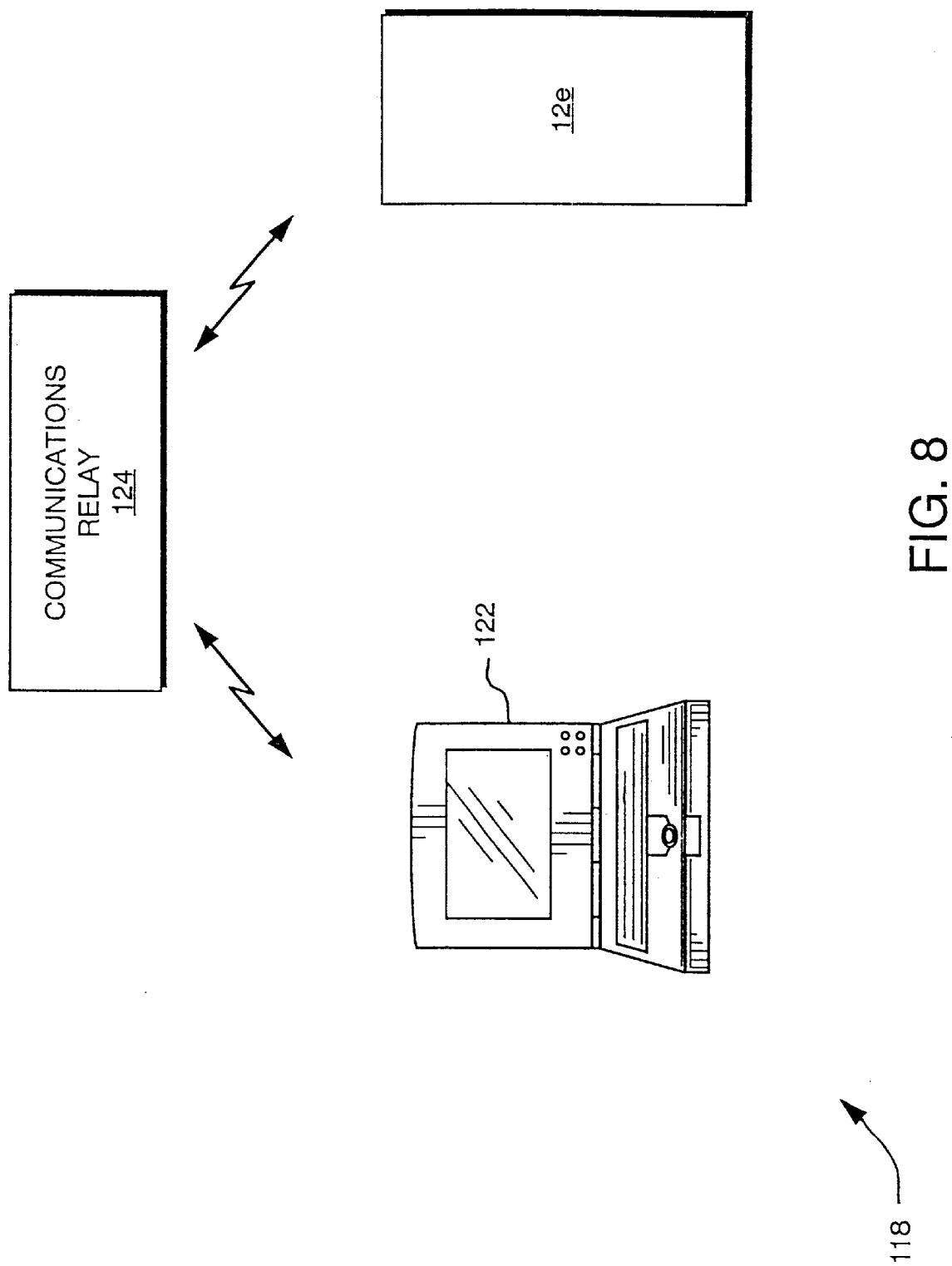
FIG. 8 illustrates a system constructed according to the invention and which includes a mobile remote port for accessing the locations of the selected items of interest.

FIG. 8 illustrates a mobile remote system 118 constructed according to the invention. A user holds one of several hand-held devices 122 which provide both display capability and transmit/receive capability to a remote relay 124, e.g., a cellular or radiowave communication relay. The device 122 thus operates as the remote port 16 of FIG. 1. The device 122 can additionally include a GPS receiver to accurately determine the user's positional coordinates in real-time, or a PCM CIA Type II or Type III modem interface which can be miniaturized to credit card size. Alternatively, the user can specify his position coordinates and transmit that information to the database 12e. In this illustrated embodiment, the system 118 continually redefines the geo-definition of the geographic vicinity based upon the positional coordinates of the user. Data is assembled and maintained using the positional coordinates to generate a map of the geographic vicinity relative to the user and including the locations of the items of interest. As above, this geographic vicinity is assumed to be within a walking distance of the user; however, the user can select a greater radius for display, or another destination location, as needed.

The invention generally incorporates software to facilitate the several embodiments described herein and to support the principles of the invention. As known to those in the art, the data within the database can be maintained, for example, on a SQL-server, or in xBASE. The software is preferably portable to other operating systems, such as to Apple, Apple/IBM, Unix, DEC, OS/2, DOS, Windows 3.1, Windows '95; and preferably allows scalability to 64-bit architectures and greater, as technology advances.

In accord with the invention, software code supporting the database interaction with the remote port can include object-oriented programming, Visual Basic, and other software architectures configured to allow user interaction, portability to other platforms, interface with the internet or other gateways, and relational management.

FIG. 9 illustrates one embodiment of database architecture 130 which is suitable for use as the database 12 of FIG. 1. Specifically, the architecture 130 includes separate phone and fax interfaces, 131, 132, respectively, to interface with any one of the remote ports, e.g., the port 16 of FIG. 1. FIG. 10 illustrates system architecture including database architecture 140 and remote port architecture 141 connected via a pair of phone lines 142, 143 to, respectively, a touch-tone phone 142a and fax machine 143a. In this manner, a user 144 can make requests and listen to responses on the phone 142a, and receive maps and instructions via the fax machine 143a.

Other modules within the database architectures 130 and/or 140 include the following:

Communications managers 133, 133' (FIGS. 9 and 10, respectively) handle all data transfers for a single internal modem (or telephone interface controller) 131 in the host database, e.g., a personal computer. It responds to remote requests for data by passing the requests to a session manager 138, and handles all modem control issues, such as answering incoming calls. The communications manager 133' of FIG. 10 is configured to service users who access the database from a remote port comprising a dial-up telephone 142a. As such, the manager 133' translates touch-tone inputs into data and fax transmission requests to be sent to the session manager 138, and monitors the line 142 for time-outs when a user 144 forgets to actively disconnect. The manager 133' can also translate data from the session manager 138 into synthesized voice output for presentation to an end user 144.

The fax manager 134 handles all requests from the session manager 138 to fax and receive documents to and from end users connected through a communications link.

Because there generally are a plurality of remote ports arranged for access to the system database, there are preferably a plurality of communications managers 133 and modems 131 to service requests from the remote ports. Likewise, although the database generally includes one fax manager 134 and one interface 132, a plurality of fax managers 134 and fax machine interfaces 132 can be incorporated therein. Accordingly, the host database can answer and service a variety of remote ports simultaneously.

The session manager 138 tracks and controls information for each active session being hosted by the database architecture. It responds to requests for data passed to it by each communications manager 133 operating in the database architecture, and prioritizes, queues, and forwards these data requests to the end user data server 136. The manager 138 also forwards data requests to the system data server 137 (FIG. 9 only) to log certain system information, such as user connection times, errors, system utilization, and other administrative functions.

In FIGS. 9 and 10, database storage memory 139 stores information which is accessible by the end user data server 136 and which is responsive to user requests, including the selected city, locations of items of interest, maps of geographic vacinities, and advertising information. In FIG. 10, an additional database storage memory 139a stores information which is accessible by the system data server 137 and which stores information such as system usage and transaction logging.

The end user data server 136 responds to requests from the session manager 138 by providing data that has been requested for transmission to the remote port. This data includes that information required to place items of interest on the selected geographic vicinity. Preferably, the end user data server 136 is the only mode of access to the specific map data, and thus all requests for this data are made through this server.

In FIG. 9, the system data server 137 interacts with the session manager 138 to record system administrative data. The server 137 responds to requests from the session manager 138 to provide or record information used to track system usage, system response times, user preferences, and other data items that are used to optimize the different modules within the architecture 130.

The flow and control of information by the information controller 14, FIG. 1, can include several of the functions shown illustratively in FIG. 11. Specifically, a display manager 150 controls the drawing of maps (i.e., geographic vacinities) on the screen 22 and further controls status messages to a user of the system. The manager 150 responds to requests for screen updates and status message display from a system kernel module 159, described in more detail below. It also sends requests to a map manager 151 when rendering maps to the display, and sends requests to a data manager 152 in order to obtain system information required to update the display 22 or to present status messages to the user.

A map manager 151 manages map data and provides data for drawing maps to the display manager 150. The manager 151 responds to requests from the display manager 150 by providing information appropriate to the current context of the session, such as the graphical image (e.g., the geographic vicinity and advertising information) that needs to be displayed, the locations on the screen 22 of the items of interest, and the location and content of the titles of the items of interest.

A data manager 152 handles all data requests from the system kernel module 159, map manager 151, and print manager 153, and further interfaces to external data sources 155, 156 (these databases 155, 156 store raw data as the database information). The manager 152 determines the need for remote data access via a communications manager 157, and passes on remote data requests to the manager 157. The manager 152 also provides all data access services to other managers and modules within the controller 14. For example, if the data is not stored locally, the data manager 152 sends a request to the communications manager 157 to provide the desired data.

A print manager 153 handles and controls printing activities in the system, such as to a connected printer 154 (similar to the printer 110, FIG. 7C; or such as a printer connected directly to the database 12). By way of example, the manager 153 requests map and other data from the data manager 152 to create and print outputs requested by the system kernel module 159. Specifically, the manger 153 responds to requests from the system kernel module 159 for print services, and sends requests to the data manager 152 based upon the system kernel requests. The manager 153 uses the information supplied by the data manager 152 to create formatted output for printing, such as by utilizing a standard Windows™ print driver interface to print the requested output.

The communications manager 157 handles all remote communications requirements, including remote data requests, and further accepts and transfers raw data from a remote data source 158 (such as data downloads to modify or add to data within the database). The manager 157 responds to requests from the system kernel module 159 for initialization, connection, and shutdown of remote connections appropriate with the actual hardware in use. It also responds to remote data requests from the data manager 152 by sending the request for remote data to the remote data source 158. When the remote data source 158 responds to the request, the communications manager 157 passes that response on to the data manager 152.

The system kernel module 159 traps all user inputs and determines required actions in the system, including those actions responsive to a user's inputs 160 (such as described above in connection with the keyboard 24). Specifically, the module 159 responds to mouse movements, mouse button clicking, and typing. Depending on the user's input, the module 159 will send requests for services to (i) the display manager 150 to update the display, (ii) the data manager 152 to provide information concerning the map and/or other system needs, (iii) the print manager for printing services, and (iv) the communications manager 157 for remote communications services.

FIG. 12 illustrates one preferred embodiment of the invention wherein certain advertising information is included within, or attached to, the geographic vicinity which is displayed or printed to a user at a remote port. For example, FIG. 12 shows one illustrative geographic vicinity 30' which was shown previously in FIG. 2, except that an advertisement 180 is displayed as part of that vicinity (the advertisement 180 is generically shown with the text "ADVERTISEMENT," when, in fact, a paying customer's name or company is usually displayed at that location). In the normal use of the invention, the advertiser who pays for the advertisement is generally associated with the items of interest being displayed. For example, a credit card bank or sporting goods manufacturer typically specify (and pay for) the "advertisement" logo or wording.

It should be apparent to those skilled in the art that any of the items of interest within a displayed geographic vicinity can be selected by a user and that the database can thereafter supply additional detail about that selected item of interest. In such an embodiment of the invention, the database is configured to store such additional detail and also to transmit this information to the remote port when selected. The remote port, in turn, displays the information for the user. By way of example, if the selected category is "restaurants" and a user selects a particular restaurant (i.e., one of the items of interest), a display of additional detail can, for example, include a digital picture of the layout of the dining room or bar. Additionally, the entertainment scheduled for that evening can be displayed while a recording of any associated music is played at the remote port's speakers.

Thus, a further embodiment of the invention includes a digitized, multi-media presentation that is transmitted to the remote port when an associated item of interest is selected. Using a camrecorder and/or other video capture, storage, and editing analogue or digital devices, for example, a short video clip is embedded in the data associated with the information about the items of interest and transmitted and displayed when selected.

In order to utilize the above-described multi-media presentation, the system of the invention must provide sufficient bandwidth, processing speed, and display resolution, and the remote port must display the multi-media transmissions with sufficient speed and resolution so as to be convenient to the user of that information. Typically, the minimum central processing unit of the database and remote port run at least at 16 MHZ and is based on a CISC (complex instruction set) architecture. Further, the database, remote port and communications link should be able to transmit data at an uncompressed speed of 9600 baud per second; preferably, these devices should be faster, e.g., 28.8 Kbps, utilizing modems that subscribe to emerging industry standards such as V.34. Additionally, special connections may be required at the server, including what are known to those skilled in the art as SLIP, PPP, and TC/ICP protocols. In some cases, where additional bandwidth may be required, the modem is replaced with special interfaces provided by regional telecommunications systems that also provide dedicated optic fiber cabling. Some of those linkages are known as T1, ISDN, and 56 Kbps wide band-width connections. In addition, bandwidth may be enhanced by microwave and other communication links that do not require direct cabled connections.

The invention thus attains the objects set forth above, in addition to those apparent from the preceding description. Since certain changes may be made in the apparatus and methods described herein without departing from the scope of the invention, it is intended that all matter contained in the above description or shown in the accompanying drawing be interpreted as illustrative and not in a limiting sense.

It is also understood that the following claims cover all the specific and generic features of the invention described herein, and all statements of the scope of the invention which, as a matter of language, might be said to fall there between.

What is claimed is:

1. System for remotely determining the position of a selected category of items of interest in a selected geographic vicinity from a database, the system comprising
   (A) a database for storing information about a plurality of items of interest, the information including, for each of the items of interest, a geographical position and at least one associated category,
   (B) a communications link for communicating between a user of the system and the database,
   (C) an information controller for transmitting a portion of the information in the database to the user via the link upon receipt of a request signal representative of a selected category and geographic vicinity, the transmitted portion of the information including identification of geographic position for at least one of the items of interest within the selected category and geographic vicinity, and (D) a port for remotely accessing the portion of information via the link, the port generating the request signal in response to inputs by the user which are representative of the selected category and geographic vicinity, the port having a user interface for accepting the inputs and for indicating to the user the position at least one of the items of interest in the selected category and geographic vicinity.

2. System according to claim 1, wherein the link comprises a telephone link.

3. System according to claim 1, wherein the link comprises a satellite link.

4. System according to claim 1, wherein the link comprises a radio-frequency link.

5. System according to claim 1, wherein the link comprises an infra-red link.

6. System according to claim 1, wherein the link comprises an Internet link.

7. System according to claim 1, wherein the database is selected from the group consisting of a personal computer, mainframe, work-station, mini-computer, and a digital data processor.

8. System according to claim 1, wherein the port comprises a phone.

9. System of claim 8, wherein the communications link comprises a cellular communications link.

10. System of claim 1, wherein the port comprises an audible speaker.

11. System of claim 1, wherein the port comprises a personal computer.

12. System of claim 11, wherein the communications link comprises the Internet.

13. System according to claim 1, wherein the geographic vicinity comprises spatial detail of the items of interest.

14. System according to claim 1, wherein the geographic vicinity comprises a map of the items of interest in the selected category and geographic vicinity.

15. System according to claim 1, wherein the port interprets the inputs by the user and formulates the inputs into the request signal.

16. System according to claim 1, wherein the database interprets certain of the inputs at the port as items or interest and for transposing such inputs into a selected category automatically.

17. System of claim 1, further comprising a plurality of ports, each of the plurality of ports having a user interface for accessing at least part of the information from the database in response to user inputs at the user interface.

18. System according to claim 1, wherein the portion of information comprises additional detail for at least one of the items of interest.

19. System according to claim 18, wherein the additional detail comprises video.

20. System of claim 19, wherein the communications link comprises the Internet.

21. System of claim 19, wherein the communications link comprises cellular communications.

22. System according to claim 18, wherein the additional detail comprises prerecorded music.

23. System of claim 22, wherein the communications link comprises the Internet.

24. System of claim 22, wherein the communications link comprises cellular communications.

25. System according to claim 18, wherein the additional detail comprises digital pictures.

26. System of claim 25, wherein the communications link comprises the Internet.

27. System of claim 25, wherein the communications link comprises cellular communications.

28. System according to claim 18, wherein the additional detail comprises an advertisement.

29. System of claim 28, wherein the communications link comprises the Internet.

30. System of claim 28, wherein the communications link comprises cellular communications.

31. System according to claim 1, wherein the information comprises an advertisement associated with at least one of the items of interest.

32. System according to claim 1, wherein the information comprises a plurality of geographic vicinities, the port hierarchically selecting any of the vicinities via the user interface.

33. Database for storing information about a plurality of items of interest, the information including, for each of the items of interest, a geographic position and at least one associated category, comprising (A) a communications link for communicating between the database and a plurality of remote ports, and (B) an information controller for transmitting a portion of the information to at least one of the ports via the link upon receipt of a request signal representative of a selected category and geographic vicinity, the transmitted portion of the information including identification of a position for at least one of the items of interest within the selected category and geographic vicinity.

34. Database according to claim 33, wherein the link comprises a telephone link.

35. Database according to claim 33, wherein the link comprises a satellite link.

36. Database according to claim 33, wherein the link comprises a radio-frequency link.

37. Database according to claim 33, wherein the link comprises an infra-red link.

38. Database according to claim 33, wherein the link comprises an Internet link.

39. Database according to claim 33, wherein the link comprises a coaxial cable link.

40. Database according to claim 33, wherein the link comprises a television link.

41. Database according to claim 33, further comprising at least one port for generating the request signal in response to user inputs, the port being selected from the group of phones and computers.

42. Database according to claim 33, wherein the identification at least one of the items of interest comprises spatial detail of the one item of interest.

43. Database according to claim 33, wherein the portion of information comprises a map of the items of interest in the selected category and geographic vicinity.

44. Database according to claim 33, wherein the information comprises additional detail for at least one of the items of interest.

45. Database according to claim 33, wherein the information comprises an advertisement associated with at least one of the items of interest.

46. Database according to claim 33, wherein the information comprises a plurality of geographic vicinities, a user at any of the remote ports hierarchically accessing the vicinities through user inputs at the remote port.

47. Remote access port for remotely accessing a selected category of items of interest in a selected geographic vicinity from a remote database, the database being of the type which stores information about a plurality of items of interest, the information including, for each of the items of interest, a geographical location and at least one associated category, the remote access port generating a request signal representative of a selected category and a selected geographic vicinity of the items of interest in response to inputs by the user, the remote access port having a user interface for accepting the inputs and for indicating to the user the position of at least one of the items of interest within the selected category and geographic vicinity.

48. Remote access port according to claim 47, wherein the user interface comprises a television.

49. Remote access port according to claim 47, wherein the user interface comprises a telephone.

50. Remote access port according to claim 47, wherein the user interface comprises a facsimile.

51. Remote access port according to claim 47, wherein the user interface comprises an audible speaker.

52. Remote access port according to claim 47, wherein the user interface comprises a personal computer.

53. Remote access port according to claim 47, wherein the user interface comprises a phone connected to the database via a communications link, the link comprising a cellular communications link.

54. Remote access port according to claim 47, wherein the port interprets certain of the inputs as items or interest and transposes such inputs into a selected category automatically.

55. Remote access port according to claim 47, wherein the information comprises additional detail for at least one of the items of interest.

56. Remote access port according to claim 47, wherein the information comprises an advertisement associated with at least one of the items of interest.

57. Remote access port according to claim 47, wherein the information comprises a plurality of geographic vicinities, a user at the port hierarchically selecting any of the vicinities via user inputs.

58. A method for remotely determining the position of each of a selected category of items of interest in a selected geographic vicinity from a database, comprising the steps of:
 (i) storing information about a plurality of items of interest in the database, the information including, for each of the items of interest, a geographic location and at least one associated category;
 (ii) accessing the database from a remote port and over a communication link;
 (iii) communicating, from the remote port, information representative of a selected category and a selected geographic vicinity to the database; and
 (iv) transmitting a portion of the information from the database and to the user over the link, the information including, at least, identification of the position for one or more of the items of interest within the selected geographic vicinity.

59. A method according to claim 58, wherein the steps of communicating further comprises communicating over a cellular communications link.

60. A method according to claim 59, wherein the step of accessing comprises accessing the database through a phone.

61. A method according to claim 58, wherein the step of communicating further comprises communicating over the Internet.

62. A method according to claim 58, wherein the step of transmitting a portion of the information further comprises the step of communicating over a cellular communications link.

63. A method according to claim 58, wherein the step of transmitting a portion of the information further comprises the step of communicating over the Internet.

* * * * *

US006385622C1

(12) EX PARTE REEXAMINATION CERTIFICATE (7072nd)

United States Patent
Bouve et al.

(10) Number: US 6,385,622 C1
(45) Certificate Issued: *Sep. 22, 2009

(54) SYSTEM AND METHODS FOR REMOTELY ACCESSING A SELECTED GROUP OF ITEMS OF INTEREST FROM A DATABASE

(75) Inventors: W. Lincoln Bouve, Milton, MA (US); William T. Semple, Arlington, VA (US); Steven W. Oxman, Riva, MD (US)

(73) Assignee: Civix-DDI LLC

Reexamination Request:
No. 90/008,192, Sep. 20, 2006

Reexamination Certificate for:
Patent No.: 6,385,622
Issued: May 7, 2002
Appl. No.: 09/816,626
Filed: Mar. 23, 2001

(*) Notice: This patent is subject to a terminal disclaimer.

Related U.S. Application Data

(63) Continuation of application No. 08/920,044, filed on Aug. 28, 1997, now Pat. No. 6,408,307, which is a continuation of application No. 08/371,425, filed on Jan. 11, 1995, now Pat. No. 5,682,525.

(51) Int. Cl.
*G06F 17/30* (2006.01)
*H04L 29/08* (2006.01)

(52) U.S. Cl. ............. 707/104.1; 701/208; 701/213; 707/4; 707/10; 707/E17.018

(58) Field of Classification Search ............. 370/312; 340/541; 707/203; 715/201
See application file for complete search history.

(56) References Cited

U.S. PATENT DOCUMENTS

| | | | |
|---|---|---|---|
| 1,737,520 A | 11/1929 | Richardson, Jr. | |
| 2,455,209 A | 11/1948 | Anderson | |
| 2,455,210 A | 11/1948 | Anderson | |
| 3,612,837 A | 10/1971 | Brandau | |
| 3,614,328 A | 10/1971 | McNaughton et al. | |
| 3,724,079 A | 4/1973 | Jasperson et al. | |
| 3,949,191 A | 4/1976 | Crowther et al. | |
| 3,968,573 A | 7/1976 | Poliniere | |
| 4,012,133 A | 3/1977 | Burton | |
| 4,086,632 A | 4/1978 | Lions | |

(Continued)

FOREIGN PATENT DOCUMENTS

| | | |
|---|---|---|
| DE | 4033829 | 4/1991 |
| EP | 0051228 | 5/1982 |
| EP | 0066397 | 8/1982 |

(Continued)

OTHER PUBLICATIONS

"Starting today, the way you find a home will never be the same," HomeView, Inc. screen shots, Nov. 13, 1991, Bates Nos. HOME005930–HOME0059360, Exhibit 1 to the Declaration of Robert Norton.

(Continued)

*Primary Examiner*—Christopher E Lee

(57) ABSTRACT

A user can access a common database from a remote communications port, at any qualified location, to generate a map or other positional information which locates selected items of interest, e.g., businesses, stores, architectural sites, and the like. The database contains information representing the items of interest, including, for each of the items of interest, positional coordinates, a geographic vicinity, and a selected category. The positional coordinates discretely locate the vicinity, while the vicinity specifies the exact locations of the items of interest in the selected category. For example, a user in New York can select the display of sporting shops in the area surrounding Chicago O'Hara International Airport selectively. A user can also access a port and display locations of items of interest within the same vicinity as the user and relative to the user's position. The database can be modified from qualified remote locations to change, or add to, the information therein. An advertisement can be tagged to the display or print out as an association with the selected items of interest.

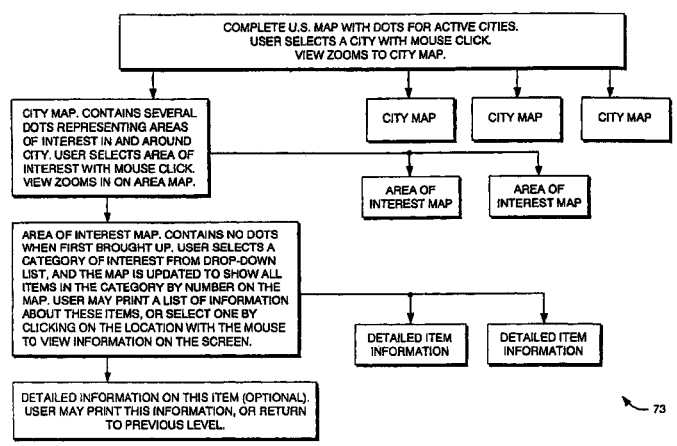

U.S. PATENT DOCUMENTS

| | | |
|---|---|---|
| 4,220,994 A | 9/1980 | Hendrickson |
| 4,253,150 A | 2/1981 | Scovill |
| 4,301,506 A | 11/1981 | Turco |
| 4,311,876 A | 1/1982 | Endo et al. |
| 4,312,041 A | 1/1982 | DeJonge |
| 4,312,577 A | 1/1982 | Fitzgerald |
| 4,315,747 A | 2/1982 | McBryde |
| 4,360,875 A | 11/1982 | Behnke |
| 4,395,740 A | 7/1983 | Yuen et al. |
| 4,400,727 A | 8/1983 | Aron |
| 4,400,780 A | 8/1983 | Nagao et al. |
| 4,413,314 A | 11/1983 | Slater et al. |
| 4,413,322 A | 11/1983 | Foster et al. |
| 4,419,079 A | 12/1983 | Georges et al. |
| 4,428,057 A | 1/1984 | Setliff et al. |
| 4,429,385 A | 1/1984 | Cichelli et al. |
| 4,466,125 A | 8/1984 | Kanayama |
| 4,470,119 A | 9/1984 | Hasebe et al. |
| 4,481,584 A | 11/1984 | Holland |
| 4,484,192 A | 11/1984 | Seitz et al. |
| 4,502,123 A | 2/1985 | Minami et al. |
| 4,504,913 A | 3/1985 | Miura et al. |
| 4,511,973 A | 4/1985 | Miura et al. |
| 4,513,377 A | 4/1985 | Hasebe et al. |
| 4,514,810 A | 4/1985 | Ito et al. |
| 4,521,857 A | 6/1985 | Reynolds, III |
| 4,525,717 A | 6/1985 | Wildermuth et al. |
| 4,527,155 A | 7/1985 | Yamaki et al. |
| 4,528,552 A | 7/1985 | Moriyama et al. |
| 4,532,514 A | 7/1985 | Hatano et al. |
| 4,538,229 A | 8/1985 | Baltzer et al. |
| 4,543,572 A | 9/1985 | Tanaka et al. |
| 4,546,439 A | 10/1985 | Gene Esparza |
| 4,546,873 A | 10/1985 | Debenham et al. |
| 4,550,317 A | 10/1985 | Moriyama et al. |
| 4,558,300 A | 12/1985 | Goldman |
| 4,570,227 A | 2/1986 | Tachi et al. |
| 4,571,684 A | 2/1986 | Takanabe et al. |
| 4,577,062 A | 3/1986 | Hilleary et al. |
| 4,608,656 A | 8/1986 | Tanaka et al. |
| 4,630,209 A | 12/1986 | Saito et al. |
| 4,635,136 A | 1/1987 | Ciampa et al. |
| 4,635,202 A | 1/1987 | Tsujii et al. |
| 4,642,775 A | 2/1987 | Cline et al. |
| 4,645,873 A | 2/1987 | Chomet |
| 4,646,089 A | 2/1987 | Takanabe et al. |
| 4,673,197 A | 6/1987 | Shtipelman et al. |
| 4,675,676 A | 6/1987 | Takanabe et al. |
| 4,677,450 A | 6/1987 | Ito et al. |
| 4,679,147 A | 7/1987 | Tsujii et al. |
| 4,682,160 A | 7/1987 | Beckwith, Jr. et al. |
| 4,685,068 A | 8/1987 | Greco, II et al. |
| 4,689,747 A | 8/1987 | Kurose et al. |
| 4,697,281 A | 9/1987 | O'Sullivan |
| 4,698,625 A | 10/1987 | McCaskill et al. |
| 4,698,626 A | 10/1987 | Sato et al. |
| 4,706,081 A | 11/1987 | Hart et al. |
| 4,706,198 A | 11/1987 | Thurman |
| 4,714,989 A | 12/1987 | Billing |
| 4,714,995 A | 12/1987 | Materna et al. |
| 4,716,404 A | 12/1987 | Tabata et al. |
| 4,733,356 A | 3/1988 | Haeussermann et al. |
| 4,737,916 A | 4/1988 | Ogawa et al. |
| 4,737,927 A | 4/1988 | Hanabusa et al. |
| 4,744,033 A | 5/1988 | Ogawa et al. |
| 4,744,083 A | 5/1988 | O'Neill et al. |
| 4,757,267 A | 7/1988 | Riskin |
| 4,757,455 A | 7/1988 | Tsunoda et al. |
| 4,758,959 A | 7/1988 | Thoone et al. |
| 4,760,531 A | 7/1988 | Yasui et al. |
| 4,761,742 A | 8/1988 | Hanabusa et al. |
| 4,763,270 A | 8/1988 | Itoh et al. |
| 4,766,555 A | 8/1988 | Bennett |
| 4,774,670 A | 9/1988 | Palmieri |
| 4,774,672 A | 9/1988 | Tsunoda et al. |
| 4,779,138 A | 10/1988 | Nomura et al. |
| 4,780,717 A | 10/1988 | Takanabe et al. |
| 4,782,447 A | 11/1988 | Ueno et al. |
| 4,788,643 A | 11/1988 | Trippe et al. |
| 4,791,572 A | 12/1988 | Green, III et al. |
| 4,796,189 A | 1/1989 | Nakayama et al. |
| 4,796,190 A | 1/1989 | Cummings |
| 4,805,119 A | 2/1989 | Maeda et al. |
| 4,812,443 A | 3/1989 | Takak et al. |
| 4,812,843 A | 3/1989 | Champion, III et al. |
| 4,812,980 A | 3/1989 | Yamada et al. |
| 4,817,043 A | 3/1989 | Brown |
| 4,827,420 A | 5/1989 | Musa |
| 4,839,656 A | 6/1989 | O'Neill et al. |
| 4,843,569 A | 6/1989 | Sawada et al. |
| 4,845,631 A | 7/1989 | Bottorf |
| 4,862,374 A | 8/1989 | Ziemann |
| 4,862,390 A | 8/1989 | Weiner |
| 4,866,704 A | 9/1989 | Bergman |
| 4,868,771 A | 9/1989 | Quick et al. |
| 4,870,576 A | 9/1989 | Tornetta |
| 4,872,157 A | 10/1989 | Hemmady et al. |
| 4,872,158 A | 10/1989 | Richards |
| 4,872,159 A | 10/1989 | Hemmady et al. |
| 4,872,160 A | 10/1989 | Hemmady et al. |
| 4,873,513 A | 10/1989 | Soults et al. |
| 4,875,206 A | 10/1989 | Nichols et al. |
| 4,890,104 A | 12/1989 | Takanabe et al. |
| 4,890,249 A | 12/1989 | Yen |
| 4,893,127 A | 1/1990 | Clark et al. |
| 4,894,824 A | 1/1990 | Hemmady et al. |
| 4,896,154 A | 1/1990 | Factor et al. |
| 4,896,319 A | 1/1990 | Lidinsky et al. |
| 4,897,792 A | 1/1990 | Hosoi |
| 4,899,333 A | 2/1990 | Roediger |
| 4,907,274 A | 3/1990 | Nomura et al. |
| 4,914,605 A | 4/1990 | Loughmiller, Jr. et al. |
| 4,922,486 A | 5/1990 | Lidinsky et al. |
| 4,926,336 A | 5/1990 | Yamada |
| 4,937,570 A | 6/1990 | Matsukawa et al. |
| 4,937,572 A | 6/1990 | Yamada et al. |
| 4,937,752 A | 6/1990 | Nanba et al. |
| 4,943,974 A | 7/1990 | Motamedi |
| 4,951,211 A | 8/1990 | De Villeroche |
| 4,951,212 A | 8/1990 | Kurihara et al. |
| 4,954,958 A | 9/1990 | Savage et al. |
| 4,954,959 A | 9/1990 | Moroto et al. |
| 4,962,473 A * | 10/1990 | Crain ......................... 340/541 |
| 4,963,864 A | 10/1990 | Iihoshi et al. |
| 4,965,586 A | 10/1990 | O'Neill et al. |
| 4,972,319 A | 11/1990 | Delorme |
| 4,974,170 A | 11/1990 | Bouve et al. |
| 4,977,582 A | 12/1990 | Nichols et al. |
| 4,982,332 A | 1/1991 | Saito et al. |
| 4,989,151 A | 1/1991 | Nuimura |
| 4,992,947 A | 2/1991 | Nimura et al. |
| 4,996,645 A | 2/1991 | Schneyderberg Van Der Zon |
| 4,999,780 A | 3/1991 | Mitchell |
| 5,005,147 A | 4/1991 | Krishen et al. |
| 5,014,221 A | 5/1991 | Mogul |
| 5,021,961 A | 6/1991 | Ross et al. |
| 5,030,117 A | 7/1991 | Delorme |
| 5,031,104 A | 7/1991 | Ikeda et al. |
| 5,032,989 A | 7/1991 | Tornetta |
| 5,036,523 A | 7/1991 | Briskman |
| 5,043,902 A | 8/1991 | Yokoyama et al. |

| | | | | | | |
|---|---|---|---|---|---|---|
| 5,046,026 A | 9/1991 | Tolomei | | 5,293,484 A | 3/1994 | Dabbs, III et al. |
| 5,059,965 A | 10/1991 | Geiser | | 5,293,635 A | 3/1994 | Faulk, Jr. et al. |
| 5,068,838 A | 11/1991 | Klausner et al. | | 5,299,132 A | 3/1994 | Wortham |
| 5,084,822 A | 1/1992 | Hayami | | 5,307,292 A | 4/1994 | Brown et al. |
| 5,089,826 A | 2/1992 | Yano et al. | | 5,309,437 A | 5/1994 | Perlman et al. |
| 5,095,480 A | 3/1992 | Fenner | | 5,317,628 A | 5/1994 | Misholi et al. |
| 5,103,400 A | 4/1992 | Yamada et al. | | 5,321,520 A | 6/1994 | Inga et al. |
| 5,109,399 A | 4/1992 | Thompson | | 5,329,108 A | 7/1994 | Lamoure |
| 5,115,399 A | 5/1992 | Nimura et al. | | 5,329,464 A | 7/1994 | Sumic et al. |
| 5,117,363 A | 5/1992 | Akiyama et al. | | 5,334,974 A | 8/1994 | Simms et al. |
| 5,121,325 A | 6/1992 | DeJonge | | 5,351,146 A | 9/1994 | Chan et al. |
| 5,124,924 A | 6/1992 | Fukushima et al. | | 5,351,237 A | 9/1994 | Sinohara et al. |
| 5,124,984 A | 6/1992 | Engel | | 5,355,365 A | 10/1994 | Bhat et al. |
| 5,133,081 A | 7/1992 | Mayo | | 5,362,239 A | 11/1994 | Pfuetze |
| 5,136,634 A | 8/1992 | Rae et al. | | 5,365,449 A | 11/1994 | Kashiwazaki |
| 5,142,480 A | 8/1992 | Morrow | | 5,369,429 A | 11/1994 | Erickson |
| 5,142,622 A | 8/1992 | Owens | | 5,371,678 A | 12/1994 | Nomura |
| 5,146,219 A | 9/1992 | Zechnall | | 5,375,068 A | 12/1994 | Palmer et al. |
| 5,148,522 A | 9/1992 | Okazaki | | 5,375,074 A | 12/1994 | Greenberg et al. |
| 5,155,689 A | 10/1992 | Wortham | | 5,379,421 A | 1/1995 | Palazzi, III et al. |
| 5,155,806 A | 10/1992 | Hoeber et al. | | 5,381,338 A | 1/1995 | Wysocki et al. |
| 5,161,242 A | 11/1992 | Boulay | | 5,384,835 A | 1/1995 | Wheeler et al. |
| 5,163,131 A | 11/1992 | Row et al. | | 5,396,254 A | 3/1995 | Toshiyuki |
| 5,164,904 A | 11/1992 | Sumner | | 5,398,186 A | 3/1995 | Nakhla |
| 5,172,321 A | 12/1992 | Ghaem et al. | | 5,402,117 A | 3/1995 | Zijderhand |
| 5,173,691 A | 12/1992 | Sumner | | 5,422,809 A | 6/1995 | Griffin et al. |
| 5,177,685 A | 1/1993 | Davis et al. | | 5,424,951 A | 6/1995 | Nobe et al. |
| 5,179,385 A | 1/1993 | O'Loughlin et al. | | 5,432,841 A | 7/1995 | Rimer |
| 5,179,652 A | 1/1993 | Rozmanith et al. | | 5,440,479 A | 8/1995 | Hutton |
| 5,185,860 A | 2/1993 | Wu | | 5,442,557 A | 8/1995 | Kaneko |
| 5,197,009 A | 3/1993 | Hoffman, Jr. et al. | | 5,442,567 A | 8/1995 | Small |
| 5,200,993 A | 4/1993 | Wheeler et al. | | 5,450,938 A | 9/1995 | Rademacher |
| 5,204,961 A | 4/1993 | Barlow | | 5,452,240 A | 9/1995 | Roca et al. |
| 5,212,643 A | 5/1993 | Yoshida | | 5,457,738 A | 10/1995 | Sylvan |
| 5,212,645 A | 5/1993 | Wildes et al. | | 5,461,708 A | 10/1995 | Kahn |
| 5,214,694 A | 5/1993 | Furuya et al. | | 5,471,205 A | 11/1995 | Izawa |
| 5,214,757 A | 5/1993 | Mauney et al. | | 5,471,392 A | 11/1995 | Yamashita |
| 5,220,501 A | 6/1993 | Lawlor et al. | | 5,473,143 A | 12/1995 | Vak et al. |
| 5,220,507 A | 6/1993 | Kirson | | 5,481,535 A * | 1/1996 | Hershey .................... 370/312 |
| 5,224,098 A | 6/1993 | Bird et al. | | 5,524,202 A | 6/1996 | Yokohama |
| 5,229,947 A | 7/1993 | Ross et al. | | 5,526,265 A | 6/1996 | Nakhla |
| 5,229,988 A | 7/1993 | Marbaker et al. | | 5,528,501 A | 6/1996 | Hanson |
| 5,235,680 A | 8/1993 | Bijnagte | | 5,528,518 A | 6/1996 | Bradshaw et al. |
| 5,237,323 A | 8/1993 | Saito et al. | | 5,530,703 A | 6/1996 | Liu et al. |
| 5,237,499 A | 8/1993 | Garback | | 5,530,852 A | 6/1996 | Meske et al. |
| 5,237,693 A | 8/1993 | Kiyohara et al. | | 5,532,838 A | 7/1996 | Barbari |
| 5,239,480 A | 8/1993 | Huegel | | 5,532,950 A | 7/1996 | Moses et al. |
| 5,241,525 A | 8/1993 | Taylor et al. | | 5,533,026 A | 7/1996 | Ahmadi et al. |
| 5,243,174 A | 9/1993 | Veeneman et al. | | 5,534,438 A | 7/1996 | Hayden et al. |
| 5,243,528 A | 9/1993 | Lefebvre | | 5,535,199 A | 7/1996 | Amri et al. |
| 5,243,596 A | 9/1993 | Port et al. | | 5,537,141 A | 7/1996 | Harper et al. |
| 5,251,205 A | 10/1993 | Callon et al. | | 5,537,324 A | 7/1996 | Nimura et al. |
| 5,253,342 A | 10/1993 | Blount et al. | | 5,537,586 A | 7/1996 | Amram et al. |
| 5,261,044 A | 11/1993 | Dev et al. | | 5,539,736 A | 7/1996 | Johnson et al. |
| 5,262,775 A | 11/1993 | Tamai et al. | | 5,543,788 A | 8/1996 | Mikuni |
| 5,265,024 A | 11/1993 | Crabill et al. | | 5,543,789 A | 8/1996 | Behr et al. |
| 5,265,239 A | 11/1993 | Ardolino | | 5,544,061 A | 8/1996 | Morimoto et al. |
| 5,275,568 A | 1/1994 | Pfuetze | | 5,544,315 A | 8/1996 | Lehfeldt |
| 5,276,789 A | 1/1994 | Besaw et al. | | 5,544,317 A | 8/1996 | Berg |
| 5,282,052 A | 1/1994 | Johnson et al. | | 5,544,320 A | 8/1996 | Konrad |
| 5,282,270 A | 1/1994 | Oppenheimer et al. | | 5,546,324 A | 8/1996 | Palmer et al. |
| 5,283,575 A | 2/1994 | Kao et al. | | 5,548,729 A | 8/1996 | Akiyoshi et al. |
| 5,287,103 A | 2/1994 | Kasprzyk et al. | | 5,550,746 A | 8/1996 | Jacobs |
| 5,287,496 A * | 2/1994 | Chen et al. .................. 707/203 | | 5,559,707 A | 9/1996 | DeLorme et al. |
| 5,289,195 A | 2/1994 | Inoue | | 5,570,283 A | 10/1996 | Shoolery et al. |
| 5,289,371 A | 2/1994 | Abel et al. | | 5,579,535 A | 11/1996 | Orlen et al. |
| 5,289,572 A | 2/1994 | Yano et al. | | 5,581,678 A | 12/1996 | Kahn |
| 5,291,412 A | 3/1994 | Tamai et al. | | 5,584,025 A | 12/1996 | Keithley et al. |
| 5,291,413 A | 3/1994 | Tamai et al. | | 5,596,500 A | 1/1997 | Sprague |
| 5,291,415 A | 3/1994 | Zarowin et al. | | 5,608,635 A | 3/1997 | Tamai |
| 5,293,163 A | 3/1994 | Kakihara et al. | | 5,617,319 A | 4/1997 | Arakawa et al. |

| | | | | | |
|---|---|---|---|---|---|
| 5,625,668 A | 4/1997 | Loomis | JP | 61194473 | 8/1986 |
| 5,625,771 A | 4/1997 | Sakaguchi et al. | JP | 61194475 | 8/1986 |
| 5,635,953 A | 6/1997 | Hayami et al. | JP | 62151881 | 7/1987 |
| 5,648,768 A | 7/1997 | Bouve | JP | 62151884 | 7/1987 |
| 5,649,001 A | 7/1997 | Thomas et al. | JP | 6312096 | 1/1988 |
| 5,652,717 A | 7/1997 | Miller et al. | JP | 1119898 | 5/1989 |
| 5,659,732 A | 8/1997 | Kirsch | JP | 1173820 | 7/1989 |
| 5,682,525 A | 10/1997 | Bouve et al. | JP | 1173823 | 7/1989 |
| 5,699,244 A | 12/1997 | Clark, Jr. et al. | JP | 1174912 | 7/1989 |
| 5,727,201 A | 3/1998 | Burke | JP | 1258183 | 10/1989 |
| 5,729,731 A | 3/1998 | Yajima et al. | JP | 23899 | 1/1990 |
| 5,732,074 A | 3/1998 | Spaur | JP | 236653 | 2/1990 |
| 5,734,823 A | 3/1998 | Saigh et al. | JP | 2187898 | 7/1990 |
| 5,748,059 A | 5/1998 | Yabuki et al. | JP | H3-17782 | 2/1991 |
| 5,751,956 A | 5/1998 | Kirsch | JP | 376000 | 3/1991 |
| 5,754,850 A | 5/1998 | Janssen | JP | 3140816 | 6/1991 |
| 5,761,071 A | 6/1998 | Bernstein et al. | JP | 3141499 | 6/1991 |
| 5,771,354 A | 6/1998 | Crawford | JP | 3150699 | 6/1991 |
| 5,784,059 A | 7/1998 | Morimoto et al. | JP | 3231047 | 10/1991 |
| 5,786,789 A | 7/1998 | Janky | JP | 3282580 | 12/1991 |
| 5,790,121 A | 8/1998 | Sklar et al. | JP | 4251284 | 9/1992 |
| 5,802,492 A | 9/1998 | DeLorme et al. | JP | H4-261576 | 9/1992 |
| 5,808,566 A | 9/1998 | Behr | JP | 519684 | 1/1993 |
| 5,812,765 A | 9/1998 | Curtis | JP | 5165401 | 7/1993 |
| 5,826,267 A | 10/1998 | McMillan | JP | 5191504 | 7/1993 |
| 5,839,088 A | 11/1998 | Hancock et al. | JP | 5303335 | 11/1993 |
| 5,843,373 A | 12/1998 | Minevski et al. | JP | 5313580 | 11/1993 |
| 5,845,278 A | 12/1998 | Kirsch et al. | JP | 5333768 | 12/1993 |
| 5,848,373 A | 12/1998 | DeLorme et al. | JP | 5334373 | 12/1993 |
| 5,855,020 A | 12/1998 | Kirsch | JP | 6066578 | 3/1994 |
| 5,870,546 A | 2/1999 | Kirsch | JP | 6066584 | 3/1994 |
| 5,920,854 A | 7/1999 | Kirsch et al. | WO | 92/14215 | 8/1992 |
| 5,930,474 A | 7/1999 | Dunworth | WO | 92/21001 | 11/1992 |
| 5,944,769 A | 8/1999 | Musk et al. | WO | 94/29808 | 12/1994 |
| 5,951,620 A | 9/1999 | Ahrens et al. | | | |
| 5,956,509 A | 9/1999 | Kevner | | | |
| 5,963,915 A | 10/1999 | Kirsch | | | |
| 6,006,160 A | 12/1999 | Tamaki | | | |
| 6,047,236 A | 4/2000 | Hancock et al. | | | |
| 6,049,711 A | 4/2000 | Ben-Yehezkel | | | |
| 6,085,177 A | 7/2000 | Semple et al. | | | |
| 6,122,520 A | 9/2000 | Want et al. | | | |
| 6,131,067 A | 10/2000 | Girerd et al. | | | |
| 6,173,045 B1 | 1/2001 | Smith | | | |
| 6,223,122 B1 | 4/2001 | Hancock et al. | | | |
| 6,263,343 B1 | 7/2001 | Hirono | | | |
| 6,282,489 B1 | 8/2001 | Bellesfield et al. | | | |
| 6,289,390 B1 | 9/2001 | Kavner | | | |
| 6,339,744 B1 | 1/2002 | Hancock et al. | | | |
| 6,385,622 B2 | 5/2002 | Bouve et al. | | | |
| 6,408,307 B1 | 6/2002 | Semple et al. | | | |
| 6,415,291 B2 | 7/2002 | Bouve et al. | | | |
| 6,473,692 B2 | 10/2002 | Hancock et al. | | | |
| 2002/0169541 A1 | 11/2002 | Bouve et al. | | | |
| 2003/0074136 A1 | 4/2003 | Hancock et al. | | | |

FOREIGN PATENT DOCUMENTS

| | | |
|---|---|---|
| EP | 0119674 | 9/1984 |
| EP | 0141508 | 5/1985 |
| EP | 0330787 | 9/1989 |
| EP | 0349430 | 1/1990 |
| EP | 0379198 | 10/1992 |
| EP | 0508787 | 10/1992 |
| EP | 0452613 | 2/1993 |
| EP | 0539146 | 4/1993 |
| GB | 2048604 | 12/1980 |
| GB | 2215319 | 9/1989 |
| JP | 58154874 | 9/1983 |
| JP | 59121437 | 7/1984 |
| JP | 59201199 | 6/1986 |
| JP | 61130968 | 6/1986 |

OTHER PUBLICATIONS

"HomeView™ Executive Summary," 1991, PicNet International, Inc., Bates Nos. HOME0059416–HOME0059417, Exhibit 3 to the Declaration of Robert Norton.

"HomeView™ The Best Way to Buy Your Next Home," Custom Catalog printed for John and Mary Doe, Sep. 24, 1990, pp. 1–29, HomeView, Natick, MA, Bates Nos. HOME0059548–HOME0059579, Exhibit 11 to the Declaration of Robert Norton.

"List your home with a HomeView Realtor® and start packing," 1992, HomeView, Inc., Bates Nos. HOME0059580–HOME0059581, Exhibit 12 to the Declaration of Robert Norton.

"Finally, there's a better way to buy a home", 1992, Home View, Inc., Exhibit 12 to the Declaration of Robert Norton, Bates No. HOME0059582, Exhibit 12 to the Declaration of Robert Norton.

"Finally, brokers get a break," HomeView™ Realty Search Centers brochure, 1991, HomeView, Inc., Bates Nos. HOME0059583–HOME0059586, Exhibit 12 to the Declaration of Robert Norton.

"That was then. This is now." HomeView™ flyer, 1992, HomeView, Inc., Bates Nos. HOME0059587–HOME0059588, Exhibit 12 to the Declaration of Robert Norton.

"Starting today, the way you find a home will never be the same," HomeView™ brochure, circa 1993, HomeView, Inc., Bates Nos. HOME0059589–HOME0059592, Exhibit 12 to the Declaration of Robert Norton.

"A View With a Room," Entrepreneur, Mar. 1992, Bates Nos. HOME0059593–HOME0059594, Exhibit 13 to the Declaration of Robert Norton.

"Home buyers shop using multimedia," USA Today, Oct. 2, 1992, Bates No. HOME0059595, Exhibit 13 to the Declaration of Robert Norton.

"High–Tech Home Buying," Newsweek, p. 5, Jun. 1, 1992, Bates No. HOME0059596, Exhibit 13 to the Declaration of Robert Norton.

Cove, Lynda, "A new meaning to home delivery," The Boston Herald, Real Estate Pullout Section, Jan. 10, 1992, Bates No. HOME0059597, Exhibit 13 to the Declaration of Robert Norton.

"Century 21 Dwyer & Stilton is Member Broker with Home View," Hanover South Shore News, Sep. 28, 1992, Bates No. HOME0059598, Exhibit 13 to the Declaration of Robert Norton.

Thurmond, Rick, "High–tech Home Sales," Sun Chronicle, Bates No. HOME0059599, Exhibit 13 to the Declaration of Robert Norton.

"What's New," Popular Science, p. 16, May 1992, Bates No. HOME0059600, Exhibit 13 to the Declaration of Robert Norton.

"Homeview announces equity investment by IBM," Home View™ Realty Search Services press release, Sep. 16, 1992, Bates No. HOME0059601, Exhibit 13 to the Declaration of Robert Norton.

Brickman, Sue, "House hunting," Real Estate Update, Jan. 17, 1992, Bates No. HOME0059602, Exhibit 13 to the Declaration of Robert Norton.

"Home–Shopping Networks," Inc., p. 53, Mar. 1993, Bates No. HOME0059604, Exhibit 13 to the Declaration of Robert Norton.

Labanca, Lisa, "IBM backing HomeView," Middlesex News, Sep. 17, 1992, Bates No. HOME0059605, Exhibit 13 to the Declaration of Robert Norton.

Rosenberg, Ronald and Ackerman, Jerry, "IBM Moves Into HomeView," The Boston Globe, Sep. 15, 1992, Bates No. HOME0059606, Exhibit 13 to the Declaration of Robert Norton.

"Joyce Cook Realtors adopts HomeView," Salem Evening News, Business Highlights, Sep. 18, 1992, Bates No. HOME0059607, Exhibit 13 to the Declaration of Robert Norton.

"Virtual Real Estate," Lear's, May 1992, Bates No. HOME0059608, Exhibit 13 to the Declaration of Robert Norton.

Barrett, Bob, "Home buyers: Let your fingers do the walking," The Patriot Ledger, Dec. 20, 1991, Bates No. HOME0059609, Exhibit 13 to the Declaration of Robert Norton.

"Looking for a House on a Computer Screen," The Wall Street Journal Marketplace, Mar. 23, 1992, Bates No. HOME0059610, Exhibit 13 to the Declaration of Robert Norton.

"Marblehead Proprerties [sic.] part of computer database," Swampscott Reporter, Sep. 3, 1992, Bates No. HOME0059611, Exhibit 13 to the Declaration of Robert Norton.

Bianchi, Alessandra, "Home–Shopping Networks," New Businesses, Inc., p. 53, Mar. 1993, Bates No. HOME0059612, Exhibit 13 to the Declaration of Robert Norton.

"Home Finder," Popular Science, vol. 240, No. 5, May 1992, Bates Nos. HOME0059613–HOME0059614, Exhibit 13 to the Declaration of Robert Norton.

"Realtor joins digital sales service," Haverhill Gazette, Sep. 9, 1992, Bates No. HOME0059615, Exhibit 13 to the Declaration of Robert Norton.

Eng, Paul M., Ed., "Three Bedrooms, River View? I'll Punch That Right Up," Business Week, Jan. 20, 1992, Bates No. HOME0059617, Exhibit 13 to the Declaration of Robert Norton.

"The Home–Shopping Network,": CIO The Magazine for Information Executives, Mar. 1992, Bates No. HOME0059618, Exhibit 13 to the Declaration of Robert Norton.

Phelps, Dan, "A unique way to search for a home," Needham Times, vol. 25, No. 4, Jan. 16, 1992, Bates No. HOME0059619, Exhibit 13 to the Declaration of Robert Norton.

"Home buyers shop using multimeda," USA Today, Oct. 2, 1992, Bates No. HOME0059620, Exhibit 13 to the Declaration of Robert Norton.

"Front–runners: The Victor Company, Inc. Realtor offices are now HomeView member brokers," The Eagle–Tribune, Sep. 25, 1992, Bates No. HOME0059622, Exhibit 13 to the Declaration of Robert Norton.

Ackerman, Jerry, "Zap! Real estate shopping meets the computer age," The Boston Sunday Globe, Nov. 22, 1992, Bates No. HOME0059623, Exhibit 13 to the Declaration of Robert Norton.

User's Guide, "Automap Pro", Microsoft, 1995, pp. PA–5233 to pa–5418.

Barbara Sturken, *American Introduces Commercial Sabre*, Travel Weekly, 1986 (HOME0215606–HOME0215609).

Werner Hafner, *Tripping Through Online Travel Services*, Fairfield County Business Journal—High Beam Research 1992 (HOME0215603–HOME0215605).

Michael Banks, *The Modern Reference*, Third Edition, Brady Publishing, 1992 (pages of book including pp. 1–355 and 358–815).

Steven Putz, *Interactive Information Services Using World–Wide Web Hypertext*, First International Conference on World–Wide Web ISTL–QCA–1994–03–01, 1994 (EXPO 25440–EXPO 25447).

David Crossley and Tony Boston, *A Generic Map Interface to Query Geographic Information Using the World Wide Web*, www.w3j.com/1/Crossley.002/paper/002.html, 1995 (pp. 723–735).

Ed Taylor, *Demystifying TCP/IP*, Woodware Publishing, Inc., 1993 (pp. 1–20).

Alan Kainz, *The Ottawa Citizen, Real Estate Section*, Dec. 19, 1992 (pp. 1–3).

*GIS Approach to Digital Spatial Libraries*, ESRI, 1994 (HOME0215402–HOME0215450).

H.G. Campbell, *Geographic Information Systems Education for Non–Computer Oriented College Students*, SIGCSE Bulletin, 1994 (pp. 11–14).

CompuServe Made Easy, Mentor Technologies, 1992 (HOME0215386–HOME0215394).

Floyd Wilder, *A Guide to the TCP/IP Protocol Suite*, ARTECH House, 1993 (pages of book including pp. 1–313).

Lawrence Magid, *Cruising Online*, Random House, 1994 (pages of book including pp. 1–401 and pp. 404–481).

Dylan Tweney, *The Traveler's Guide to the Information Highway*, Ziff Davis Press, 1994 (164 total pages including pp. 1–139).

David Carlson, *The Online Timeline*, iml/jou.ufl.edu/carlson/1990s/shtml, 1999 HOME0215640–HOME0215656).

Vic Sussman, *The Internet Will Gain Popularity, Problems*, U.S. News and World Report, 1994 (1 page).

Hiawatha Bray, *Microsoft's New Software Clicks for the Folks Who Don't Do Windows*, Knight Ridder/Tribune News Service, 1995 (2 pages).

Nadine Godwin, *Sabre to Allow Its Subscribers to Load Others' PC Software*, Travel Weekly, 1989 (3 pages).

Lichty, Tom, "America Online's Internet, MacIntosh Edition," Ventana Press, 1994 (DOC 09703–DOC 10025).

Michelle Johnson, *Tech Speak*, The Boston Globe, Section: Business: downloaded from http://nl.newsbank.com/nl–search/we/Archives?p_action=print; Dec. 2, 1994 (p. 67).

Michelle Johnson, *Tech Speak*, The Boston Globe, Section; Business; downloaded from http://nl.newsbank.com/nl–search/we/Archives?p_action=print; Dec. 23, 1994 (p. 31).

Christopher A. Poterala and Julius Ariail, *PACS–L Archives*—Feb. 1994, week 1 (#45), downloaded from http://listserv.uh.edu/cgi–bin/wa?A2=ind9402a&L=pacs–I&P=4949 on Dec. 13, 2007 (2 pages).

Zijderhand et al., "Functions and Applications of Socrates: A Dynamic In–Car Navigation System with Cellular–Radio Based Bi–Directional Communications Facility," Vehicle Navigation & Information Systems Conference Proceedings, Aug. 31–Sep. 2, 1994, pp. 543–546 (EXP016099–EXP016103).

Ang et al., "A New Region Expansion for Quadtrees," IEEE Transactions on Pattern Analysis and Machine Intelligence, Jul. 1990, vol. 12, No. 7, pp. 682–686 (EXP025345–EXP025350).

Freedman, Eric, "PCs Prove to be the Real Estate Thing," PC Magazine, Mar. 3, 1985, p. 60 (HOME0059656).

Nelson, Stephen, "Using Prodigy", Que Corporation, 1990, pp. 101–130.

GIS World, vol. 4, No. 7, Oct. 1991, pp. 1–136 (EXP032588–032727).

Geosystems, "Answers to Where", R. R. Donnelly & Sons Co., 1992.

"Geosystems' Electronic Future", Directory World, Fall 1993.

Morris, G.; Sanders, T.; Gilman, A.; Adelson, S. and Smith, S.; "Kiosks: A Technological Overview," Los Alamos National Laboratory, Jan. 10, 1995.

MapInfo 4.50 Release Notes, Mapping Information Systems Corporation, Troy, NY, 1990.

"MapInfo Desktop Mapping Software Addendum," Mapping Information Systems Corporation, Troy, NY, 1988.

"Geographical Information Systems vol. 1: Principles," Longman Scientific & Technical, Essex, England, 1991, pp. 18–43.

Geographical Information Systems vol. 2; Applications, Longman Scientific & Technical, Essex, England, 1991, pp. 272–273.

"ARC/Info/ vol. 2 Command References," Environmental Systems Research Instittue, Users Guide 1989.

"ARC/Info Printer 4.0," Environmental Systems Research Institute, Users Guide Jul. 1987.

"AutoRoute Plus User Guide," NextBase Limited, Staines, Middlesex, England, Jul. 1989.

AutoRoute Plus Reference Manual, NextBase Limited, Staines, Middlesex, England, 1989.

"NextBase developing European route system," Transport Week, p. 20, Aug. 25, 1990.

"Mapbase," NextBase Limited, Middlesex, England, 1993.

"News Briefs," Videotex World, Jun. 1985, p. 62.

"Viewpoint," Videotex World, Jun. 1986, p. 35.

CADIS Brochure; "Serving the Needs of Advertisers and Shoppers with Effective In–Mall Advertising," Alphatel Videotex Directories Limited, 1985.

CADIS Brochure; "Directing shoppers to your store," Alphatel Videotex Directories Limited, 1985.

Publication; Videotex World, vol. 3, No. 2, pp. 1 & 37, Winter 1986.

Raggett, Michael, "Public Access Videotex: A Sensible Way Forward," Videotex World, vol. 2, No. 2, pp. 18–22, Dec. 1985.

Dahl, Brad, "CADIS An Example of Specialization in Public Access Videotex Systems," Videotex World, vol. 2, No. 3, pp. 14–18, Mar. 1986.

Advertisement, "A New Approach to Public Access," Videotex World, vol. 2, No. 3, p. 57, Spring 1986.

Brochure; "How to make a big mall small," Alphatel Videotex Directories Ltd. 1985.

Dahl, Brad, "Computerized Directories," Signs of the Times, vol. 207, No. 8, Aug. 1985, pp. 70–71, 139–143.

Dahl, Brad, "The Electronic Marketplace," Signs of the Times, Dec. 1985, pp. 71–73, 152–153.

Signs of the Times 1984 Buyer's Guide, vol. 205, No. 12, Mid–Nov. 1983, p. 72.

Advertisement for CADIS; Signs of the Times; 1978 Buyer's Guide.

Advertisement; Signs of the Times, Mid–Nov. 1986, p. 18.

"Products," Signs of the Times, Oct. 1987.

Hurley, Paul, "Learning to Market Electronically," enRoute, Feb. 1986, pp. 40–41, 65–66, 68–71, 73–74.

"Edmonton telephones' 1985 annual report," pp. 9–10.

"Sweet's Catalog File," McGraw Hill Information Systems Company, NY, NY, 1986.

"CADIS info system debuts at airport," Unknown source, Aug. 1986.

"Mall's directory highly advanced," The Edmonton Journal, Dec. 1986, p. C3.

"AutoRoute Nieuwsbrief," Zomereditie, 1992.

"Autoroute upgrades to go places," What Micro?, May 1989.

Hughes, Ken, "Applications," PC Today, pp. 82–83, Jul. 1990.

*What's new in Computing*, cover page, Jul./Aug. 1991.

"Express version of Autoroute launched," PC Week, Apr. 30, 1991, p. 4.

"Autoroute—drommen for lata bilister," Micro Datom (Sweden), Oct. 1993.

"Bodite na cilju pred drugimil" Winini, Dec. 1994, pp. 48–49, 52–53.

"Autoroute Express for Windows," What PC?, Feb. 1993, p. 26.

"AutoRoute Express for Windows," Personal Computer World, Nov. 1992, p. 214–216.

"Automap road atlas guide for Windows," Automap, Inc., Bellevue, WA, 1993.

Brochure; "automap road atlas version 3.0 for Windows," Automap, Inc., 1993.

"Automap road atlas guide for Macintosh," Automap, Inc., Bellevue, WA, 1993.

Users Guide, "Automap Pro," Microsoft, 1995.

(JP) Brochure; "Software Information," 1993.

(JP) Catalog; "Zenrin Navisoft Full Line–Up Catalogue," ASCII Corporation/Zenrin Corporation, 1992.

(JP) Zenrin Brochure, 1993.

Wagg, Dana, "Computer Finds Shops," Edmonton Examiner, Jan. 21, 1985.

News Release; "New Electronic Service Available to City Visitors," Edmonton Convention & Tourism Authority, Jul. 28, 1986, pp. 1–2.

"CADIS is as easy as ABC," The Edmonton Sunday, May 5, 1985.

CADIS Advertisement, The Edmonton Sunday Jul. 21, 1985.

"Advanced Interactive Video, Inc. Business Plan" Sep. 1987, pp. 1–18.

"Viola!—New POP Systems from AIV," The Videodisc Monitor, p. 3, Sep. 1985.

Vloyanetes, Peter; Magel, Mark, "Electronic retailing," Marketing Communications, pp. 31–34, 37, 79, May 1986.

Bixler, Brian, "Marketplace is literally at your finger," Florida Today, pp. 1E–2E, May 15, 1986.

"DeBartolo Rolls Out Viola System to Malls," The Videodisc Monitor, p. 5, Jul. 1987.

Article, "What's New," Ohio Business, p. 73, Jul. 1987.

Pounds, Marcia H., "Need mall news? Viola," News/Sun–Sentinel, Palm Beach, Apr. 26, 1986.

Ocker, Lisda, "'Viola!' New Computer Assists Shoppers at Palm Beach Mall," The Post, Apr. 29, 1986.

Nash, Bob, Computer Printout, "Mall Test Encourages Interactive Computer Firm," Business First—Columbus Inc., Columbus, OH, Sep. 16, 1985, p. 16.

Berger, Dan, Computer Printout, "Teleguide's coming to town; Machines offer some good, free advice," The San Diego Union–Tribune, Mar. 10, 1985, p. 1–1.

Latamore, G. Berton, Computer Printout; "Public–Access Videotex Makes Computers Visitor Friendly," Chicago Tribune Company, Sports Final Edition, Jun. 14, 1985, p. 76.

Computer Printout; "Infomart of Dallas: Mixing the old with the new," Data Communications, Oct. 1984, p. 62.

Beeler, Jeffrey, Computer Printout; "Videotex system puts LA at Olympics visitors' fingertips," Computerworld, Inc., Aug. 6, 1984, p. 1.

Computer Printout; "Chronicle–Videotex; Acquires U.S. Teleguide rights," Business Wire, Inc., Jun. 9, 1986.

Hurly, Paul, Computer Printout; "Boosting Sales . . . Electronically," Industry Week, Mar. 31, 1986, p. 33.

Berger, Dan, Computer Printout; "Videotex is hard to define," The San Diego Union–Tribune, Mar. 10, 1985, pp. 1–10.

Bartimo, Jim, Computer Printout; "Videotex Changes Direction," InfoWorld Media Group, May 21, 1984, p. 34.

Computer Printout; "SFCVB; And Bay Area Teleguide join forces to guide tourists," Business Wire, Inc., May 9, 1984.

Computer Printout; "A Videotex Pioneer Pushes Into the U.S. Markets," Business Week, Apr. 16, 1984, p. 63.

Pollack, A., Computer Printout; "Electronic Almanacs are There for the Asking," The New York Times, Mar. 18, 1984, Sec. 4, p. 9.

Computer Printout; "Mitsui to Introduce Canadian 'Teleguide' Videotex Software in Japan," Jiji Press Ticker Service, Mar. 5, 1985.

Computer Printout; "Videotex industry searches for salvation," ASAP, vol. 106, Apr. 23, 1984, p. 40.

Varin, Andra, Computer Printout, "Travel shorts," United Press International, Nov. 12, 1986.

Computer Printout; "Baltimore Offers Data by Computer," Los Angeles Times, Part 7, Nov. 16, 1986, p. 16.

Ruoff, Mary, Computer Printout, "Dutch Look to Bridge Cities' Business, Culture," Baltimore Business Journal, vol. 5, No. 44, Apr. 11, 1988, Sec. 2, p. 1B.

Pollack, Andrew, "Electronic Almanacs are There for the Asking," The New York Times, Mar. 18, 1984.

CD ROM inserts, "Streets USA," CD USA, 1998 (windows).

CD ROM inserts, "Deluxe Streets USA Business Edition," CD USA, 1999 (Windows 95, Windows NT).

CD ROM inserts, "Deluxe Streets USA Business Edition," CD USA, 1997 (Windows 95 & 98 & NT).

"A Guide to Zip2™ Homebase Technology," Zip2 Corporation, 1999.

"National Mall Monitor," May/Jun. 1984, p. 220.

Teleservices Report, Nov. 1985, Arlen Communications, Inc., pp. 9–10, +6 pages.

Osata, Margaret, "Electronic Shopping: No Dinosaurs But Lots of Center Directories," Shopping Center World, May 1984, pp. 132–140.

"Technology: At Home on the Selling Floor, Retailers are Becoming Comfortable with High–Tech In–Store Systems," Chain Store Age Executive, Dec. 1987, pp. 35–36.

"Designs Expands Single–Vendor Concert," Chain Store Age Executive, Jan. 1988, pp. 78, 80.

"Some Home Centers Opt for DIY Videos," Chain Store Age Executive, Sep. 1988, pp. 61–62.

"DIY Promos Via Video POS," Chain Store Age Executive, Apr. 1988, pp. 76, 78.

"Interactive Video: Revealing Who and How," Chain Store Age Executive, Jul. 1988, p. 28.

"Interactive POS Video Yields Instant Results," Chain Store Age Executive, Sep. 1988, pp. 51–52.

"Product Review," Identity, Summer 1988, pp. 12, 14.

"P.O.P./Interactive," Electronic Display News, Feb./Mar. 1989, pp. 9–10.

"What is Happening with Interactive Technology," Video Systems, Aug. 1999, pp. 46, 50.

"1984 Buyer's Guide," Signs of the Times, Nov. 1983pp. 107–108.

"ICSC 1985 Convention, Exposition and Leasing Mall, New Orleans," Catalog of participants with booths, May 12–17, 1985.

"Trade Mall," SCW Convention News Daily, May 15, 1985, pp. 67–68.

"CADIS Multi Reference Manual Table of Contents," Jan. 23, 1987, pp. 1–13.

Letter from Gary Arlen of Arlen Communications, Inc. to Don Shelley of Saskatchewan Tourism and Small Business, Oct. 3, 1986, 2 pages.

Letter from Joyce Routson of Kalt & Associates to Brad Dahl of Brad Dahl Holdings, Feb. 13, 1985, 1 page.

"CADIS info system debuts at airport," Edmonton Examiner, Aug. 18, 1986.

"Mall's directory highly advanced," The Edmonton Journal, Dec. 22, 1986, p. C3.

News Release; "New Electronic Service Available to City Visitors," Edmonton Convention & Tourism Authority, Jul. 28, 1986.

Brochure; "IBM Video/Passage Author and IBM Video Passage Presenter," International Business Machines International, Atlanta, GA 1986.

Brochure; "IBM Info Window System—Equipment that make information come alive," International Business Machines International, Atlanta, GA 1986.

Brochure; "IBM InfoWindow System—One touch makes information come alive," International Business Machines International, Atlanta, GA 1986.

Brochure; "IBM Expo Info—Helping You Touch The Future," International Business Machines International, Atlanta, GA, 1986.

Brochure; "Product Announcement—IBM 4055 InfoWindow Display Announced," IBM Canada Ltd., Jun. 16, 1986, pp. 1–7.

Brochure; "Programming Announcement—Video/Passage Multimedia Authoring and Presentation System Version 1," IBM Canada Ltd., Jun. 16, 1986, pp. 1–10.

Brochure; "Programming Announcement—IBM InfoWindow Control Program Version 1.0, Release 1.1," IBM Canada Ltd., Jun. 16, 1986, pp. 1–5.

Mailing from Inter–ad, Inc., Rochester, NY to retailers, Sep. 23, 1986, with attachments.

User's Manual; "Acura TL Navigation System I," Honda Motor Co., Ltd., 1998, pp. 1–60.

Brochure; "Magellan 750 NAV Vehicle Navigation Systems," Magellan Driver Information Systems, Rochester Hills, MI, 1999.

Computer Printout; "Magellan Path master," magellangps.com, Aug. 5, 1999.

"Street Atlas USA," *Introductory Guide*, DeLorme, Yarmouth, ME, 1997.

"Earthmate GPS Receiver," *User's Guide*, DeLorme, Yarmouth, ME, 1998.

Brochure; "SkyMap Traveler, the Complete GPS and Map System for All Your Travel Needs," Etak, Inc., Menlo Park, CA 1998.

Brochure; "SkyMap Pro—The GPS and Map System that Everyone is Talking About," Etak, Inc., Menlo Park, CA 1998.

Brochure; "Capitalize on the Robust Performance of GeoEngine," Etak, Inc, 1999.

"Course 231 Vehicular Navigation & Location Systems Technology," Navigation Technology Seminars, Alexandra, VA, Dec. 1987.

Seminar Material; "The 3rd International Conference on Vehicle Navigation & Information Systems, Conference Record of Papers," Institute of Electrical and Electronics Engineers, Inc., Aug. 1992.

Schoreder, J.l. and Green, Jeff, "The Emergence of Smart Traveler Kiosks and the User Interface Requirements for their Successful Deployment," 1VHS America 1994 Annual Meeting, Paper 94111, Apr. 1994.

Vizard, Frank, "Orienting in the electronic age," San Francisco Examiner—Inside Track, Nov. 23, 1986, pp. 34–36.

Marsall, Loren, "Tracking the Wild Ambulance Fleet," jems, pp. 58–61, Sep. 1987.

"Color Remote Map Reader Packaged for USAF Test," Aviation Week & Space Technology, Aug. 22, 1983, pp. 142–143.

Totani, Shinzo, Kato Takaski and Muramoto, Kazuo, "Automotive Navigation System," The Second Annual International Pacific Conference on Automotive Engineering, Paper 830910, Nov. 1983.

Honey, Stanley K., Marvin S. White, Jr., and Zavoli, Walter B., "Extending Low Cost Land Navigation Into Systems Information Distribution and Control," IEEE Position Location & Navigation Symposium, Nov. 1986.

Sweeney, Lawrence E., "An Overview of 1VHS Sensor Requirements", Proceedings—Sensors Expo West, Helmets Publishing, Inc. et al, San Jose, California Mar. 2–4, 1993.

Cooke, Donald F., "Map Storage on CD–ROM," Byte, Jul. 1987, pp. 130–136.

Hamlen, Mark D., "Fleet Management with Automatic Vehicle Location," 36th Sup Vehicular Technology Conference, May 1986, pp. 374–380.

"TransCad Transportation GIS Software," Caliper Corporation (date unknown), pp. 1–23.

Forrest, David; "Seeing data in new ways," Computerworld, Jun. 29, 1992, pp. 5, 86.

Juhl, Ginger M., "GIS–based Information Network Helps Law Enforcement Efforts to Curtail Drug Traffic," Geo Info Systems, Jun. 20, 1989, pp. 36–45.

"Owner's Manual and Reference Guide Street Pilot GPS Color Map," Garmin Corporation, Jan. 1999.

"Quick Start Guide StreetPilot GPS Color Map," Garmin Corporation, 1998.

"Owner's Manual and Reference Guide StreetPilot GPS:" Garmin Corporation, Jan. 1999, pp. i–viii, 1–78.

"Quick Start Guide StreetPilot GPS," Garmin Corporation, 1998.

Brochure; "StreetPilot GPS Car Navigation that goes from here to here" Garmin International, 1998.

"Map'n'Go Plan the Perfect Vacation," DeLorme, 1999.

"Phone Search USA Version 4.5," DeLorme, 1999.

"Street Atlas USA Version 6.0," DeLorme, 1998.

Brochure; "Street Atlas USA Version 6.0—1998/1999 Edition" DeLorme, 1998.

"Earthquake GPS Receiver," *User's Guide*, DeLorme, 1998.

Computer Printout; "Solus Pro Overvie," DeLorme, 1999.

Michaelides, Lee, "Lyme Firm Intent on Digitizing the Nation," Vermont Business, Sec. 1, May 1986, p. 76.

Hrut, Christopher B., "Navigation Technologies Executive Summary," Mobile World Conference Proceedings, 1993.

Warner, Edware, "Smart maps; new route to profits: digital–map systems can save business up to $50 billion annually," Infotechnology Publishing Corporation, High Technology Business, vol. 8, No. 12, Dec. 1988, p. 20.

McCarron, John, "Supermaps Computers Put Big Cities on Road to High Efficiency," Chicago Tribune, Section—Tomorrow, Aug. 3, 1986, p. 1.

"Computer Navigation Coming to Law Enforcement," Law and Order, vol. 33, No. 2, pp. 24–26, Feb. 1985.

Fairlie, Rik, "Software Integrates city data, maps; Personal Travel Technologies develops pathfinding system for travelers; Personal Travel Guide; Automation Report," Travel Weekly, vol. 51, No. 94, p. 53, Nov. 23, 1992.

Angus, Jeff, "Map Software; CityGuide takes the guesswork out of business travel," InfoWorld, Section: Review, p. 81, Mar. 1, 1993.

Schwabach, Bob, "Computerized maps go beyond paper versions," Star Tribune, Minneapolis, MN, Section: Marketplace, p. 2D, Sep. 23, 1993.

Gooding, Clair, "Charting a new course—Claire Gooding looks at the benefits . . . ," Financial Times, London, p. 20, Oct. 28, 1993.

Computer Printout; "Strategic Mapping introduces next generation of desktop mapping software," Business Wire, Nov. 1, 1993, 3 pages.

News Release; "R. R. Donnelley Geosystems Introduces Geolocate Plus," Geosystems, Mar. 10, 1992.

Benning, Herman J.G.M., "Digital Maps on Compact Disc," SAE, Technical Paper Series, Paper No. 860125, 1986.

Shneiderman, Ben, "Designing the User Interface . . . Second Edition," Addison Wesley Publishing Company, 1992.

Lax, Leo and Olsen, Mark, "NAPLPS Standard Graphics and the Microcomputer," Byte Publications, Inc., Jul. 1983.

Braegas, Peter; "Function, Equipment, and Field Testing of a Route Guidance and Information System for Drivers (ALI)," IEEE Transactions on Vehicular Tech., vol. VT29, No. 1, May 1980.

Dupree, Robert L., "Amoco Graphics System Framework for a Mappable Corporate Data Base," Management's Use of Maps: Commercial and Political Applications Harvard University, pp. 3, 13–18, 1979.

Fishbine, Glenn M., "Future Directions In Public Service Computer Cartography: The Challenge of the Pinball Mentality," Urban, Regional, and State Government Applications of Computer Mapping, vol. 11, pp. 61–67, 1980.

Gregg, Randall E., "Application of Thematic Maps in Management Information Systems . . . ," Management's Use of Maps, vol. 7, pp. 33–40, 1980.

Van Demark, Peter H., "Development Surveillance Using GBF/DIME Technology," Urban, Regional, and Environmental Information . . . , pp. 307–314, Aug. 1981.

Kevany, Michael J., "The Evolution of Automated Mapping . . . Past Dozen Years," Conf. Theme: What's the Difference?, vol. IV, 1986 Annual Conf . . . Urban and Regional Information Sys. Assn, Denver, CO, pp. 139–147.

Croswell, P.L., "Developments in Data Transfer Between . . . Computer Databases," Conf. Theme: What's the Difference?, vol. II, 1986 Annual Conf . . . Urban and Regional Information Sys. Assn, Denver, CO, pp. 47–61.

Folchi, William and Badillo, Ann, "A New Perspective in GIS: Databases and Emerging Markets," GIS World, Inc. pp. 66, 67, 69–70, Aug./Sep. 1990.

"Ancient Pompeii Culture Revealed by GIS," GIS World, Inc., Dec. 1990, pp. 27–31.

Landis, John D., "GIS Capabilities, Uses, and Organizational Issues," Profiting From A Geographic Information System, Ch. 2, pp. 23, 30–31, 1993.

Castle, Gilbert H., "Real Estate," Profiting From A Geographic Information System, Ch. 5, pp. 85, 90, 1993.

Juhl, Ginger M., "Coping with Rapid Development: County "Reinvents" Government with GIS Assistance," GIS World, Inc., Fort Collins, Co., pp. 30–34, Jan. 1994.

Greenfield, "The Development of a GIS–Based Transit Advanced Traveler Information System," 1995 URISA Proceedings, pp. 695–709.

"Ads on Wheels Roll Into Supermarkets," Chain Store Age Executive, p. 49, Sep. 1988.

"Auburns prof's 'computer' helps tourists avoid getting lost," The Atlanta Journal and Constitution; p. 16–B Aug. 28, 1993.

Reinhold, Robert, "Revolution Changes the World of Maps," The New York Times, Sec. C, Sep. 1980, p. 2.

"NYNEX Offers Yellow Pages Over the Internet," Information Today, Sep. 1994. VIS 06208.

"Delphi Makes Northeast Access More Accessible Flexibly," Access Update, Jan./Feb. 1993, vol. 2, No. 1. VIS 10749–10752.

"NYNEX Northeast Access—In Development," Access Update, Jul./Aug. 1992, vol. 1, No. 1, VIS 10753–10756.

"SNET Gives Northeast Access Users Access to Connecticut," Access Update, Summer 1993, vol. 2, No. 2., VIS 10757–10760.

NYNEX USAccess Online Directory, Miscellaneous Screen Shots (1990), VIS 10795–VIS 10804.

"Nynex Introduces Nynex USAccess™ on French Minitel," NYNEX Information Technologies Company Press Release, Oct. 24, 1990., VIS 10792–10794.

NYNEX Interactive Yellow Pages on Prodigy, Screen Shots, 1995, VIS 11210–11249.

NYNEX Interactive Yellow Pages on Prodigy, Miscellaneous Screen Shots, Jan. 24, 1995. (VIS 11197–11199).

"Welcome to the Nynex Interactive Yellow Pages," Backgrounder, NYNEX Information Technologies Co. (1995), VIS 11200–11202.

Nahon, Georges, "It's Not Just an Electronic Phone Book," Telephone Engineer & Management, Sep. 15, 1986 p. 85 & p. 88. (VIS 06230 & VIS 06233).

"Nynex Offers Yellow Pages Over the Internet," Information Today, Sep. 1, 1994, VIS 05015.

"Here's the Stuff You Requested," NYNEX Interactive Yellow Pages, Mar. 1995, VIS 10805–10822.

NYNEX Interactive Yellow Pages, Screen Shots (1995) VIS 10823–10855.

Trinet Establishment Database, Dialog® Information Retrieval Service (1985), VIS 05108–VIS 05157.

Keays, Thomas, "Searching Online Database Services Over the Internet," Online, Jan. 1993, VIS 06130–06134.

"Nynex Yellwo Pages Unit Offers On–Line Service," Newsbytes News Network, Feb. 20, 1992 (VIS 05079–05080).

"NYNEX chooses Minitel to distribute directory," Information Today, Jun. 1, 1992 (VIS 05081).

"NYNEX completes national CD–ROM telephone Directory," Information Today, Apr. 1, 1992 (VIS 05092).

Dialog's Delivery Options—A Complete Package, The Dialog Corporation, Oct. 1994. (VIS 11397–11463).

"The Dialog Computer System," Aug. 1987, VIS 06748–07277.

"Nynex Introduces Forerunner of Electronic Yellow Pages," Information Today, Apr. 1, 1992 (VIS 05095–05096).

"D&B—Dun's Market Identifiers," Dialog Information Retrieval Service, Dec. 1988, pp. 516–1 through 516–68.

"D&B—Dun's Electronic Yellow Pages," Dialog Information Retrieval Service; Sep. 1988.

"Nynex to Offer Yellow Pages on the Internet," Nynex Information Technologies News Release, Aug. 1, 1994, p. 1–2.

"Les Pages Jaunes de New York et Boston," les Echos, Jan. 30, 1991. La Guerre du Golfe, p. 6. VIS 11345–VIS 11346.

Creamer, Dickson Bashford, "Marketing Public Relations Status Report," Various Press Releases & News Items, Mar. 2, 1992, VIS 11350–VIS 11396.

"Delphi Internet, The Official Guide", Delphi Internet Services Corporation, 1994, EXP064089–EXP064394.

Thomas, Hilary B., "Electronic Directories in the United States, A Review of Activities of the RBOC's and others" Interactive Telecommunications Services, Inc., Aug. 31, 1993. (EXP072223–072323).

"Accessing and Working with the McKinley Data," Design Specification, The NYNEX Interactive Yellow Pages World Wide Web Service, Oct. 10, 1995, pp. 5–2 to 5–3. (VIS 11312–11313).

"Nynex Announces Online, Interactive Yellow Pages on Prodigy," NYNEX Interactive Yellow Pages News Release, Jan. 24, 1995 VIS 11203–11205.

"NYNEX Expands On–Line Directory Services to U.S. West Community Link Gateway," NYNEX Information Technologies News Release, Jun. 23, 1992. VIS 10766–10768.

"NYNEX Becomes First RBOC to Offer Interactive Online Transaction Service," NYNEX Information Technologies News Release, Jul. 23, 1993 (VIS 10769–10772).

Samet, Hanan, et. al, "Quadtree Region Representation in Cartography: Experimental Results," IEEE Transactions on Systems, Man and Cybernetics, Nov./Dec. 1987 (EXP 025059–64).

Samet, Hanan, et. al, "The Quadtree and Related Hierarchical Data Structures," Computing Survyes, Jun. 1984 (EXP 025066–103).

Harris, Clyde B., et al., "Navigation into the $21^{st}$ Century, Digital Map Dependent Functions of Automatic Vehicle Location Systems," IEEE Plans '88 Position Location and Navigation Symposium, Record Department of Surveying Engineering, University of Calgary (1988) (EXP 025567–76).

Marsh, David, "Database Design, Development and Access Considerations for Automotive Navigation," Conference Record of Papers presented at the First Vehicle Navigation and Information Conference (VNIS '89), Navigation Technologies Corp., Sunnyvale, CA (1989) (EXP 025577–81).

Antennucci, J.; Von Nostrand, Reinhold, "Geographic Information Systems: A Guide to the Technology," New York, NY 1991 (EXP 31759–032093).

Magure, Goodchild; Rhind, "Geographical Information Systems," 1991, EXP 030617–031437.

Norman, Alan; Zavala, Walter B, Heideman, Mike, "Vehicle Information Systems & Electronic Display Technology," Society of Automotive Engineers, 1991. (EXP 017103–09).

White, Marvin, "Emerging Requirements for Digital Maps for In–Vehicle Pathfinding and Other Traveller Assistance," Society of Automotive Engineers, VNIS 1991 (EXP 025584–90).

Rillings, James H., "TravTek," Vehicle Navigation & Information Systems Conference Proceedings VNIS 1991. (EXP 025591–600).

Taylor, Kent B., "TravTek—Information and Services Center," Vehicle Navigation & Information Systems Conference Proceedings, VNIS 1991. (EXP025601–12).

Yang, T.A., Hancock, P.A., "Geographic Database for IVHS Management," Applications of Advanced Technologies in Transportation in Engineering, 1991 (EXP 017110–116).

Laurini, Robert; Thompson, Derek, "Fundamentals of Spatial Information Systems," 1992.

Sashi Shekhar et al., "An Intelligent Vehicle Highway Information Management System," Microcomputers in Civil Engineering (1993) (EXP 017078–102).

"Implementation of a Wide Area Information Server (WAIS) Software to Disseminate Spatial Data on the Internet," Proceedings of the Thirteenth Annual ESRI User Conference, 1993, (EXP 030477–488).

SIGMOD 93 Proceedings, 1993 (EXP 017117–28).

Licht, Mark "Deliverying IVHS to the Marketplace: A Provider's Perspective", Proceedings of the IEEE–IEE Vehicle Navigations Systems Conference, Ottawa, Ontario, Oct. 12–15, 1993 (EXP 025493–97).

Masatoshi, Arika WA, "Personal Dynamic Maps Based on Distributed Geographic Information Services," Vehicle Navigation & Information Systems Conference Proceedings, Yokahama, Japan, Hiroshima City University, Aug. 31–Sep. 2, 1994 (EXP 025529–35).

Brown, Alison; Silva, Randy, "Tidget TIM Mayday System for Motorists,"IEEE 1994 Position, Location and Navigation Symposium, Apr. 1–15, 1994 (EXP 025541–48).

Yang, Thomas T.; Yip, Kai Yan, "Use of Mobitex Wireless Wide Area Networks as a Solution to Land–Based Positioning and Navigation," IEEE 1994 Position, Location and Navigation Symposium, Apr. 11–15, 1994 (EXP 02559–66).

Reddy, Prasuna; Grant, Paul; Jovanis, Paul; Kitamura, Ryuichi, "Dynamic Electronic Yellow Pages Using Arc/Info" Proceedings of the Fourteenth Annual ESRI User Conference, May 1994 (EXP 025484–92).

Bowen, Charles; Petyon, David, "CompuServe Information Manager, The Complete Sourcebook," Bantam Books, 1990.

Johnson, Ned, "Navigating the Internet with Prodigy," Sams. net Publishing, 1995.

Tatters, Wes, "Navigating the Internet with America Online," Sams.net Publishing, 1994.

"Advertising: Where it is now, Where it is going, How to Profit From New Opportunities." Interactive Yellow Pages and Electronic Directory Publishing. The Seventh Annual Conference, Yellow Pages Publishing Association, Nov. 1–3, 1993.

Jaguar—compilation of articles, Trade Show Circulars, Screen Shots, 1990–1991, EXP072057–EXP072138.

"Travelers set to gain control of reservations," USA Today, Oct. 26, 1993 (Factiva Archive).

"Vendor Goal: 15,000 Sabrevision Units On Line By Year's End," Travel Weekly, Feb. 8, 1993 (Factiva Archive).

Del Rosso, Laura, "Automation Trends 'Bode Well' For Agencies, SABRE Official Says," Travel Weekly, Mar. 2, 1992 (Factiva Archive).

PC Expo Nov. 19–21: Chicago IL., Multimedia & Videodisc Monitor, Future Systems, Inc., Feb. 1, 1992.

"A Look Back: The Year in Review," Multimedia & Videodisc Monitor, Future Systems, Inc., Jan. 1, 1993 (Factiva Archive).

Campbell, Cynthia V., "BR travel agencies are keeping ahead of computer game," The Baton Rouge Sunday Advocate, Dec. 15, 1991.

Mann, Mary, "CD ROMS Booked As Storage Choice for Nationwide Travel Database Tool," By, PC Week, Dec. 9, 1991.

"Infobits," IDP Report, Simba Information, Inc., Dec. 6, 1991 (Factiva Archive).

"Applications Line: 6,500 Sabrevision Systems Sold to Date," Multimedia & Videodisc Monitor, Future Systems, Inc., Dec. 1, 1991.

"Sabre 25 Percent Above Sabrevision Sales Plan," Aviation Daily, Oct. 10, 1991 (Factiva Archive).

"Survey Assesses Agents' Use of Jaguar Hotel System," Travel Weekly, Oct. 7, 1991 (Factiva Archive).

"Tandy's new PCs enter multimedia arena," The Dallas Morning News, Sep. 26, 1991. (Factiva Archive).

"Systems Enhancements," Travel Weekly, Sep. 23, 1991 (Factiva Archive).

John, Stone, "Covia Spotlights Electronic Maps in Video System," Tour & Travel News, Sep. 9, 1991.

Godwin, Nadine, "American to Issue Revision of Sabre PC Software Within Month," by Aug. 26, 1991 (Factiva Archive).
Polilli, Steve, "AA boasts of new systems." Software Magazine, May 1, 1991.
Mundy, Steve, "Plastic planes not enough for travel agent," Richmond Times–Dispatch, Apr. 1991 (Factiva Archive).
Dryden, Patrick, "New CD–ROM Support is Coming to Netware Servers," LAN Times, Apr. 1, 1991.
Steinert–Threkeld, Tom, "Pleasant departure new video displays, gadgetry promise to improve air travel.", The Dallas Morning News, Mar. 16, 1991.
Fairlie, Rik, "World IRIS Available on Datas II," Travel Weekly, Feb. 28, 1991.
Fairlie, Rik, "Sabrevision Installs 700 Terminals; Growth Rate is 40 Per Day.", Travel Weekly, Feb. 6, 1991 (Factiva Archive).
"Online, ICC, Reed Travel Group Team Up to Produce Jaguar on Sabrevision Hotel Directory," PR Newswire, Jan. 28, 1991.
Fairlie, Rik, "Debut Set for Spectrum Video System," Travel Weekly, Dec. 20, 1990.
Fairlie, Rik, "Major Agencies OK Installation of Sabrevision," Travel Weekly, Jun. 18, 1990, Factiva Archive.
Borzo, Jeanette, "Sabre Adds Fare–Check Programs, Increases Fees," Business Travel News, Jun. 18, 1990 Factiva Archive.
"Tech Briefs," Tech Briefs, Business Travel News, Jun. 18, 1990.
Wolff, Carlo, "Technology Will Set you Free," Lodging Hospitality, Jun. 1, 1990.
Stone, John, "'Sabrevision' Product Being Readied for Oct. 1" Launch, Tour & Travel News, Mar. 5, 1990.
Borzo, Jeannette, "Sabre Video Res System to be Ready in October," Business Travel News, Mar. 5, 1990, Factiva Archive.
Godwin, Nadine, "Sabrevision prepared for Oct. debut; Jaguar Data Base Will be First Offered on System," Feb. 26, 1990.
"Sabre, Reed Computer Products Due Oct. 1," Aviation Daily, Feb. 26, 1990.
Zavala, Walt, Latsha, Gary L.W., Rehfeld, John, "Customer Location Services," Vehicle Navigation & Information Systems Conference Proceedings, Yokahoma, Japan, Customer Location Services Aug. 31–Sep. 2, 1994 (EXP 025523–EXP 025528).
"GIS World, PC's vs. Workstations—Looking Beyond the Hype," Jun. 1992 (EXP 032253–EXP 032360).
Maguire, David J., et al., "Geographical Information System," Longman Scientific & Technical, 1991, v1 at 9–18, 55–65, 119–161, 239–267, 319–360, 375, and 457–474, and v2 at 115–134, 247–260, 297–301, Plates 56.11 and 56.12 (doc00001).
Brochure: "The Official Recreation Guide," Applied Information Services, 1988, all pages (doc01210).
Smith, Bart, "Computer Trekking," The Whitefish Pilot, Mar. 23, 1988, all pages (doc01230).
Hopkins, Roger, "Whitefish at hub of tourism world," The Daily Inter Lake, Apr. 3, 1988, all pages (doc 01231).
Schwennsen, Dan, "The World According to Jeff," Missoulian, Nov. 11, 1990, all pages (doc 1232).
Stone, John, "AIS and Sabre to Distribute Official Recreation Guide," Tour & Travel News, Issue No. 126, Apr. 24, 1989 all pages (doc 01233).

Johnston, Stuart J., "CD Rom Can Help in Data Overload," InfoWorld Media Group, Jul. 17, 1989, all pages (doc01235).
"Official Recreation Guide Available on Eaasy Sabre," Aviation Daily, vol. 30, No. 5, Jul. 9, 1990, all pages (doc01237).
Davis, Dean, "Big Sky Information Explosion," FedGazette, Jul. 1991, all pages (doc01238).
Roberti, Mark, "High Anxiety on Info Highway," Tour & Travel News, Feb. 28, 1994, all pages (doc01241).
Manuelli, Joe, "NTA Schedules January Debut for Its Private Online System," Travel Weekly, vol. 53, No. 88, Nov. 7, 1994, all pages (doc01243).
Onofri, Adrienne, "Perfect Timing," Travel Agent, Mar. 13, 1995, all pages (doc01245).
Juliano, Suzanne Smith; "Caribbean Isles Find a Home on Internet's Worldwide Web," Tour & Travel News, Jun. 5, 1995, all pages (doc01248).
"NTA Sets Date for Electronic Booking Option," Travel Weekly, vol. 54, No. 48, Jun. 19, 1995, all pages (doc01252).
"CTO reaches out to agents, consumers via World Wide Web," Travel Weekly, vol. 54, No. 65, Aug. 17, 1995 (doc01253).
"PC Autoroute Upgraded," Computer Shopper, No. 15, May 1989, all pages (doc01255).
"Nextbase—Autoroute Plus Network," Computers in Distribution News, Newsletter No. 12, Nov. 1989, all pages (doc01256).
McFarlane, John, "Software Review Autoroute Plus," Software Review, Dec. 1989, all pages (doc01257).
Bartram, Peter, "Nextbase Knows Where Its Going," Business Winner, Autumn 1990, all pages (doc01261).
"Nextbase Shows the Way Home," Practical PC, Nov. 1992, all pages (doc01263 ).
"Autoroute v. Milemaster: Taking a Test Drive," PC Today, Jul. 1993, all pages (doc01264).
Davis, Malory, "On the Right Route," Transport, May–Jun. 1993, all pages (doc01266).
Park, Clayton, "Automap Finds Bumpy Road to Success," Puget Sound Business Journal, Oct. 7, 1993, all pages (doc01267).
"Software Helps You Get From Point A to B," Windows (NY), Jan. 1994, all pages (doc01268).
Schuon, Marshall, "Automap Can Get You There," Spokane Spokesman–Review, Feb. 5, 1994, all pages (doc01269).
Davidson, Tyler, "Automap Drives Agents Down Information Highway," Travelage West (CA), Mar. 28, 1994, all pages(doc01270).
Hall, Larry, "Automap Road Atlas Programs Aids Highway Travel Planning," Kent, WA Valley Daily News, Apr. 22, 1994, all pages (doc01271).
Leron, Yael, "Mapping Programs Turn PC Into Navigator," Walnut Creek, CA Contra Costa Times, Jun. 8, 1994, all pages(doc01272).
Merin, Jennifer, "Scrolling the World with PC Software, Online Services," Globe, Dodge City, KS Sep. 9, 1994, all pages (doc01273).
Shuon, Marshall, "Where's New York," The New York Times, Section 8, Feb. 23, 1992, all pages (doc01274).
Rahman, Melissa, Press Release "Automap Announces Upgraded Road Atlas," Automap Road Atlas, Jul. 30, 1993, all pages (doc01277).
White, Vicci, Press Release "Automap Announces CD–Rom Version of Popular Automap Road Atlas," Automap, Inc. Mar. 7, 1994, all pages (doc01280).

Gordon, Martin, "Getting Down to Business," Mapping Awareness & GIS in Europe, vol. 7, No. 3, Apr. 1993, all pages (doc01282).
"Mapbase User Manual," Nextbase Limited 1992–1993, all pages (doc01284).
Zutell, Irene and Ballinger, Steve, "Hotel Presence on Internet Grows as Choice, Holiday Inn Set Up Cybershop," Travel Agent, Jun. 12, 1995, all pages (doc01542).
Diamond, Kerry, "First to the Net: Hotel Companies Have Been Pioneers in Getting Information About Their Properties," Travel Agent, Apr. 10, 1995, all pages (doc01544).
Seal, Kathy, "Consumers Browse Through Hotels on Computer Network," Hotel & Motel Management, vol. 210, No. 2, Feb. 6, 1995, all pages (doc01547).
Golden, Fran, "Thisco Gets 'Amazing' Response to Hotel Internet Database," Travel Weekly, vol. 53, No. 88, Nov. 7, 1994, all pages (doc01549).
Richards, Rhonda, et al. "Internet Brings Hotel Rooms to Travelers," USA Today, Nov. 1, 1994, all pages (doc01551).
Finlay, Douglas, "Wary Agents Say Thisco's Hotel Sysetm on Internet May Hold Promise for Trade," Travel Agent, Oct. 24, 1994, all pages (doc01553).
Golden, Fran, "Program Lets Internet Users Book Hotels," Travel Weekly, vol. 53, No. 81, Oct. 13, 1994, all pages (doc01555).
O'Brien, Gina, "A Welcoming Relationship Hotels Strengthen Ties With Agents as Bookings Easier Through Computerized Reservation Systems," Travel Agent, Dec. 26, 1994, all pages (doc01557).
Finlay, Douglas, "Power to the PC People New PC Applications Help Travel Agents Manage Data & Handle Bookings More Efficiently," Travel Agent, Dec. 26, 1994, all pages (doc01562).
Lewis, Peter H., "At Your Fingertips Exploring the Back Alleys and Remote Corners of Cyberspace," Chicago Tribune, Chicago Tribune, Dec. 18, 1994, all pages (doc01567).
Lewis, Peter H., "Traveling the Information Highway," New York Times, Dec. 17, 1994, all pages (doc01570).
"Giants Members Get the Message About Adjusting to Technology," Travel Agent, Nov. 21, 1994, all pages (doc01573).
Cohen, Amon, "Media Futures: Book Me Out of Nerdland," Financial Times, Aug. 7, 1995, all pages (doc01575).
"Southwest Airlines Offers Link to Hotel Information Through Internet Home Page," PR Newswire, Jun. 16, 1995, all pages (doc01578).
Wilder, Clinton, "The Internet Pioneers—The Emergence of the World Wide Web and Mosaic has Convinced Early Corporate Adopters of the Viability of Doing Business Online," Information Week, Jan. 9, 1995, all pages (doc01579).
"Hotel Industry Links to Internet and Hyatt Signs On," Business Wire, Oct. 11, 1994, all pages (doc01584).
"Pathways to Productivity & Profitability," Tour & Travel News, Nov. 14, 1994, all pages (doc01586).
Maddox, Kate, "Holiday Inn's 'Virtual Tour'," Business and Industry, Jun. 19, 1995, all pages (doc01592).
Vis, David, Best Western is Latest Hotel Chain to Market Properties on Internet, Travel Weekly, vol. 54, No. 8, Jan. 30, 1995), all pages (doc01594).
Godwin, Nadine, "Sabrevision Prepared for October Debut," Travel Weekly, Feb. 26, 1990, all pages (doc01600).
Stone, John, "Hyatt Announces Ad Contract with Jaguar–Sabrevision," Tour & Travel News, Issue 185, Jun. 18, 1990, all pages (doc01602).

Fairlie, Rik, "Sabrevision Officially Goes Online," Travel Weekly, Oct. 1, 1990, all pages (doc01606).
Blum, Ernest, "Jaguar to Make Cruise Directory Available to Agents in December," Travel Weekly, Jul. 1, 1991, all pages (doc01616).
"Survey Assesses Agents' Use of Jaguar Hotel System," Travel Weekly, Oct. 7, 1991, all pages (doc01620).
Fairlie, Rik, "Polishing Hotel On–Screen Image," Travel Weekly, Jun. 23, 1993, all pages (doc01625).
Godwin, Nadine, "AAL in Pact to Develop Sabrevision," Travel Weekly, Jul. 31, 1989, all pages (doc01628).
Jaguar Magazine, vol. 1, No. 1, 1990–91, all pages (doc01630).
Jaguar Magazine, vol. 2, No. 1, 1990–91, all pages (doc01634).
Jaguar Magazine, vol. 2, No. 2, 1990–91, all pages (doc01638).
Jaguar Magazine, vol. 2, No. 3, 1990–91, all pages (doc01642).
"ITT/Sheraton Corp. Finalizes Deal with Reed Travel Group to Put Hotels on Jaguar Directory," Jaguar Press Release, Feb. 22, 1991, all pages (doc01648).
"Jaguar Begins Ad Sales for Its Third Edition with Enthusiastic Support From the Hotel Industry," Jaguar Press Release, Nov. 9, 1990, all pages (doc01650).
"Highlight of 1991 Jaguar Usage Study," Jaguar, 1991, all pages (doc01653).
Brochure; "The Way Travel Agents Select Hotels is About to Change," Reed Travel Group, 1990, all pages (doc01656).
Brochure; "The Market Thinks It's the Cat's Meow," Reed Travel Group, 1991, all pages (doc01660).
Brochure; "You Have a Choice," Reed Travel Group, 1990–91, all pages (doc01663).
Brochure; "Now Appearing in Jaguar on Sabrevision," 1990–91, all pages (doc01669).
Brochure; "We're Hearing Great Things," 1991, all pages (doc01691).
Brochure; "Pop Up at the Point–of–Sale," 1990–91, all pages (doc01693).
Bowen, Charles, "CompuServe from A to Z," Random House, Inc., Second Edition, 1994, all pages (doc01695).
"CompuServe Almanac an Offline Reference of Online Services," CompuServe, Inc., Fourth Edition, 1988, all pages (doc02232).
Bowen, Charles and Peyton, David, "How to Get the Most Out of CompuServe," Random House, Fifth Edition, 1993, all pages (doc02554).
Ellsworth, Jill, H. and Ellsworth, Matthew V., "Using CompuServe," Que Corporation, 1994, all pages (doc03049).
"eAAsy Sabre Reference Guide," 1991, all pages (doc03519).
"eAAsy Sabre User's Guide," 1988, all pages (doc03531).
"CompuServe Information Service User's Guide," CompuServe Inc., 1988, all pages (doc03558).
CompuServe Magazine, Dec. 1993, all pages (doc03598).
CompuServe Magazine, Jun. 1993, all pages (doc03601).
CompuServe Magazine, May 1993, all pages (doc03603).
Online Today the Computer Communications Magazine, Jan. 1985, all pages (doc03607).
Online Today, Mar. 1988, pp. 48–51 (doc03609).
Email from Scott Lofteness to David Eastburn regarding Internet Forum, Nov. 8, 2003, all pages (doc03614).
"PARS–HMI System High–Level Design Document Version 3.0," Aug. 28, 1989, all pages (doc03617).

Shipley, Chris, "How to Connect," Ziff–Davis Press, 1993, all pages (doc03629).
Ogden, Jeff, "CompuServe Extends Information Superhighway with Enhanced Internet Access," Apr. 5, 1994, all pages (doc03884).
Steiner, Gary, "CompuServe Extends Information Superhighway with Enhanced Internet Access," Mar. 11, 1994, all pages (doc03889).
Wheeler, Berry, "CompuServe Access," Mar. 11, 1994, all pages (doc03892).
Jackson, Ed, "CompuServe Subscribers to Have R.C.S. Access," Mar. 13, 1994, all pages (doc03895).
Hahn, Andrew, "Telnet to CompuServe," Apr. 1, 1994, all pages (doc03898).
McCandish, Stanton, "CIS Via Telnet—Finally," Apr. 5, 1994, all pages (doc03914).
Jensen, Mark E., "CIS Info," May 17, 1994, all pages (doc03921).
Gaynor, Jim, "CompuServe Via Telnet," Jun. 25, 1994, all pages (doc03928).
Trump, Jason, "Telnet to CompuServe," Jul. 13, 1992, all pages (doc03930).
Black, David, "This is How to Telnet to CompuServe," Oct. 19, 1992, all pages (doc03933).
Vermaak, Jan, "Again Please: Telnet to CompuServe," Feb. 13, 1993, all pages (doc03937).
Roers, Keith, "eAAsy Sabre," Nov. 23, 1993, all pages (doc03940).
Duffy, Rick, "Fear This: Telnet Gateway to CompuServe," Feb. 3, 1994, all pages (doc03942).
Levine, John R., "eAAsy Sabre, OAG, and Other Online Airline Information FAQ," Feb. 13, 1994, all pages (doc03946).
Levine, John R., "eAAsy Sabre, OAG, and Other Online Airline Information FAQ," Feb. 20, 1994, all pages (doc03949).
Levine, John R., "eAAsy Sabre, OAG, and Other Online Airline Information FAQ," Mar. 20, 1994, all pages (doc03952).
Levine, John R., "eAAy, Sabre, OAG, and Other Online Airilne Information FAQ," Apr. 3, 1994, all pages (doc03955).
Levine, John R., "eAAsy Sabre, OAG, and Other Online Airline Information FAQ," May 2, 1994, all pages (doc03961).
Moreno, Pedro J., "Internet Connection to Airlines Reservation System," Jun. 9, 1992, all pages (doc03964).
Broun, Adam, M., "Access to eAAsy Sabre Wanted," Sep. 9, 1993, all pages (doc03967).
Nallawalla, Ash, "Now, CIS Access Via the Internet," The Age, Mar. 22, 1994, all pages (doc03970).
"Access to CompuServe from the Internet Available Now," PR Newswire, Mar. 31, 1994, all pages (doc03973).
Schurr, Amy, "CompuServe Internet Connection," PC Week, vol. 11, No. 17, May 2, 1994, p. N/38 (doc03974).
Reed, Phillip, "10 Minute Guide to CompuServe," Alpha Books, 1994, all pages (doc03977).
Miller, Michael, "Using CompuServe," Que Corporation, Second Edition, 1994, all pages (doc04155).
Banks, Michael, "Welcome to CompuServe for Windows," MIS Press Books, 1994, all pages (doc04642).
Schepp, Brad and Schepp, Debra, "The Complete Guide to CompuServe," Osborne–McGraw Hill, 1990, all pages (doc05062).
Bilbo, Mark K., "Que's Quick Guide to CompuServe," Que Corporation, 1992, all pages (doc05683).
Tidrow, Rob, et al., "New Rider's Official CompuServe Yellow Pages," New Rider's Publishing, 1994, all pages (doc06007).
Wagner, Rich, "Inside CompuServe, Second Edition," New Rider's Publishing, 1994, all pages (doc06654).
Beatty, Grace Joely, et al., "Cruising America Online," Prima Publishing, 1994, all pages (doc07266).
Benz, Christopher J., "How to Use America Online," Ziff–Davis Press, 1994, all pages (doc07586).
Arca, Julie Ann; Linstrom, Richard T., "Inside CompuServe," New Rider's Publishing, 1990, all pages (doc07746).
Bowen, Charles; Peyton, David, "CompuServe Information Manager The Complete Sourcebook," Bantam Books, 1990, all pages (doc08070).
Wang, Wallace, "CompuServe for Dummies," IDG Books Worldwide, 1994, all pages (doc08598).
Campbell, Bob, "CompuServe CIM," Sybex, Inc., 1993, all pages (doc08982).
Glossbrenner, Alfred, "Alfred Glossbrenner's Master Guide to CompuServe," Prentice Hall Press, 1987, all pages (doc09264).
Lichty, Tom, "America Online's Internet, MacIntosh Edition," Ventana Press, 1994, all pages (doc09703).
Copeland, Duncan G., et al., "Sabre: The Development of Information Based Competence and Execution of Information–Based Competition," IEEE Annuals of the History of Computing, vol. 17, No. 3, 1995, all pages (doc10026).
"Appollo Format User's Guide," Covina, 1991, Index and part of book (doc10054).
"Apollo Spectrum Directory Products Product Positioning Statement," Version 1.1 Aug. 30, 1990 (doc10531).
Spiegel, Connie, et al., "1992 Product Planning," Jul. 26, 1991, all pages (doc10538).
"Spectrum Hotel Directory," Covis Partnership, 1994, all pages (doc10543).
"Galileo Spectrum," Galileo Marketing, 1995, all pages (doc10545).
"Spectrum 2.0 Information Pack," Aug. 1994, all pages (doc10549).
Graham, Ian S., "HTML, A Complete Guide to HTML," John Wiley & Sons, Inc., 1995, pp. 373–382 (doc10560).
San Francisco Reservations Worldwide Web Pages, 1995, all pages (doc10572).
Lewis, Peter H., "Adventures in Cyberspace," The New York Times, Dec. 11, 1994), all pages (doc10582).
Stoneman, John, "Get Away!," The Mac, May 1995, all pages (doc10585).
Engleman, Linda J., "Blink and You're There," Internet World, Feb. 1995, all pages (doc10587).
"The Best Travel WWW Site," West Coast Online, Version 3.03 No. 27, May 1995, all pages (doc10590).
"1991–1992 International GIS Sourcebook," GIS World, Inc., 1991, all pages (doc10633).
Fedida, Sam and Malick, Rex, "The Viewdata Revolution," Halsted Press, 1979, all pages (doc11262).
"Teletel Newsletter," Special Issue No. 2, 1987, all pages (doc11455).
Richards, Rhonda, "Travelers Set to Gain Control of Reservations," USA Today, Oct. 26, 1993, all pages (doc11521).
"Vendor Goal 15,000 Sabrevision Units Online by Year's End," Travel Weekly, Feb. 8, 1993, all pages (doc11526).

Poon, Auliana, "Tourism, Technology and Competitive Strategies," CAB International, 1993, all pages (doc11825).

Fryxell, David A., "Business Travel: San Francisco Dreamin'," Link–Up, vol. 10, No. 1, Jan. 1993, all pages (doc12200).

Endicott, M.L., "The Electronic Traveler, Directory of Tourism Information Source," Enchiridion International, 1994, all pages (doc11203).

Welch, Nathalie, "CompuServe, Dow Plug Into Internet," MacWeek, vol. 8, No. 12, Mar. 21, 1994, all pages (doc12332).

Schofield, Jack, "Microfile—CompuServer's New Services," The Guardian, Mar. 24, 1994, all pages (doc12333).

"Access to CompuServe from the Internet Available Now," PR Newswire, Mar. 31, 1994, all pages (doc12334).

"A Piece of the Rock," Travel Weekly, Mar. 8, 1993, all pages (doc12335).

Fryxell, David A., "Around the World in One Day," Link–Up, vol. 7, No. 1, p. 16, Jan. 1990, all pages (doc12337).

Milligan, Michael, "NTA Begins Testing Its Aggressive Online Systems," Tour & Travel News, Feb. 27, 1995, all pages (doc12338).

"Management Group Buys Applied Information Services," Tour & Travel News, Issue 165, Feb. 5, 1990, all pages (doc12340).

Lofting, Christopher, "Menu on Travel Databank is Just the Tip of the Iceberg," Journal of Commerce, Feb. 3, 1989, all pages (doc12341).

Cronin, Mary J., "Doing Business on the Internet: How the Electronic Highway is Transforming American Companies," Van Nostrand Reinhold, 1994, all pages (doc12357).

"Towards a Coordinated Spatial Data Infrastructure for the Nation," National Academy Press, 1993, all pages (doc12523).

"Internet is Primary Focus of SLA Annual Conference," Information Technology Division of SLA, vol. 11, No. 3, 1994, all pages (doc12714).

Silverman, Dwight, "Mosaic Cuts Through Internet's Cyber–Universe," Houston Chronicle, Apr. 3, 1994, all pages (doc12717).

"Bed & Breakfast Business," PC Week, vol. 6, No. 38, Sep. 25, 1989, all pages (doc12722).

Campbell, Bob, "Up and Running with CompuServe," Sybex, Inc., 1992, all pages (doc12723).

Foster, Dennis, L., "Reservations and Ticketing: Apollo, Second Edition," McGraw Hill, 1994, all pages (doc12870).

Gunter, Talula, "Learning Apollo—Basic and Advanced Training," Delmar Publishing, 1994, all pages (doc13248).

Capwell, Gerald K.; Resnick, Barry R., "Sabre Reservations, Basic and Advanced Training, Second Edition," South–Western Publishing Co., 1993, all pages (doc13549).

Semer–Purzycki, Jeanne, "A Practical Guide to Sabre Reservations and Ticketing," 1992, all pages (doc13861).

"Reservation and Ticketing with Sabre," 2nd Edition, McGraw Hill, 1994–1995, all pages (doc14366).

"Speakeasy," A Newsletter for Eaasy Sabre Subscribers, vol. VI, No. 1, May 1992, all pages (doc14756).

"CompuServe Almanac, Fourth Edition," CompuServe, Inc., 1988, all pages (doc14758).

"The Communication Medium of the 90's Arrives Oct. 1st," Jaguar, vol. 1, No. 1, 1990–1991, all pages (doc14786).

"D&B—Dun's Electronic Yellow Pages," Dialog Information Retrieval Service, Sep. 1988, all pages (doc14790).

"Searching Dialog the Complete Guide," Dialog Information Services, Aug. 1987, all pages (doc14838).

"D&B—Dun's Market Identifiers," Dialog Information Retrieval Service, Dec. 1988, all pages (doc15449).

Dialog Chronolog "Internet Connection Available," Dec. 1991, all pages (doc15517).

"MapInfo for DOS, User's Guide Version 5.0," Mapping Information Systems Corporation, 1991, all pages (doc15518).

"MapInfo for DOS, Command Reference Version 5.0," Mapping Information Systems Corporation, 1991, all pages (doc15911).

"MapInfo Desk Mapping Software User's Guide," MapInfo Corporation, 1992, all pages (doc16348).

"MapInfo Desktop Mapping Software Reference," MapInfo Corporation, 1992, all pages (doc16475).

"MapInfo for Windows Getting Started," MapInfo Corporation, 1992, all pages (doc16722).

"MapInfo Desktop Mapping Software Release Notes," 1985–1992, all pages (doc16812).

"MapInfo User's Guide Version 1.1," MapInfo Corporation, 1990, all pages (doc16838).

"MapInfo Command Reference Version 4.0," MapInfo Corporation, 1986, all pages (doc17173).

Benzon, William Dr., "Desktop Mapping the MapInfo Way," MapInfo Press, 1990, all pages (doc17389).

"Midas Tutorial Version 1.21," Mapping Information Systems Corporation, May 1987, all pages (doc17511).

"Midas User's Guide Version 1.21," Mapping Information Systems Corporation, May 1987, all pages (doc17525).

"Midas Technical Reference Version 1.21," Mapping Information Systems Corporation, May 1987, all pages (doc17566).

"Midas Command Reference Version 1.21," Mapping Information Systems Corporation, 1988, all pages (doc17594).

"MapInfo Microcomputer Mapping Software Version 2.00," Mapping Information System Corporation, 1987, all pages (doc17613).

Tetzell, Rick, "Mapping for Dollars," Fortune, Oct. 18, 1993, all pages (doc17944).

Willmot, Don, "Four Programs Tell You Where to Go, What to Do," PC Magazine, Apr. 27, 1993, all pages (doc17954).

O'Reilly, Richard, "Map–Based Software Lets Your Fingers Do the Walking," Power Computing, Feb. 1, 1993, all pages (doc17956).

"Electronic Maps," PC Today, Sep. 1993, all pages (doc17957).

Swislow, William, "Can Map Software Measure Up?," Bradenton Hearld, Sep. 5, 1993, all pages (doc17958).

Schwabach, Bob, "Computer Map Software Finally Comes of Age," Vero Beach Press Journal, Sep. 13, 1993 (doc17959).

Warner, Jack, "Local Expert Helps Travelers Find Best Places to Go in a City," Atlanta Journal & Constitution, Oct. 17, 1993, all pages (doc17960).

"General Rent–A–Car Links with Worldspan's Accessplus," PR Newswire, Jul. 9, 1991, all pages (doc17961).

Rowe, Jeff, "Comnet, Worldspan Link Up to Expand Travel, Tour Services," The Orange County Register, Jul. 31, 1990, all pages (doc17962).

"Worldspan, THISCO to Develop Ultraswitch Second Stage," Aviation Daily, vol. 305, No. 62, Sep. 26, 1991, all pages (doc17963).

"Worldspan Negotiated Hotel Rate Capability Goes Global," Aviation Daily, vol. 307, No. 50, Mar. 12, 1992, all pages (doc17964).

"Worldspan to Add 10 Airlines to AccessPlus Program," Aviation Daily, vol. 308, No. 60, Jun. 24, 1992, all pages (doc17965).

"Worldspan Signs $100 Million Data Networking Deal with AT&T," Business Wire, Feb. 24, 1993, all pages (doc17966).

"Stratus Computer Winds $15 Million Contract for Worldspan's Travel Reservations Network," Business Wire, Mar. 2, 1993 (doc17967).

Ezell, Hank, "Worldspan Relocating 525 Jobs to Atlanta Area Most Positions Will Be at Galleria," The Atlanta Journal and Constitution, May 7, 1993, all pages (doc17968).

"Worldspan Acquires Pars Service Partnership," Aviation Daily, vol. 312, No. 26, May 6, 1993, all pages (doc17979).

"Worldspan Releases 'Vacation Source by Travelfile'," Aviation Daily, vol. 312, No. 34, May 18, 1993, all pages (doc17970).

"Worldspan Signs $100 Million Agreement with IBM," PR Newswire, Jun. 10, 1993, all pages (doc17971).

Lassiter, Eric, "Worldspan to Provide Link to ETDN's," Travel Weekly, Jun. 14, 1993, all pages (doc17973).

"Worldspan Signs Distribution Agreement with Travelfile," Aviation Daily, vol. 309, No. 21, Jul. 30, 1992, all pages (doc17974).

"Worldspan Releases 'Vacation Source by Travelfile'", Aviation Daily, vol. 312, No. 34, May 18, 1993, all pages (doc 17975).

Stone, John, "New Alliance for Worldspan, Amadeus; Gemini Strained," Tour & Travel News, Sep. 7, 1992, all pages (doc17976).

"Worldspan Offering Electronic Ads," Aviation Daily, vol. 315, No. 22, Feb. 2, 1994, all pages (doc17978).

"How Do You Move 2,367,069,000,000 Bytes of Information from Kansas City to Atlanta?" PR Newswire, Oct. 20, 1993, all pages (doc17979).

"Worldspan Signs $50 Million Contract with AT&T," Aviation Daily, vol. 313, No. 34, Aug. 18, 1993, all pages (doc17981).

Proceedings of the Thirteenth Annual ESRI User Conference, vol. I–III, Environment System Research Institute, 1993, vol. 1 (doc17982).

"Hotel & Travel Index," Winter 1991–92 (doc19577).

Benzon, William Dr., "Desktop Mapping the MapInfo Way," MapInfo Press, 1990, all pages (doc22809).

"First Annual Conference & Exposition on GIS in Business & Commerce," GIS World, Inc., May 11–13, 1992 (doc26546).

"Development History/Timeline," 1986–1996 (doc26704).

"Albany and Rensselaer County Boards of Realty User's Group Meeting," Navigation Technologies, Jul. 14, 1986 (doc26710).

"MapInfo Professional Version 4.0," Nov. 1995 (doc28833).

Nahon, Georges;Ulrich, Marc, "It's not Just an Electronic Phone Book," Information Access Company, Sep. 15, 1986 (doc29726).

Capwell, Gerald K.; Resnick, Barry R., "Sabre Reservations, Basic and Advanced Training, Second Edition," South–Western Publishing Co., 1993, all pages (doc33208).

Application for Servicemark Registration for "Eaasy Sabre" 1988 (doc33520).

Semer–Purzycki, Jeanne, "A Practical Guide to Sabre Reservations and Ticketing," 1992, all pages (doc33595).

Reservations and Ticketing with Sabre, 2nd Edition, McGraw Hill, 1994–95, all pages (doc34101).

Borzo, Jeanette, "Sabre, Reed Tie Puts Jaguar In Jeopardy," Business Travel News, Aug. 14, 1989 (doc34499).

Stone, John, "Sabre, Reed Group To Develop Upgrade for Computer System," Tour & Travel News, Jul. 31, 1989 (doc34501).

Delrosso, Laura, "Automation Trends 'Bode Well' For Agencies, Sabre Official Says", Travel Weekly, Mar. 2, 1992 (doc34513).

Sullivan, Jerry, "PC Expo Nov. 19–21: Chicago, IL," Multimedia & Videodisc Monitor Future Systems, Inc., Feb. 1, 1992 (doc34515).

Steinert–Threlkeld, Tom, "Tandy's New PCs Enter Multimedia Arena," The Dallas Morning News, Sep. 26, 1991 (doc34534).

"System Enhancements," Travel Weekly, Sep. 23, 1991 (doc34535).

Dryden, Patrick, "News & Analysis New CD–Rom Support Is Coming to Netware Servers," LAN Times, Apr. 1, 1991 (doc34548).

Godwin, Nadine, "Cruise Lines 'Waking Up' to Electronic Marketing of Products," Travel Weekly, Sep. 20, 1990 (doc34559).

Amster, Robin, "Joining the Future," Travel Weekly, Aug. 30, 1990 (doc34562).

Stone, John, "Hyatt Announces Ad Contract with Jaguar–Sabrevision," Tour & Travel News, Jun. 18, 1990 (doc34570).

Borzo, Jeanette, "Sabre Adds Fare Check Programs; Increases Fees," Business Travel News, Jun. 18, 1990 (doc34572).

Godwin, Nadine, "The Vision of the Future Incorporates the Technology of Today," Travel Weekly, Apr. 19, 1990 (doc34578).

"Sabre, Reed Computer Products Due Out Oct. 1," Aviation Daily, p. 392, vol. 299, No. 39, Feb. 26, 1990 (doc34587).

"Edwardian Is First U.K. Hotel Chain to Sign Up for Full Participation in Jaguar," Press Release, Oct. 23, 1990 (doc34616).

"One of the Country's Leading Hotel Management Companies Sees Jaguar As a Cost–Efficient Means to Increase Business," Press Release, Oct. 12, 1990 (doc34618).

"BPA Completes First Audit of Electronic Medium," The Morgan Report on Directory Publishing, Jan. 1992 (doc34620).

"Apollo Format User Guide," Covina Partnership, 1991, appendix and parts of book (doc34740).

"Apollo Spectrum Directory Products—Product Positioning Statement," Version 1.1 Aug. 30, 1990 (doc35454).

"Spectrum Product Strategy—A Review With Senior Management," Covina, Nov. 9, 1992, Galileo Deposition Exhibit 6 (doc35365).

Brochure: "Spectrum Hotel Directory," Covina Partnership, 1992, Galileo Deposition Exhibit 7 (doc35383).

"Information Pack—Aug. 1994 Spectrum 2.0 CD–Rom Based Mapping and Hotel Information," Galileo Deposition Exhibit 15 (doc35451).

Portion of Doc Information Pack—Aug. 1994 Spectrum CD–Rom Based Mapping and Hotel Information, (doc35462).

Fairlie, Rik, "Apollo, Sabre Reach A Virtual Tie for U.S. Travel Agency Installations," Travel Weekly, Nov. 8, 1993 (doc35464).

Stone, John, "AAA, Apollo to Link Hotel Res Systems," Tour & Travel News, Nov. 8, 1993 (doc35468).
Durbin, Fran, "AAA Inks Deal With Apollo for Roommaster Computer Link," Travel Weekly (Nov. 1, 1993) (doc35469).
Brisson, Mary, "Covia, Galileo Wind Up Merger Process," Business Travel News (Sep. 27, 1993)(doc 35471).
Arrendell, Stephen and Lassiter, Eric, "The Nation's Largest—Travel Weekly Magazine's Travel Agency Rankings for 1993," Travel Weekly (Jul. 29, 1993) (doc35472).
Godwin, Nadine, "Advances in Leisure Technology Seen," Travel Weekly, Jun. 24, 1993 (doc35507).
Long, Dina, "Automated Tour Bookings Go On–Line," Tour & Travel News, Mar. 22, 1993 (doc35510).
Brisson, Mary, "Galileo/Covia Structure is Set," Business Travel News, Mar. 22, 1993 (doc35513).
Stone, John, "Hotel Co., Links to CRS—Covia, Radisson Launch 'Roommaster Inside Availability' on Apollo," Tour & Travel News, Mar. 8, 1993 (doc35514).
"Covia Announces New Apollo CRS Advertising Product," Aviation Daily, Sep. 3, 1991 (doc35518).
Woodring, Carol D.; Huck, Gail S., "Reservations and Ticketing: Apollo," 1991 (doc35519).
"Sep. 1988 Prototype System One," Reynolds Deposition Exhibit 2, (doc36238).
Hobby, Jason, "Amadeus Reservations System Consortium Seeks Help From U.S. Rival Sabre," Computer Weekly Nov. 15, 1990 (doc37178).
"Amadeus, Sabre Sign Long–Term Marketing Agreement," Aviation Daily, Nov. 19, 1990 (doc37179).
"Computer Reservation News" Airline Business, Jan. 1, 1992 (doc37180).
"Firm Designs System for Multiple CRS Access From Single PC," Travel Weekly, Nov. 16, 1992 (doc37181).
"Rules and Reservations—Airline Computer Reservation Systems," Airline Business, Aug. 1, 1993 (doc37183).
"Site II Demographic Analysis Package User's Guide," 1976 (doc39228).
"Supersite User's Guide;" C.A.C.I. Market Analysis Division Market Intelligence for Decision Makers, 1984 (doc39262).
Weide, K.; Pascal, J., "CompuServe fur Windows," 1994 (doc39339).
"Information Bulletin—Western Association of Map Libraries," 1995 (doc39365).
"PARS Key Car System," PARS Travel Information System, 1989 (doc39371).
"PARS Car Key System Data Base Manual," Worldspan Travel Agency Information Services, 1991 (doc39749).
Newton, P.W., et al., "Networking Spatial Information Systems," 1992 (doc39984).
Borzo, Jeanette, "Demo 93 Brings Out Diverse Products; PIM, Word Processing, Mapping, and Image Products on Display," Feb. 15, 1993 (doc40281).
"Strategic Mapping Introduces Next Generation of Desktop Mapping," Business Wire, Nov. 1, 1993 (doc40283).
"Electronic Maps," PC Today, Sep. 1993 (doc40286).
O'Reilly, Richard, "Map–Based Software Lets Your Fingers Do the Walking," Oct. 15, 1988 (doc40289).
Brochure: "Atlast Software Product Summary," Strategic Mapping, Inc., Winter/Spring 1993 (doc40330).
"The Software Source Book" Egghead Software, 1993 (doc40337).
"Automap Road Atlas—The Easiest Way to Get from Here to There," 1994 (doc40449).

"Automatic Plus Version 6" Nextbase Limited, 1992–93 (doc40763).
Fryxell, David A, "Business Travel: San Francisco Dreamin'," Learned Information, Inc., Jan. 1993 (doc41379).
CompuServe, Dow Plug Into Internet, MacWeek, Ziff–Davis Publishing, Mar. 21, 1994 (doc41382).
Endicott, M.L., "The Electronic Traveler Directory of Tourism Information Sources," 1994 (doc41387).
"A Year Filled with Victories and Setbacks," Travel Agent, Nov. 7, 1994 (doc41518).
"American Airlines' Sabre and Applied Information Services Announce Exciting New Product That Will Revolutionize the Travel Industry," Soutyhwest Newswire, Inc., Apr. 24, 1989 (doc41522).
"American Airlines' Sabre and Applied Information Services Announces Exciting New Product That Will . . . " PR Newswire, Apr. 24, 1989 doc41524.
"American Airlines' Sabre and Applied Information Services Announce New Product for Travel Industry" Business Wire, Apr. 24, 1989 (doc41526).
"Racal acquires Interlan," Computerworld, May 1, 1989 (doc41528).
Holsomback, Barbara "Sabre Service Targets Leisure Traveler," A/S/M/ Communications, Inc., May 1, 1989 (doc41530).
"Apollo CRS Adds TravelFile Database" McGraw–Hill, Inc., Aviation Daily, Nov. 21, 1991 (doc41531).
"Applied Information Services Communication Servers and Command Modules," Applied Information Services, Inc., 1995 (doc41532).
Stone, John, "Autofile Targets Tour Operations to Join CRS Programs," Tour & Travel News, Apr. 15, 1991 (doc41612).
Lincoln, Lori; Godwin, Nadine, "Automation Marketplace," Travel Weekly, Sep. 30, 1991 (doc41614).
Ferguson, Bob, "Gray Line Sings 11 New Overseas Tour Operations," Tour & Travel News, Nov. 4, 1991 (doc41625).
Smith Juliano, Suzanne, "Bonaire Hopes to Show It's Not Just For Divers," Tour & Travel News, Mar. 13, 1995 (doc41627).
Fryxell, David A., "The Information Hunt for Leisure Travel: The Case of Bonny Scotland" Learned Information, Inc., Jan. 1993 (doc41629).
Henderson, Danna K., "Getting 'Information, not Just Data' Latest from Airline Computer Reservation Industry," Air Transport World, Aug. 1989 (doc41637).
"CMP Acquires Applied Information Services, Electronic Publishing Firm," Business Wire, Nov. 9, 1988 (doc41645).
"Ledger," Newsday, Inc., Nov. 10, 1988 (doc41647).
"Covia Launches Electronic Travel Information Catalog," McGraw–Hill, Inc. Aviation Daily, Apr. 2, 1992 (doc41652).
Stone, John, "Covia Signs Pact to Add Database of Tour Operators," Tour & Travel News, Dec. 5, 1988 (doc41653).
Rubin, Karen, "Agents, Suppliers Take Steps to Profit from Videotex," Tour & Travel News, Jan. 23, 1989 (doc41655).
Jones, David, "CTO Links Deal with ORG/TravelFile for Info on CRSs," Tour & Travel News, Jul. 6, 1992 (doc41659).
"CTO Reaches Out to Agents, Consumers via Worldwide Web," Travel Weekly, Aug. 17, 1995 (doc41660).
Elder, Martin "CTO's Future Focus," Travel Agent, Aug. 28, 1995 (doc41662).

Gregor, Anne, "Dialing Up the Bulletin Board Technology: computerized information services are changing the way companies, governments do business.", Los Angeles Times, May 22, 1994 (doc41668).
Rubin, Karen, "Agents, Suppliers Take Step to Profie From Videotex," Tour & Travel News, Jun. 23, 1989 (doc41675).
Jones, David, "CTO Inks Deal With ORG/TravelFile for Info on CRSs," Jul. 6, 1992 (doc41679).
Elder, Martin, "CTO's Future Focus," Travel Agent, Aug. 28, 1995 (doc41682).
Gregor, Anne, "Dialing Up the Bulletin Board Technology: computerized information services are changing the way companies, governments do business", Los Angeles Times, May 22, 1994 (doc41685).
"List Provides A Comprehensive Overview of Automation Vendors," Travel Weekly, Sep. 7, 1989 (doc41688).
"Management Group Buys Applied Info. Services," Tour & Travel News, Feb. 5, 1990 (doc41692).
Smith, Suzanne, "Many Four Operations Are Crossing Their Fingers" Tour & Travel News, Dec. 13, 1993 (doc41693).
"Maui Group Seeks Corporate Sponsors to Bankroll Promotions," Travel Weekly, Jul. 14, 1994 (doc41695).
Roberti, Mark, "No Future Shock: It's Today's Realty Growth in Enduser Computerized Airline Line Ticket Reservation," Tour & Travel News, Mar. 7, 1994 (doc41697).
"Norway Board Joins Data Base," Travel Weekly, May 30, 1994 (doc41700).
"NTA Bolsters Communications," Travel Agent, Nov. 7, 1994 (doc41703).
Smith Juliano, Suzanne, "NTA Info On–Line In CRS Travel Agents To Use New Vacations On–Line Computer," Tour & Travel News, Nov. 7, 1994 (doc41704).
Milligan, Michael, "NTA On–Line Delayed National Tour Assn. Delays Introduction of NTA/Tour & Travel Shop Information System," Tour & Travel News, Dec. 26, 1994 (doc41706).
Vis, David, "NTA to Debut Electronic Bookings with 30 Tour Operators on Aug. 1," Travel Weekly, Jul. 31, 1995 (doc41711).
"The Official Airline Guide Electronic Edition Travel Service is Now Available on GEnie" PR Newswire, Feb. 21, 1989 (doc41713).
"National Online Meeting" Learned Information Inc., Mar. 1989 (doc41715).
Milligan, Michael, "National Tour Association Reaches Out to Retailers" Tour & Travel News, Apr. 17, 1995 (doc41720).
Golden, Fran, "Network Strives to Make B&Bs Easier to Book," Travel Weekly, Jan. 17, 1994 (doc41722).
"New Caledonia: French flair off the Coast of Australia" Travel Weekly, Dec. 16, 1996 (doc41724).
Milligan, Michael, "On–Line In '95," Travel Agent, Oct. 3, 1994 (doc41732).
"Ontos, Inc. recently announced Release 2.2 of its Ontos DB database," Network World, Inc., Apr. 6, 1992 (doc41734).
"Orange County Newsmakers," Los Angeles Times, Apr. 24, 1991) (doc41736).
Turbak, Gary, "High Tech Travel Planning," American Forests, Mar.–Apr. 1991 (doc41737).
Sutor–Terrero, Ruthanne, "Orlando Plans Agents Contest" Tour & Travel News, Mar. 29, 1993 (doc41740).
Fryxell, David, "Paradise Found; Travel Industry Online Services," Information Today, Inc., Jan. 1992 (doc41741).

Dorsey, Jennifer, "Paris–based Agency Group Plans On–Line Service for Members," Travel Weekly, Jul. 17, 1995 (doc41744).
"Pata Data to be in CRSS" Travel Weekly, Apr. 4, 1994 (doc41746).
"Pathways to Productivity and Profitability," Tour & Travel News, Nov. 14, 1994 (doc41747).
"Pride of Africa" Travel Agent Dec. 4, 1995 (doc41753).
"Reference Manual Designed for Agent Use" Travel Weekly, May 13, 1993 (doc41755).
Mays, Barbara J., "Regional Data Goes On–line," Travel Weekly, May 1, 1995 (doc41757).
Godwin, Nadine, "Retailers Buy Home Pages on ASTA's Site," Travel Weekly, Nov. 13, 1995 (doc41758).
Ruggia, James, "River of Change," Travel Agent, Apr. 17, 1995 (doc41760).
Scally, Robert, "San Diego Hotels Suffer Room Gloom as Rates, Occupancy Levels Plummet," ,The Press Enterprise Co. Nov. 28, 1993 (doc41763).
"Sabre, Apollo Agents Get CLIA Data," Tour & Travel News, Jun. 22, 1992 (doc41767).
Post, Theresa J., "Rochester Visitors Group, Hotels Offer Inclusive Meeting Plans," Travel Weekly, May 13, 1993 (Doc 41768).
"Seminars to Play on Themes of How to Make Money," Travel Weekly, Nov. 6, 1995 (Doc. 41770).
Sutor–Terrero Ruthanne, "Savannah Rooms to be Available on Res Systems,", Tour & Travel News, May 10, 1993 (doc41772).
Del Rosso, Laura, "San Francisco CVB Arranges Plans Featuring Monet Exhibit," Travel Weekly, Mar. 16, 1995 (doc41774).
"American Airlines' Sabre and Applied Information Services Announce Exciting New Product That Will Revolutionize The Travel Industry" Southwest Newswire, Inc., Apr. 24, 1989 (doc41788).
"American Airlines' Sabre and Applied Information Services Announce Exciting New Product That Will Revolutionize The Travel Industry" PR Newswire Association, Inc. Apr. 24, 1989 (doc41790).
"American Airlines' Sabre and Applied Information Services Announce New Product for Travel Industry" Business Wire, Inc. Apr. 24, 1989 (doc41792).
Finch, Peter, et al., "Planning a trip? Let Your PC Do the Legwork," Business Week, Feb. 5, 1990 (doc41801).
Spritzer, Dinah A., "Tourism Officials Attempt to Do More With Less," Travel Weekly, Mar. 12, 1992 (doc41806).
"Tours de Force," Travel Agent, Dec. 26, 1994 (doc41808).
"Tradition with Style," Travel Weekly, Oct. 26, 1995 (doc41811).
Fairlie, Rik, "Travel Agents' Panel Looks at Ways Automation Can Boost Leisure Sales," Travel Weekly, Oct. 2, 1989 (doc41818).
Godwin, Nadine, "CRS Product Development Is More Evolution Than Revolution" Travel Weekly, Oct. 26, 1989 (doc41824).
Godwin, Nadine, "The Year in Automation Goes Beyond the CRS News" Travel Weekly, Oct. 30, 1989 (doc41828).
Hurdle, Jon, "Head Trips" Travel Weekly, Nov. 9, 1989 (doc41834).
Rubin, Karen, "Trek America Upgrades Packages for Americans" Tour & Travel News, Feb. 6, 1989 (doc41837).
Rubin, Karen, "Agents Create Adventure Specialty," Tour & Travel News, Feb. 6, 1989 (doc41838).

"Using Creative Methods," Travel Weekly, Apr. 23, 1992 (doc41840).
Post, Theresa J., "Visitors Bureau Aims to Increase Agent–Generated Business," Travel Weekly, May 6, 1993 (doc41842).
Caulk, Steve, "Visitors Bureau Goes High–Tech" Denver Publishing Company, Mar. 22, 1994 (doc41844).
Schepp, Brad, et al., "The Complete Guide to CompuServe," 1990 (doc42640).
Lichty, Tom, "America Online's Internet MacIntosh Edition," 1994 (doc43261).
Viescas, John L., "The Official Guide to the Prodigy Service," 1991 (doc43907).
Benz, Christopher J., "How to Use America Online," Ziff–Davis Press 1994 (doc44303).
Bowen, Charles; Peyton, David, "CompuServe Information Manager The Complete Sourcebook," 1990 (doc44462).
Wang, Wallace "CompuServe for Dummies" IDGBooks Worldwide, 1994 (doc45530).
"Reservation Confirmation From San Francisco Reservation," Sep. 30, 1994, Gustavson Deposition Exhibit 12 (doc46021).
Email Regarding Praise, Mar. 2, 1995, Gustavson Deposition Exhibit 13 (doc46022).
Sliwoski, Leonard J., "Online Commercial Services: Small Business Applications" Journal of Smell Business Management, Jul. 1, 1987 (doc46048).
Ojala, Marydee, "Company directories online: Trinet and Dun's," Online, Sep. 1, 1988 (doc46051).
"ABI directory on Dialog," American Business Information—Information Today, Apr. 1, 1992 (doc46059).
"D&B Dun's Electronic Yellow Pages Dialog File 515", Sep. 1988 (doc46106).
"Searching Dialog: The Complete Guide" Dialog Information Services, Inc. Aug. 1987 (doc46154).
"Search Aids for Use with Dialog Database" Dialog Information Services, Inc., 1987 (doc46587).
"D&B Dun's Market Identifiers On Top Dun's Market Indentifiers" Dialog Information Services, Inc., 1988 (Kaminecki Deposition Exhibit 4) (doc46762).
"Send Your Dialog Alert" Nov. 1991, Kaminecki Deposition Exhibit 6 (doc46880).
"Internet Connection Available," The Dialog Corporation, Dec. 1991, Kaminecki Deposition Exhibit 7 (doc46886).
"Toward A Coordinated Spatial Data Infrastructure for the Nation," National Academy of Sciences, 1993 (doc47054).
"Proceedings of the Thirteenth Annual ESRI User Conference, Volume 1" Environmental Systems Research Institute, Inc. (1993) (doc47245).
"Proceedings of the Thirteenth Annual ESRI User Conference, Volume 2," Environmental Systems Research Institute, Inc., 1993 (doc7864).
"Internet Is Primary Focus of SLA Annual Conference," vol. 11, No. 3, Summer 1994 (doc48847).
"A Little History of the World Wide Web," Apr. 11, 2005 (doc48859).
"U.S. Government Plans and Proposals on NSF Backbone to the Internet" Apr. 1993 (doc48865).
Rutkowski, Kathy, "Unit 2 Lecture Hypertext, Hypermedia Hypermedium," 1999–2000 (doc48875).
Silverman, Dwight, "Mosaic Cuts Through Internet's Cyber Universe" Houston Chronicle, Apr. 3, 1994 (doc48893).
Rowe, Megan, "Sailing on the Internet," Penton Publishing Inc., Jun. 1995 (doc48906).
"California Hyatts Include Special," Business Wire, Jun. 23, 1995 (doc48912).
"Internet Results," Travel Agent, Nov. 21, 1994 (doc48917).
Lewis, Peter H., "Internet Gets Cyber–Travelers on Their Way," The Sunday Patriot–News Harrisburg, Dec. 25, 1994 (doc48925).
"Volume Isn't Everything," USA Today, Mar. 21, 1995 (doc48952).
McDonald, Michele, "Sabre Unveils No Frill Lines' Booking Level," Travel Weekly Magazine, Jan. 19, 1995 (doc48960).
PARS–HMI System High–Level Design Document, Version 3.0, Aug. 28, 1989 (doc49140).
Balston, D.M. (Ed.), "Cellular Radio Systems," Artech House Boston, 1993, pp. 295–297.
"Hilton Head Fires up Cellular Data Network—Sea Pines Forest Beach Fire Department," Communication News, Oct. 1993.
Levy, S., et al., "Telnet X.3 Pad Option," Apr. 1998, http://www.ietf.org/rfc.rfc1053.txt?number=1053.
Onions, J., et al. "ISO–TOP bridge between TCP and X.25," Dec. 1998, http://www.isi.edu/in–notes/rfc1086.txt.
Romkey, J., RFC1005 "A Nonstandard for Transmission of IP Datagrams Over Serial Lines: SLIP," Jun. 1988, http://www.ietf.org/rfc.rfc1005.txt?number=105.
Rose, Marshall T. et al., RFC1006, "ISO Transport Service on top of the TCP Version: 3," Northrop Research and Techbnology Center, May 1987, http://www.ietf.org/rfc/rfc1006.txt?number=1066.
Stevens, W. Richard, *TCP/IP Illustrated, Volume 1: The Protocols*, Addison–Wesley Pub. Co., Reading, MA., 1993, pp. vii–47.
Salemi, Joe, *PC Magazine Guide to Client/Server Databases*, Ziff–Davis, Emeryville, CA, 1993, pp. 1–56, 176–186.
Loudermilk, Stephen, "Wireless Communications Devices on Tap; 1993 Comdex Trade Show in Las Vegas," PC Week, No. 15, 1993 ("Wireless").
Obraczka, K.; Danzig, P.B., and Li, S.H., Internet Resource Discovery Services, 26 IEEE Computer, No. 9, pp. 8–24.
Blankenhorn, Dana, "101 Online Opens in San Francisco," Newsbytes News Network, Jan. 10, 1992.
Blankenhorn, Dana, "US West, France Telecom Launch Phone Directory—Online Telephone Directory," Newsbytes News Network, Sep. 10, 1992.
Blankenhorn, Dana, "11 Million Business Database," Newsbytes News Network, Mar. 22, 1993.
Blankenhorn, Dana, "Prodigy, NYNEX Announce Electronic Yellow Pages," Newsbytes News Network, Dec. 9, 1993.
Pieratti, Denis, Haselkorn, Mark and Blumental, Cathy, "Bellevue Smart Traveler and Cellular Telecommunications," Bellevue Transporation Management Asssociation, May 1993.
Blankenhorn, Dana, "US West Links with France's Minitel—France Telecom," Newsbytes News Network, Oct. 9, 1991.
Asimov, Eric, "Practical Traveler; Booking Trips by Computer," The New York Times, Jun. 21, 1987.
Banks, Michael A., "Delphi: The Official Guide," General Videotext Corporation, 1987, 1990.
"Bell Atlantic to Unveil CD–Based Electronic Directory," Communications Daily Warren Publishing Inc., Copyright 1992.

"Bell Atlantic Experiments with Directory on Compact Disk," Enhanced Services Outlook Capitol Publications, Inc., Copyright 1992 by Capitol Publications, Inc., Tues, Dec. 1, 1992.

"Business Fingers to do Walking, on Computer Keyboard," Chicago Tribune, Copyright 1993, Fri. Dec. 10, 1993 (bates VIS 05008).

"NYNEX Sells Interactive Yellow Pages Advertising," Telecommunications Alert, Copyright 1994 Unitex Communications Group, Thurs. Sep. 29, 1994 (bates VIS 05016).

Lever, Robert, "French Videotext Crosses the Atlantic" (French telecommunications technology); Europe; Dec. 1, 1993.

Bates, Mary Ellen, "The Baby Bells and Information Services," Bell Regional Holding Companies, Online, Nov. 1, 1993.

Conhaim, Wallys W, "From dumb terminals with multiple standards to integrated home information appliances . . . where the industry is going," Information Today, Jan. 1, 1990.

"Trinet Establishment Database," Dialog Information Services, Inc., 1985.

"D&B—Dun's Market Identifiers," ONTAP$^{SM}$ Dun's Market Identifiers (276), Dialog Information Services, Inc. 1988.

"Yellow page business listings for U.S. and Canada now on CompuServe," Information Today, Apr. 1, 1992.

"NewsNet offers Business America," Information Today, May 1, 1993.

Warrock, Anna M., "Hi Tech Innovations in Home Sales in Boston," New England Business, Sep. 21, 1987.

"Maryland Major Facilities Study, V.1: Regional Screening and Conflict Resolution," Rogers & Golden, Inc. Alan Mallach/Associates, Jan. 1978 (EXP044568–882).

"Maryland Automatic Geographic Information Systems," Maryland Department of State planning, Dec. 1973 (EXP35165–224).

Jalbert, Jeffrey S.; Shepherd, Alf D., "A System for Regional Analysis of Water Availability," Oak Ridge National Laboratory, Jul. 1977 (EXP034298–458).

Okabe, Atsuyuki; Boots, Barry; Sugihara, Kokichi, "Nearest Neighborhood Operations with Generalized Voronoi diagrams: A Review," Int. J. Geographical Information Systems, vol. 8, No. 1, 1994, pp. 43–71 (EXP030564–592).

Byrnes, Kevin; Gallagher, Don, "Building a Business Establishment File: A Multi–Application Tool for Regional Planning and Economic Development,"URISA Conference Proceedings, Aug. 7–11, 1988 (EXP030461–476).

Huxhold, William E., "An Introduction to Urban Geographic Information Systems," Oxford University Press, 1991 (EXP030430–436).

Al–Naqi, Anwar Ali, D.A., "GIS in Municipal, Public and Private Agencies," University of Miami, Coral Gables, Florida, Jun. 1988 (EXP030145–408).

"Europe GIS in Business 94 Amsterdam," Conference Proceedings 1994 (EXP028866–29140).

Antenucci, John C., "Maryland Automated Geographic Information System: Expansions and Applications, in State Government," Urban, Regional and State Applications, President & Fellows of Harvard College, 1979 (EXP035225–243).

Hendricks, Laurel Ann, M.S., "Implementation of a Wellhead Protection Program Utilizing a Geographic Information System," Rice University, 1992 (EXP029864–030144).

"GIS in Business '93 Conference Proceedings," Mar. 7–10, 1993 (EXP029141–29530).

Business Geographic vol. 1, No. 4, Jul.–Aug. 1993 (EXP029592–029651).

Urisa 1993 Annual Conference Proceedings, vol. 11, Jul. 25–29, 1993 (EXP029698–29711).

Jalbert, J.S.; Dobson, J.E., "A Cell–Based Land Use Screening Procedure for Regional Sitting Analysis," Oak Ridge Laboratory, Apr. 1977.

"Management of Federal Information Resources," Office of Management and Budget, Jul. 2, 1993 (EXP028445–546).

U.S. Appl. No. 07/146,692, filed Jan. 21, 1988.

U.S. Appl. No. 10/423,318, filed Apr. 25, 2003.

U.S. Appl. No. 10/322,078, filed Dec. 17, 2002.

U.S. Appl. No. 09/923,203, filed Aug. 6, 2001.

*Cellular Radio Systems*, edited by Balston, D.M. et al., (Artech House Boston) (1993) (pp. 295–297.).

"Hilton Head fires up cellular data network—Sea Pines Forest Beach Fire Department" *Communication News*, Oct. 1993, retrieved from the Internet http://www.findarticles.com/p/articles/mi_m0CMN/is_n10_v30/ai_14457790; retrieved on Aug. 11, 2006 ("Hilton Head").

Hrut, Christopher B (Sep. 1993) "Navigation Technologies Executive Summary" Presentation at Mobile World Expo 1993 in San Jose, CA.

Levy S., et al. "Telnet X.3 Pad Option" RFC1053 (Apr. 1988) retrieved from the Internet www.ietf.org/rfc/rfc1053.txt; retrieved on Aug. 3, 2006.

Loudermilk, Stephen (Nov. 15, 1993) "Wireless Communications Devices on Tap; 1993 Comdex Trade Show in Las Vegas," *PC Week*, 45(10): 61 ("Wireless").

Nahon, Georges (Sep. 15, 1986) "It's not just an electronic phone book," *Telephone Engineer & Management*, pp. 85, 88–89.

Obraczka, Katia et al. (Sep. 1993) "Internet Resource Discovery Services," *IEEE Computer*, pp. 8–22.

Rillings, J.H., "TravTek" *Vehicle Navigation & Information Systems Conference Proceedings*, Society of Automotive Engineers, pp. 729–738 (1991).

Salemi, Joe, *PC Magazine Guide to Client/Server Databases*, Ziff–Davis, Emeryville, CA, 1993, pp. 1–53, 176–186.

Teletel Newsletter, Special Issue Nol. 2, *French Telecom* (Sep. 1987).

* cited by examiner

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 20 and 26 is confirmed.

Claims 1, 2, 6–9, 11–19, 21, 25, 27–34, 38, 41–47 and 52–63 are cancelled.

Claims 3–5, 10, 22–24, 35–37, 39, 40 and 48–51 were not reexamined.

* * * * *